(12) United States Patent
Thomas et al.

(10) Patent No.: US 12,485,459 B2
(45) Date of Patent: Dec. 2, 2025

(54) SYSTEMS, ASSEMBLIES, AND METHODS FOR PYROPHORIC MATERIAL EXTRACTION

(71) Applicant: Industrial Vacuum Transfer Services USA, LLC, Houston, TX (US)

(72) Inventors: Randall Earl Thomas, Harwood, TX (US); Reggie Boggs, Houston, TX (US); Ryan Thomas, Houston, TX (US)

(73) Assignee: Industrial Vacuum Transfer Services USA, LLC, Houston, TX (US)

( * ) Notice: Subject to any disclaimer, the term of this patent is extended or adjusted under 35 U.S.C. 154(b) by 76 days.

(21) Appl. No.: 18/459,545

(22) Filed: Sep. 1, 2023

(65) Prior Publication Data
US 2023/0405644 A1    Dec. 21, 2023

Related U.S. Application Data

(63) Continuation-in-part of application No. 18/214,887, filed on Jun. 27, 2023, which is a continuation-in-part
(Continued)

(51) Int. Cl.
*B08B 5/04*   (2006.01)
*B08B 9/08*   (2006.01)

(52) U.S. Cl.
CPC .............. *B08B 5/04* (2013.01); *B08B 9/0804* (2013.01)

(58) Field of Classification Search
None
See application file for complete search history.

(56) References Cited

U.S. PATENT DOCUMENTS 2,193,784 A    3/1940 Smith
2,458,258 A    1/1949 Furr
(Continued)

FOREIGN PATENT DOCUMENTS

CN    110817176       2/2020
CN    113123397 A     7/2021
(Continued)

OTHER PUBLICATIONS

Invitation to Pay Additional Fees with Partial International Search for PCT/US2022/073532, Nov. 4, 2022.
(Continued)

*Primary Examiner* — Joseph A Dillon, Jr.
(74) *Attorney, Agent, or Firm* — Womble Bond Dickinson (US) LLP

(57) ABSTRACT

Systems, assemblies, and methods to enhance extraction of pyrophoric materials from a refinery apparatus may include supplying a pressurized fluid to a plurality of vacuum generators, and generating, via the plurality of vacuum generators using the pressurized fluid, a vacuum flow. A manifold may provide a flow path for the vacuum flow, and pyrophoric material may be extracted from the refinery apparatus via the vacuum flow to a material collector through which the vacuum flow passes, depositing at least a portion of the extracted pyrophoric material in the material collector. One or more of inert gas or a cooling medium may be supplied to the material collector.

39 Claims, 36 Drawing Sheets

Related U.S. Application Data of application No. 17/811,293, filed on Jul. 7, 2022, now Pat. No. 12,137,864, and a continuation-in-part of application No. 17/811,295, filed on Jul. 7, 2022, now Pat. No. 12,091,264, and a continuation-in-part of application No. 17/811,280, filed on Jul. 7, 2022, now Pat. No. 12,103,791, and a continuation-in-part of application No. 17/811,288, filed on Jul. 7, 2022, now Pat. No. 12,246,932, and a continuation-in-part of application No. 17/811,277, filed on Jul. 7, 2022, now Pat. No. 12,098,068, and a continuation-in-part of application No. 17/811,291, filed on Jul. 7, 2022, now Pat. No. 12,193,627.

(60) Provisional application No. 63/375,500, filed on Sep. 13, 2022, provisional application No. 63/373,289, filed on Aug. 23, 2022, provisional application No. 63/367,570, filed on Jul. 1, 2022, provisional application No. 63/367,218, filed on Jun. 29, 2022, provisional application No. 63/367,219, filed on Jun. 29, 2022, provisional application No. 63/364,630, filed on May 13, 2022, provisional application No. 63/264,101, filed on Nov. 16, 2021, provisional application No. 63/264,015, filed on Nov. 12, 2021, provisional application No. 63/203,147, filed on Jul. 9, 2021, provisional application No. 63/203,108, filed on Jul. 8, 2021.

(56) References Cited

U.S. PATENT DOCUMENTS

| | | | | |
|---|---|---|---|---|
| 2,483,485 | A | 10/1949 | Barr | |
| 2,863,525 | A | 12/1958 | Lucian | |
| 3,489,464 | A | 1/1970 | Delfs | |
| 3,776,601 | A | 12/1973 | Capes et al. | |
| 3,971,096 | A | 7/1976 | Renholt | |
| 4,000,061 | A | 12/1976 | Bowling et al. | |
| 4,212,653 | A | 7/1980 | Giles | |
| 4,278,454 | A | 7/1981 | Nemesi | |
| 4,303,417 | A | 12/1981 | Koch | |
| 4,372,713 | A | 2/1983 | Kean, Jr. | |
| 4,379,663 | A | 4/1983 | Allison | |
| 4,415,297 | A | 11/1983 | Boring | |
| 4,422,810 | A | 12/1983 | Boring | |
| 4,423,987 | A | 1/1984 | Powers | |
| 4,460,389 | A | 7/1984 | Baum | |
| 4,519,810 | A | 5/1985 | Haas | |
| 4,578,840 | A | 4/1986 | Pausch | |
| 4,759,691 | A | 7/1988 | Kroupa | |
| 4,913,597 | A | 4/1990 | Christianson | |
| 4,923,597 | A | 5/1990 | Anderson et al. | |
| 4,925,467 | A | 5/1990 | Jordan et al. | |
| 4,933,017 | A | 6/1990 | Brzoska | |
| 4,935,984 | A | 6/1990 | Bryant | |
| 4,947,510 | A | 8/1990 | English | |
| 4,988,240 | A | 1/1991 | Thompson | |
| 5,030,259 | A | 7/1991 | Bryant et al. | |
| 5,163,786 | A | 11/1992 | Christianson | |
| 5,201,958 | A * | 4/1993 | Breunsbach | H05K 3/26 134/1 |
| 5,310,291 | A * | 5/1994 | Miller | B65G 53/521 138/172 |
| 5,425,188 | A | 6/1995 | Rinker | |
| 5,540,784 | A * | 7/1996 | Ranes | B08B 9/0321 134/40 |
| 5,562,746 | A | 10/1996 | Raether | |
| 5,791,073 | A | 8/1998 | Palmer | |
| 5,940,926 | A | 8/1999 | Inzinna | |
| 6,093,226 | A | 7/2000 | Schoenberger | |
| 6,206,621 | B1 | 3/2001 | Sebring | |
| 6,322,327 | B1 | 11/2001 | Dawson | |
| 6,325,572 | B1 | 12/2001 | Dietrich | |
| 6,385,867 | B1 | 5/2002 | Slabach | |
| 6,413,020 | B1 | 7/2002 | Davison | |
| 6,471,751 | B1 | 10/2002 | Semanderes | |
| 6,623,215 | B2 * | 9/2003 | Dietrich | B05B 7/1459 406/197 |
| 6,749,373 | B2 * | 6/2004 | Von Geldern | B65G 53/521 110/186 |
| 6,872,263 | B1 * | 3/2005 | Jansen | C23G 5/04 134/36 |
| RE38,872 | E | 11/2005 | Hayes | |
| 7,045,068 | B2 | 5/2006 | Hutchinson | |
| 7,074,261 | B2 | 7/2006 | Murphy | |
| 7,909,910 | B2 | 3/2011 | Benner | |
| 7,959,870 | B2 | 6/2011 | Yanokuchi et al. | |
| 7,967,901 | B2 | 6/2011 | Sakatani et al. | |
| 8,153,001 | B2 | 4/2012 | Peters | |
| 8,277,201 | B2 | 10/2012 | Krohn | |
| 8,360,691 | B2 | 1/2013 | Moretto | |
| 8,596,990 | B2 | 12/2013 | Schaaf | |
| 8,702,399 | B2 | 4/2014 | Krohn | |
| 8,764,350 | B2 * | 7/2014 | Bjarno | B65G 53/16 406/173 |
| 8,881,341 | B2 | 11/2014 | Schmidt, Jr. | |
| 8,967,919 | B2 | 3/2015 | Yaluris et al. | |
| 9,045,072 | B2 | 6/2015 | Hetcher | |
| 9,212,669 | B2 | 12/2015 | Krohn | |
| 9,227,780 | B2 | 1/2016 | Krohn | |
| 9,382,079 | B2 * | 7/2016 | Bjarno | C25C 3/14 |
| 9,687,890 | B2 | 6/2017 | Tacke | |
| 9,713,827 | B2 | 7/2017 | Bonneau et al. | |
| 9,719,230 | B2 | 8/2017 | Showley | |
| 9,988,788 | B2 | 6/2018 | Holt | |
| 10,000,347 | B2 * | 6/2018 | Newton | B65G 53/4616 |
| 10,065,150 | B2 | 9/2018 | Archuleta et al. | |
| 10,421,624 | B2 | 9/2019 | Maguire | |
| 10,457,501 | B2 | 10/2019 | Wilkinson et al. | |
| 10,502,237 | B2 | 12/2019 | Johnson | |
| 10,527,064 | B2 | 1/2020 | Krohn | |
| 10,739,070 | B2 | 8/2020 | Bishop | |
| 10,875,060 | B2 | 12/2020 | Wu et al. | |
| 10,906,225 | B2 | 2/2021 | Zinski | |
| 10,926,008 | B2 | 2/2021 | Minskoff et al. | |
| 11,091,327 | B2 | 8/2021 | Kelly | |
| 11,179,754 | B2 | 11/2021 | Doucette, Jr | |
| 11,319,958 | B2 | 5/2022 | Schaller | |
| 11,448,221 | B2 | 9/2022 | Scancarello | |
| 11,584,598 | B2 | 2/2023 | Conradt | |
| 11,629,486 | B2 | 4/2023 | Forster | |
| 11,643,790 | B2 | 5/2023 | Renger | |
| 11,891,255 | B2 | 2/2024 | Congedi | |
| 11,939,174 | B2 | 3/2024 | Sundholm | |
| 11,999,576 | B2 | 6/2024 | Klose | |
| 12,091,264 | B2 | 9/2024 | Thomas | |
| 12,098,068 | B2 | 9/2024 | Thomas | |
| 12,103,791 | B2 | 10/2024 | Thomas | |
| 12,137,864 | B2 | 11/2024 | Thomas | |
| 12,193,627 | B2 | 1/2025 | Thomas | |
| 12,203,701 | B2 | 1/2025 | Khankal | |
| 12,246,932 | B2 | 3/2025 | Thomas | |
| 2003/0190200 | A1 | 10/2003 | Hajima | |
| 2004/0149317 | A1 * | 8/2004 | Jur | B08B 7/0021 134/21 |
| 2004/0238006 | A1 * | 12/2004 | Sears | B08B 9/08 134/30 |
| 2005/0005968 | A1 | 1/2005 | Berry | |
| 2005/0183574 | A1 | 8/2005 | Burnett | |
| 2006/0162568 | A1 | 7/2006 | Arai | |
| 2007/0212175 | A1 * | 9/2007 | Ernst | B65G 53/58 406/108 |
| 2007/0234906 | A1 | 10/2007 | Demarco | |
| 2007/0251198 | A1 | 11/2007 | Witter | |
| 2008/0244986 | A1 | 10/2008 | Adelmann et al. | |
| 2009/0127352 | A1 | 5/2009 | Hinther | |
| 2009/0159003 | A1 | 6/2009 | Noguchi et al. | |
| 2010/0218467 | A1 | 9/2010 | Witter | |
| 2010/0243575 | A1 | 9/2010 | Nowling | |
| 2011/0047743 | A1 | 3/2011 | Shepherd | |
| 2012/0117754 | A1 | 5/2012 | Mendenhall | |
| 2012/0125441 | A1 | 5/2012 | Krohn | |

(56) References Cited

U.S. PATENT DOCUMENTS

| | | |
|---|---|---|
| 2012/0233758 A1 | 9/2012 | Tolles |
| 2012/0318583 A1 | 12/2012 | Krohn |
| 2013/0108482 A1 | 5/2013 | Johnson |
| 2013/0232723 A1 | 9/2013 | Catalfamo |
| 2013/0315761 A1 | 11/2013 | Milhau et al. |
| 2013/0327706 A1 | 12/2013 | Ursoi |
| 2013/0336875 A1 | 12/2013 | Chang |
| 2014/0374331 A1 | 12/2014 | Anderson |
| 2015/0335217 A1 | 11/2015 | Fritsche |
| 2016/0280473 A1 | 9/2016 | Veselov |
| 2017/0058484 A1 | 3/2017 | Buchleiter |
| 2017/0128957 A1 | 5/2017 | Kosawa et al. |
| 2017/0267466 A1 | 9/2017 | Wilkinson et al. |
| 2018/0148277 A1 | 5/2018 | Maguire |
| 2019/0183737 A1 | 6/2019 | Valerino |
| 2019/0193960 A1 | 6/2019 | Sewell |
| 2019/0226474 A1 | 7/2019 | Krohn |
| 2020/0078837 A1 | 3/2020 | Ducette et al. |
| 2020/0378200 A1 | 12/2020 | Krohn |
| 2022/0031929 A1 | 2/2022 | Davie |
| 2022/0126225 A1 | 4/2022 | Nowling |
| 2022/0128055 A1 | 4/2022 | Kolvenbach |
| 2023/0009143 A1 | 1/2023 | Thomas |
| 2023/0009644 A1 | 1/2023 | Thomas |
| 2023/0010206 A1 | 1/2023 | Thomas |
| 2023/0010395 A1 | 1/2023 | Thomas |
| 2023/0010635 A1 | 1/2023 | Thomas |
| 2023/0011157 A1 | 1/2023 | Thomas |
| 2023/0127887 A1 | 4/2023 | Khankal et al. |
| 2023/0340957 A1 | 10/2023 | Thomas |
| 2023/0340966 A1 | 10/2023 | Krohn |
| 2023/0356273 A1 | 11/2023 | Speece |
| 2023/0373757 A1 | 11/2023 | Sato |
| 2024/0150136 A1 | 5/2024 | Sundholm |
| 2024/0190669 A1* | 6/2024 | Brothier ................ B65G 53/24 |
| 2024/0367922 A1 | 11/2024 | Thomas |
| 2024/0391708 A1 | 11/2024 | Thomas |
| 2024/0391709 A1 | 11/2024 | Thomas |
| 2024/0391710 A1 | 11/2024 | Thomas |
| 2024/0391753 A1 | 11/2024 | Thomas |
| 2024/0391754 A1 | 11/2024 | Thomas |
| 2024/0391755 A1 | 11/2024 | Thomas |
| 2025/0009197 A1 | 1/2025 | Thomas |
| 2025/0089956 A1 | 3/2025 | Thomas |
| 2025/0145392 A1 | 5/2025 | Thomas |

FOREIGN PATENT DOCUMENTS

| | | | |
|---|---|---|---|
| CN | 114034519 A * | 2/2022 | ............... G01N 1/14 |
| CN | 118579521 B * | 11/2024 | ............ B65G 53/521 |
| CN | 115215101 B * | 1/2025 | ............. B65G 69/20 |
| DE | 1528900 | 12/1969 | |
| DE | 2625701 | 12/1977 | |
| DE | 202011052400 | 1/2012 | |
| EP | 1226865 | 7/2002 | |
| EP | 1251087 | 10/2002 | |
| EP | 1537773 | 8/2005 | |
| EP | 1967260 | 9/2008 | |
| EP | 2045199 | 4/2009 | |
| EP | 2805902 | 11/2014 | |
| EP | 3064457 | 9/2016 | |
| EP | 3799969 | 4/2021 | |
| FR | 2903422 A1 * | 1/2008 | ............. C01G 53/82 |
| GB | 1385706 | 2/1975 | |
| IN | 298340 | 6/2018 | |
| IN | 326989 | 12/2019 | |
| IN | 329066 | 1/2020 | |
| IN | 396075 | 5/2022 | |
| JP | 5043983 | 5/1974 | |
| JP | 52115089 | 9/1977 | |
| JP | 60190707 | 12/1985 | |
| JP | 04103849 | 9/1992 | |
| JP | 0738044 | 7/1995 | |
| JP | 09221225 | 8/1997 | |
| JP | 2003095436 | 4/2003 | |
| JP | 2005112373 | 4/2005 | |
| JP | 2006102657 | 4/2006 | |
| JP | 2006130479 | 5/2006 | |
| JP | 2007063934 A | 3/2007 | |
| KR | 100776693 | 11/2007 | |
| KR | 20120006864 | 1/2012 | |
| KR | 20160077775 | 7/2016 | |
| KR | 101864666 | 6/2018 | |
| KR | 102063424 | 1/2020 | |
| WO | WO-9727135 A1 * | 7/1997 | ............. B65G 53/36 |
| WO | 2004010006 | 1/2004 | |
| WO | 2008009024 | 1/2008 | |
| WO | 2009156685 | 12/2009 | |
| WO | 2010090574 | 8/2010 | |
| WO | 2012059625 | 5/2012 | |
| WO | 2013025522 | 2/2013 | |
| WO | 2017041769 | 3/2017 | |
| WO | 2021089977 | 5/2021 | |

OTHER PUBLICATIONS

International Search Report and Written Opinion for PCT/US2022/073537, Nov. 4, 2022.
International Search Report and Written Opinion for PCT/US2022/073542, Nov. 4, 2022.
International Search Report and Written Opinion for PCT/US2022/073545, Nov. 4, 2022.
International Search Report and Written Opinion for PCT/US2022/073551, Nov. 4, 2022.
International Search Report and Written Opinion for PCT/US2022/073554, Nov. 4, 2022.
International Search Report and Written Opinion for PCT/US2022/073532, Jan. 2, 2023.
VAC-U-MAX, Air Operated Industrial Vacuum Cleaners, Belleville, NJ, 2021, https://www.vac-u-max.com/.
Filter Concept Pvt. Ltd., Screenshots from youtube video located at https://www.youtube.com/watch?v=bbXZCzgZh4w, Mar. 14, 2013.
Transvac, Ejector Performance Testing, Alfreton, Derbyshire, UK, 2021, https://www.transvac.co.uk/ejector-performance-testing/.
Transvac, How an Ejector Works, Alfreton, Derbyshire, UK, 2021, https://www.transvac.co.uk/how-an-ejector-works/.
Declaration of Randall Earl Thomas, Nov. 28, 2022.
Wayback Machine printouts of www.supavac.com, Apr. 4, 2004.

* cited by examiner

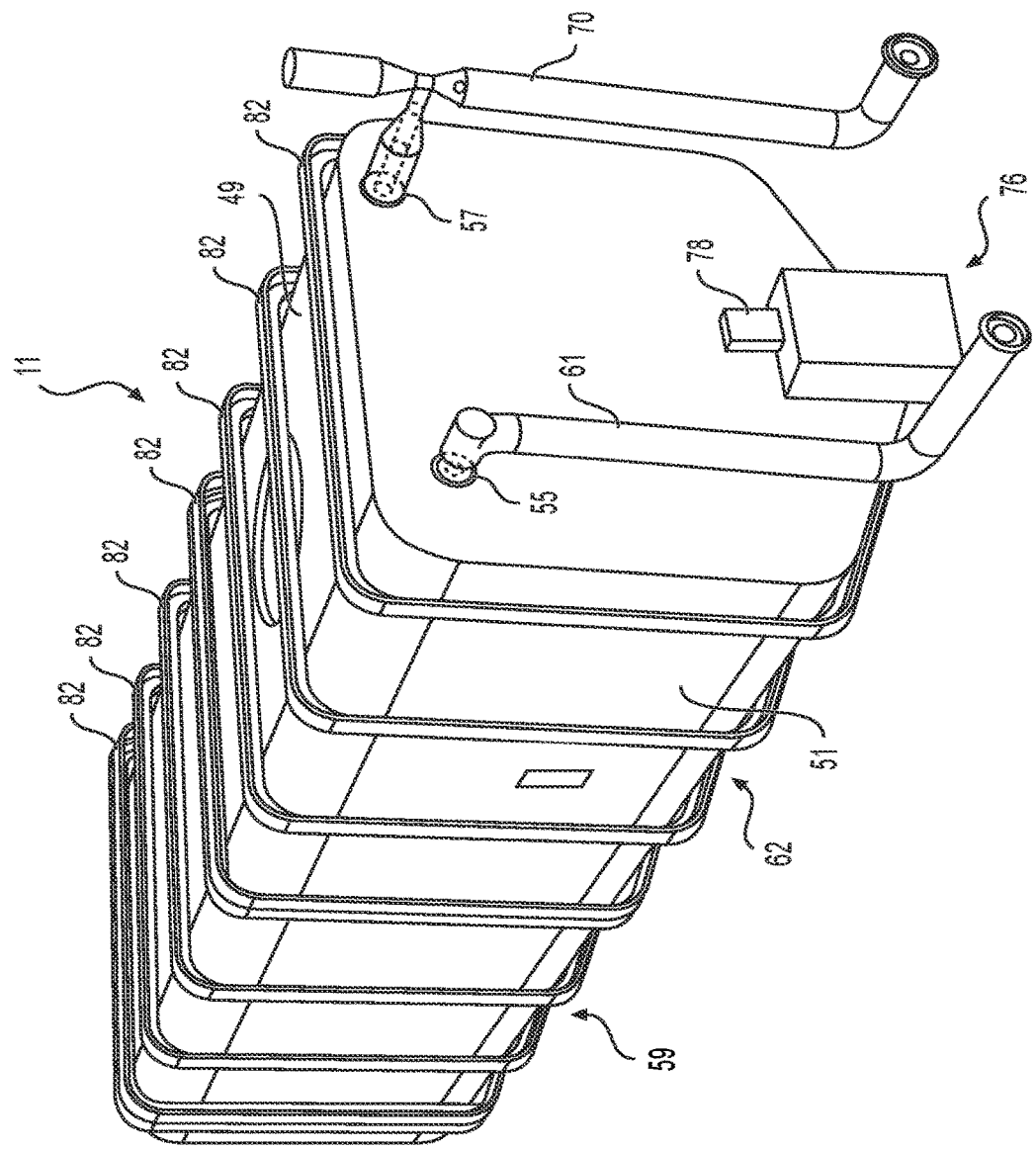

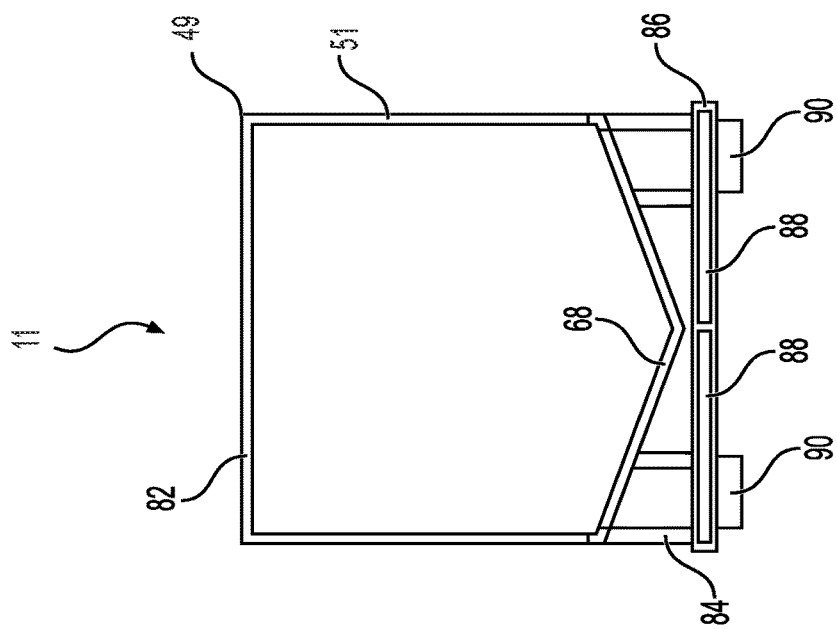
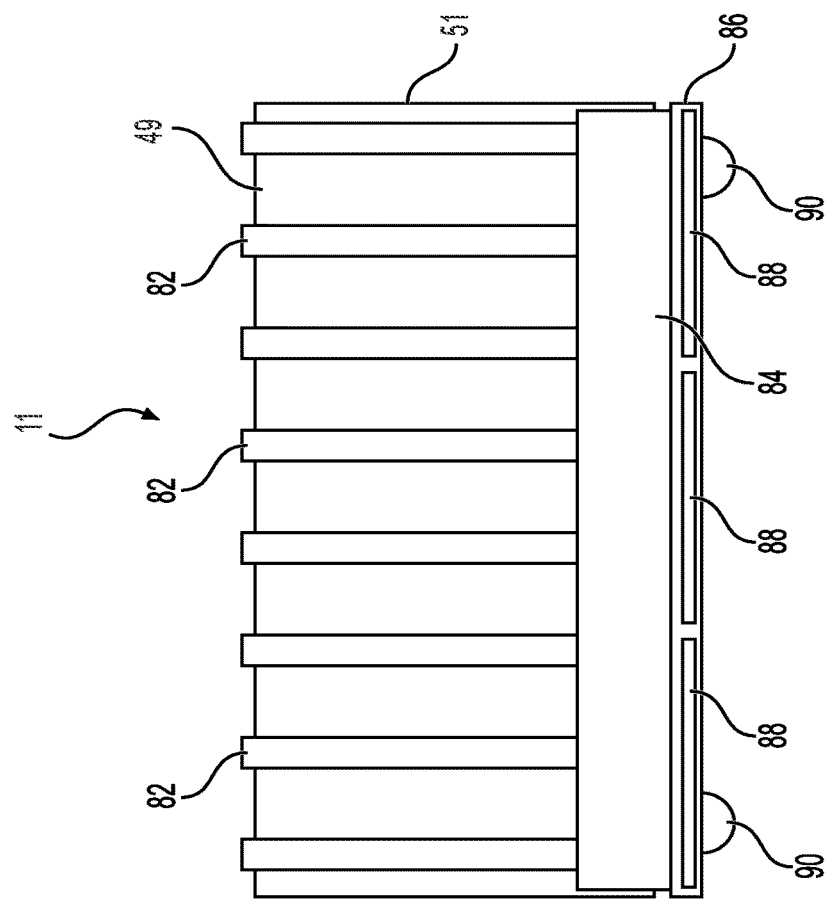

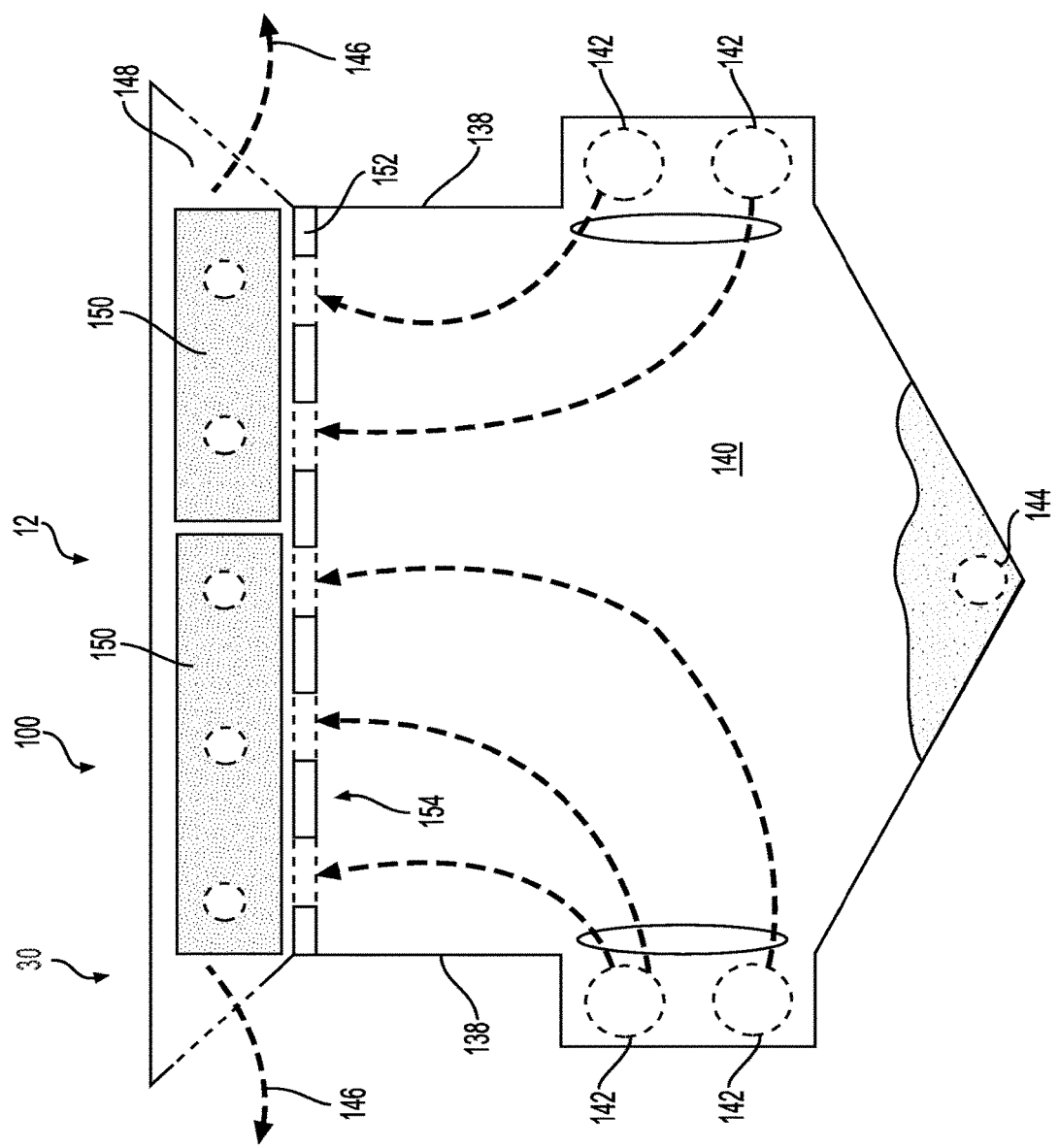

SYSTEMS, ASSEMBLIES, AND METHODS FOR PYROPHORIC MATERIAL EXTRACTION

PRIORITY CLAIMS

This U.S. non-provisional application claims priority to and the benefit of U.S. Provisional Application No. 63/375,500, filed Sep. 13, 2022, titled "SYSTEMS, ASSEMBLIES, AND METHODS FOR PYROPHORIC MATERIAL EXTRACTION." This application also claims priority to, the benefit of, and is a continuation-in-part of U.S. Non-Provisional application Ser. No. 18/214,887, filed Jun. 27, 2023, titled "AIR COMPRESSOR HAVING VACUUM AND ASSOCIATED METHODS FOR LOADING AND EXTRACTING MATERIALS," which claims the benefit of and priority to U.S. Provisional Patent Application No. 63/373,289, filed Aug. 23, 2022, titled "AIR COMPRESSOR HAVING VACUUM AND ASSOCIATED METHODS FOR LOADING AND EXTRACTING MATERIALS"; and is a continuation-in-part of and claims benefit and priority to U.S. Non-Provisional application Ser. No. 17/811,295, filed Jul. 7, 2022, titled, "ASSEMBLIES, APPARATUSES, SYSTEMS, AND METHODS FOR MATERIAL EXTRACTION AND CONVEYANCE," which claims the benefit of and priority to U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE"; and is a continuation-in-part of and claims benefit and priority to U.S. Non-Provisional application Ser. No. 17/811,293, filed Jul. 7, 2022, titled, "ASSEMBLIES AND METHODS FOR MATERIAL EXTRACTION"; and is a continuation-in-part of and claims benefit and priority to U.S. Non-Provisional application Ser. No. 17/811,291, filed Jul. 7, 2022, titled, "HIGH VOLUME INDUSTRIAL VACUUM ASSEMBLIES AND METHODS," which claims the benefit of and priority to U.S. Provisional Application No. 63/367,570, filed Jul. 1, 2022, titled "HIGH VOLUME INDUSTRIAL VACUUM ASSEMBLIES AND METHODS"; and is a continuation-in-part of and claims benefit and priority to U.S. Non-Provisional application Ser. No. 17/811,288, filed Jul. 7, 2022, titled, "RECEIVER, ASSEMBLIES, AND METHODS FOR LOADING AND EXTRACTING PRODUCT IN ELEVATED TOWER," which claims the benefit of and priority to U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER"; and is a continuation-in-part of and claims benefit and priority to U.S. Non-Provisional application Ser. No. 17/811,280, filed Jul. 7, 2022, titled, "ASSEMBLIES AND METHODS FOR MATERIAL EXTRACTION FROM RETENTION COLLECTIONS," which claims the benefit of and priority to U.S. Provisional Application No. 63/367,218, filed Jun. 29, 2022, titled "ASSEMBLIES AND METHODS FOR MATERIAL EXTRACTION FROM RETENTION COLLECTIONS"; and is a continuation-in-part of and claims benefit and priority to U.S. Non-Provisional application Ser. No. 17/811,277, filed Jul. 7, 2022, titled, "SYSTEMS, METHODS, AND DEVICES FOR INDUSTRIAL TOWER WASTE EXTRACTION," which claims the benefit of and priority to U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

TECHNICAL FIELD

The present disclosure relates to systems, assemblies, and methods for extracting pyrophoric material from a source of the pyrophoric material and, more particularly, to systems, assemblies, and methods for extracting pyrophoric material from environments providing sources for the pyrophoric material, such as refinery environments.

BACKGROUND

Certain environments, such as, for example, work sites, industrial sites, commercial sites, residential sites, or natural sites, may often provide sources of pyrophoric material that is either deposited or accumulates as a result of operations at the site or through natural accumulation. A pyrophoric material is a material that may spontaneously ignite in the presence of air, for example, at a temperature at or below about 130 degrees Fahrenheit (F) or, for example, as defined in the Globally Harmonized System of Classification and Labelling of Chemicals (GHS) or as defined by the United States Occupational Safety and Health Administration.

The deposit or accumulation of the pyrophoric material may be undesirable for a number of reasons, and thus, removal of the pyrophoric material from the site may be desirable or necessary. For example, the presence of the pyrophoric material in sufficient quantities may present a hazardous situation, hinder operations at the site, may present an undesirable environmental condition, and/or may present recycling or remediation opportunities. Traditional approaches to handling and removal of the pyrophoric material from the site may be unsatisfactory or suffer from drawbacks for various reasons. For example, traditional approaches may be reactive in nature, thus permitting the pyrophoric material to ignite and thereafter extinguishing fire resulting from ignition using a Class D fire extinguisher specifically designed to extinguish such fires. Such reactive procedures may result in hazardous situations and damage to equipment. In addition, the pyrophoric material may take a variety of forms (e.g., liquids, solids, emulsions, particulates, etc.), and/or may be located or positioned, such that it is difficult to extract and remove from the site in a safe manner, and/or traditional methods may be impracticable, inefficient, unduly time consuming, and/or labor intensive.

Accordingly, Applicant has recognized a desire to provide improved systems, assemblies, and methods for extracting pyrophoric material from a source of the pyrophoric material, including a variety of different pyrophoric materials from a variety of different environments, that may be less hazardous, more practicable, more efficient, less time consuming, and/or less labor intensive. The present disclosure may address one or more of the above-referenced drawbacks, as well as other possible drawbacks.

SUMMARY

As referenced above, it may be desirable to provide improved systems, assemblies, and methods for extracting pyrophoric material from a source of the pyrophoric material, including a variety of different pyrophoric materials from a variety of different environments, that may be less hazardous, more practicable, more efficient, less time consuming, and/or less labor intensive. For example, the intentional generation or production of some materials for desired intermediate or final products may result in the deposit or accumulation of by-product pyrophoric materials that need to be removed from the environment in which the desired products are generated or produced. In some embodiments, the systems, assemblies, and methods may provide efficient extraction of the pyrophoric material to be removed from various environments, such as, for example, work sites, industrial sites, commercial sites, residential sites, natural sites, etc. For example, in some embodiments, the pyrophoric material may be extracted in a substantially less hazardous and/or continuous manner, may be extracted in a manner that substantially prevents the ignition of the pyrophoric material, and/or may be extracted without significant contamination of the ambient environment with the pyrophoric material or portions thereof.

In some embodiments, a method to enhance extraction of pyrophoric catalyst from a refinery apparatus may include supplying a pressurized fluid to a plurality of vacuum generators, and generating, via the plurality of vacuum generators using the pressurized fluid, a vacuum flow. The method further may include associating a manifold with the refinery apparatus, with the manifold providing a flow path for the vacuum flow. The method also may include extracting pyrophoric catalyst from the refinery apparatus via the vacuum flow through the manifold to a material collector through which the vacuum flow passes, depositing at least a portion of the extracted pyrophoric catalyst in the material collector. The method further may include supplying one or more of inert gas or a cooling medium to the material collector.

In some embodiments, a method to enhance extraction of pyrophoric catalyst from a refinery apparatus may include supplying a pressurized fluid to a plurality of vacuum generators, and generating, via the plurality of vacuum generators using the pressurized fluid, a vacuum flow. The method further may include associating a manifold with the refinery apparatus, with the manifold providing a flow path for the vacuum flow. The method also may include extracting pyrophoric catalyst from the refinery apparatus via the vacuum flow through the manifold to a material collector through which the vacuum flow passes, depositing at least a portion of the extracted pyrophoric catalyst in the material collector. The method further may include passing the vacuum flow into a sound attenuation chamber to reduce a sound level generated by one or more of the vacuum flow or generating the vacuum flow. The method also may include one or more of: (i) supplying one or more of inert gas or a cooling medium to the material collector, or (ii) supplying one or more of inert gas or a cooling medium to the sound attenuation chamber.

In some embodiments, an extraction assembly to enhance extraction of pyrophoric catalyst from a refinery apparatus may include a vacuum source including a plurality of vacuum generators. Each of the plurality of vacuum generators may be positioned to cause a vacuum flow between the refinery apparatus and the vacuum source. The extraction assembly further may include a material collector including an interior positioned for receipt of the vacuum flow and to collect at least a portion of pyrophoric catalyst in the vacuum flow. The extraction assembly also may include an inert gas conduit may be positioned to supply inert gas from a source of inert gas to the interior of the material collector.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

FIG. 6A is a schematic perspective view of an example material collector including an example vacuum box for a material extraction system, according to embodiments of the disclosure.

FIG. 8A is a schematic plan view of an example material collector and an example carrier for transportation and/or orientation of the material collector, according to embodiments of the disclosure.

FIG. 8B is a schematic end view of the example material collector and example carrier shown in FIG. 8A, according to embodiments of the disclosure.

FIG. 12 is a simplified schematic end section view of an example sound attenuation chamber, according to embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
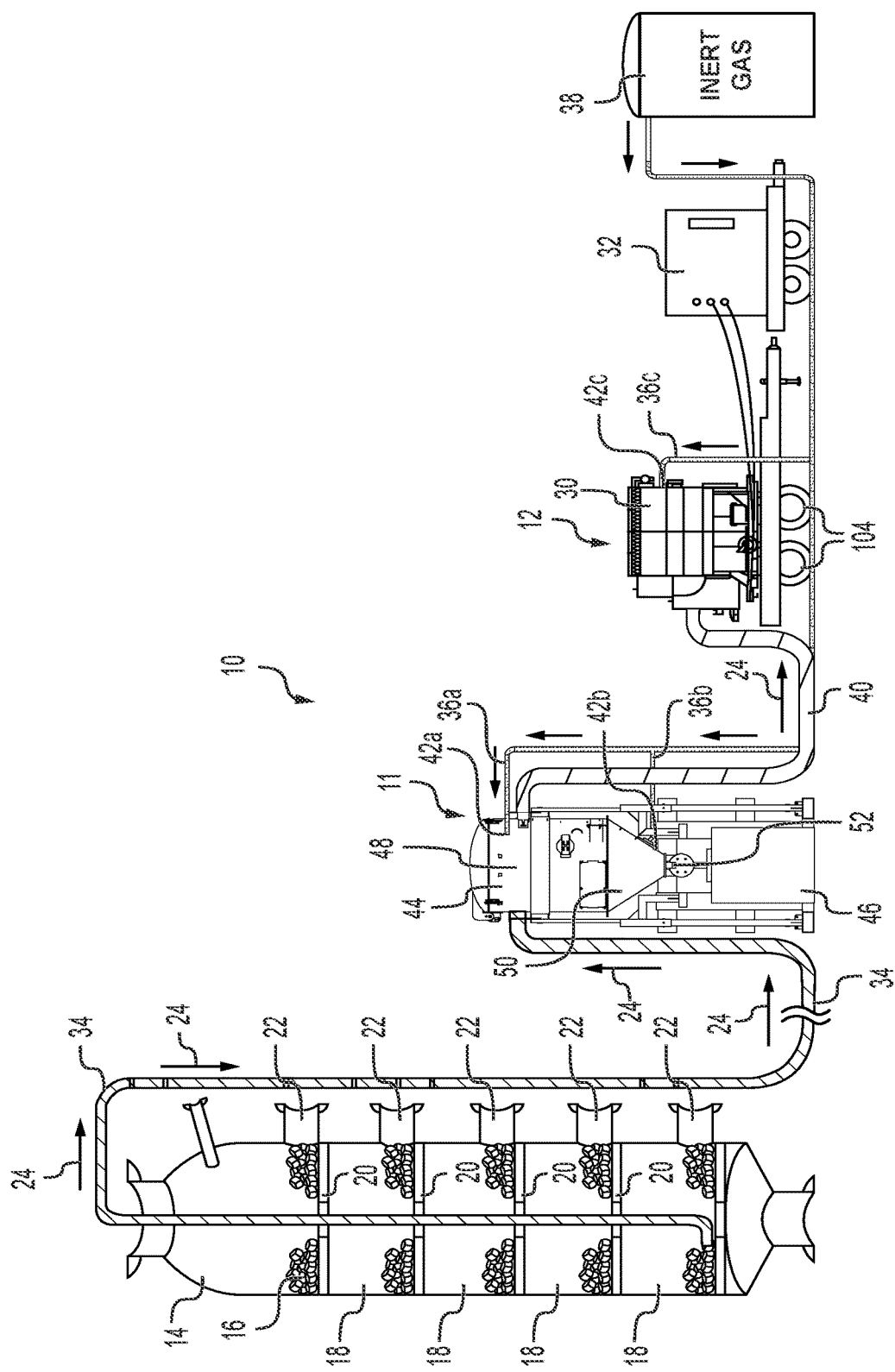
FIG. 1 is a schematic plan view of an example extraction assembly including an example material collector and an example inert gas supply used to extract pyrophoric material from an example refinery assembly, according to embodiments of the disclosure.

FIG. 1 is a schematic side view of an example material extraction assembly 10 including an example material collector 11, and an example vacuum generation and sound attenuation assembly 12, according to embodiments of the disclosure. The example material extraction assembly 10 may be configured to extract material from a source of the material. For example, the material extraction assembly 10, in at least some embodiments, may be used for extraction of a variety of different materials from a variety of different environments. For example, the intentional generation or production of some materials for desired intermediate or final products may result in the deposit or accumulation of by-product materials that need to be removed from the environment in which the desired products are generated or produced. In some embodiments, the assemblies and methods may provide efficient extraction of the material to be removed from various environments, such as, for example, work sites, industrial sites, commercial sites, residential sites, natural sites, etc. The industrial site may include, for example, chemical reaction towers (or other types of reaction vessels) in which chemical reactions are performed to obtain desirable products. Waste material may be generated as a byproduct from the chemical reactions.

For example, some types of chemical reactions may utilize a catalyst material to mediate the chemical reactions, for example, by causing the reaction to occur and/or increasing/decreasing a rate at which the reaction occurs, etc. In a chemical reaction tower (see, e.g., FIGS. 1-4), the catalyst material may be loaded into the chemical tower at various tower levels. Other materials, such as, for example, gasses, liquids, etc., may thereafter be introduced into the tower. The presence of the catalyst material may cause, mediate, or otherwise facilitate a desired chemical reaction to generate a desired product. The chemical reaction may cause the reactivity, morphology, or other properties of the catalyst material to change, thereby reducing the ability of the catalyst to perform its function. For example, the catalyst may be used up or otherwise render its presence in the chemical tower undesirable.

The chemical reaction may also interact with the materials out of which the chemical reaction tower is formed. For example, some chemical reaction towers may be formed from concrete and steel. Chemical reaction towers may be formed from any number and types of materials. The catalyst or the other materials in the chemical reaction tower may react or otherwise interact with these materials of the chemical reaction tower, forming additional undesired products, which may be referred to as "tower products."

The undesired reaction products and/or the tower products, which may be referred to as "waste material," may move within the chemical reaction tower. For example, some of this material may partially or completely cover the catalyst or other important features of the chemical reaction tower, thereby reducing the effectiveness of the catalyst, for example, even in cases where the catalyst is not depleted but remains active.

The presence of the depleted catalyst material, catalyst covered in waste material, and/or the waste material itself, may impair future functioning of the chemical reaction tower. For example, the presence of this material in the chemical reaction tower may reduce the conversion efficiency (e.g., the quantity of desirable products produced versus the quantity of input products) of the chemical reactions, increase a reaction time, may render the chemical reactions more difficult to control (or prevent them from occurring), and/or may otherwise reduce the ability of the chemical reaction tower to perform its intended function.

Embodiments disclosed herein may relate to assemblies and methods for extracting material from a source of the materials, such as, for example, removing undesired material from environments, such as industrial environments. For example, some embodiments disclosed herein may facilitate extraction of undesired materials from an industrial environment using a high-pressure vacuum flow. Removing undesired material from an industrial environment using a high-pressure vacuum flow may provide for time-efficient removal of the undesired materials and/or may reduce or prevent contamination of the ambient environment with the undesired material or portions thereof.

Industrial environments, chemical reaction towers, and the associated material are merely examples, and other types of environments and/or other types of materials are contemplated.

FIG. 1, FIG. 2, FIG. 3, and FIG. 4 schematically depict example material sources that are example reaction vessels 14, such a refinery tower of a refinery apparatus. Reaction vessels 14 may generate desirable products by reacting multiple materials with each other. Once a desirable product is generated, the reaction vessel 14 may be contaminated with the presence of material, which may include undesired material 16. Applicant has recognized that the undesired material 16 may be distributed throughout the reaction vessel 14, that reaction vessel 14 may be tall, and that the reaction vessel 14 may provide limited access to the location or locations of the undesired material 16. For example, as shown in FIGS. 1-4, the reaction vessel 14 may include a plurality of zones 18, which may include the presence of the undesired material 16. The plurality of zones 18 may be located in different regions of the reaction vessel 14, may be separated by different floors, levels, or support members 20, such as, for example, platforms, beams, etc., of the reaction vessel 14. This may render it difficult to access the undesired material 16 for removal from the reaction vessel 14. In some instances, different zones 18 of reaction vessel 14 may only be accessible using a ladder, scaffolding, or other types of elevated support structures that may render access to the zones 18 challenging.

As schematically depicted in FIGS. 1-4, the material extraction assembly 10 and related methods, according to at least some embodiments, may facilitate extraction of material such as the undesired material 16 from the source of the material, such as the reaction vessel 14, using one or more high-pressure vacuum flows. The use of high-pressure vacuum flows may facilitate extraction of the undesired material 16 (and/or other material), for example, in situations in which there is limited physical access to the plurality of zones 18, where the undesired material 16 may be present. In some embodiments, the use of high-pressure vacuum flows may facilitate parallel removal of the undesired material 16 from multiple locations within the source of the material, such as the reaction vessel 14.

For example, as shown in FIGS. 1-4, the reaction vessel 14 may include a plurality of reaction vessel ports 22, which may provide only limited access to the plurality of zones 18 from exterior the reaction vessel 14. For example, the reaction vessel ports 22 may be relatively small, such that it may be difficult or impossible for a person to enter the interior of the reaction vessel 14 through the reaction vessel ports 22, or such that it may be difficult or impossible to pass conventional tools, such as shovels or material transportation carts, through the reaction vessel ports 22.

In some embodiments, the material extraction assembly 10 may be configured to efficiently extract the undesired material 16 through the reaction vessel ports 22, for example, by generating a high-pressure vacuum flow and associating the high-pressure vacuum flow to external portions of respective reaction vessel ports 22. In some embodiments, the high-pressure vacuum flow may generate suction directed out of the interior of reaction vessel 14 through the respective reaction vessel ports 22. The suction may generate a vacuum induced vacuum flow 24 with at least a portion of the undesired material 16 entrained in the vacuum induced vacuum flow 24.

Depending on, for example, the distribution of the undesired material 16, various fixtures may be attached to the reaction vessel ports 22 to control application of suction to the undesired material 16. In some embodiments, conduits, such as hoses or other fluid flow directing carriers may be pneumatically connected to one or more of the reaction vessel ports 22, for example, inside of the reaction vessel 14. The conduits may be positioned such that the vacuum flow 24 entrains desired quantities of the undesired material 16 in the vacuum flow 24. Exterior portions of the reaction vessel ports 22 may be connected to other components of the material extraction assembly 10, for example, to apply the high-pressure vacuum and/or process undesired material 16 entrained in the vacuum flow 24.

In some instances, at least a portion of zones of the reaction vessel 14 may not be reasonably accessible via one or more of the reaction vessel ports 22, and some undesired material 16 may be present in such zones. In some embodiments, one or more zones 18 of the reaction vessel 14 may be substantially sealed. Such sealed zones may not be readily accessible via one or more of the reaction vessel ports 22 or other structures through which fluid flow paths may be established from the interior of the reaction vessel 14 to outside the reaction vessel 14. In some embodiments, to remove undesired material 16 from a sealed zone, a temporary access port may be formed in the reaction vessel 14. The temporary access port may be drilled or cut through the shell of the reaction vessel 14 to facilitate access to the sealed zone from outside the reaction vessel 14. The temporary access port may facilitate access to the sealed zone from outside of reaction vessel 14.

In some embodiments, to remove undesired material 16 from a sealed zone, an access device may be inserted into the interior of reaction vessel 14 through the temporary access port. For example, the access device may include a physical structure forming a flow path from the interior of the reaction vessel 14 to exterior the reaction vessel 14. The access device may include, for example, a conduit, such as one or more tubular members, hoses, manifolds, and/or other fluid conveying structures. A portion of the access device exterior the reaction vessel 14 may be attached to a conduit 26 (e.g., a hose) to form a flow path from the sealed zone to other components of the material extraction assembly 10. When attached to other components of the material extraction system 10, the access device may apply suction proximate to the undesired material 16 in the sealed zone to entrain it in a fluid flow (e.g., in the vacuum flow 24) into the access device. The fluid flow into the access device may follow the flow path to other components of the material extraction assembly 10, thereby extracting undesired material 16 from a sealed zone.

Applicant has recognized that the undesired material 16 may present a contamination threat to areas near reaction vessels. The undesired material 16 may include significant quantities of small particles that may be difficult to control. In some embodiments, the material extraction assembly 10 may facilitate extraction of undesired material with an at least partially sealed system. For example, the at least partially sealed system may be configured to transfer the undesired material from the reaction vessel 14 using a substantially sealed fluid flow path having a limited number of potential exit points. In some embodiments, the flow path may be filtered prior to exiting the flow path to limit or prevent discharge of particulate forms of the undesired material from at least some embodiments of the material extraction assembly 10.

Applicant has recognized that the undesired material 16 may be heterogeneous in nature and/or may include material that ranges in size from particulates to one or more inches in size. The undesired material 16 may also be in various states of matter. For example, some portions of the undesired material 16 may be solid, and other portions may be liquid or semi-liquid. Conventional approaches to material removal may be unable to effectively process heterogeneous undesired materials. In some embodiments, the material extraction assembly 10 may facilitate extraction of heterogeneous undesired material, for example, using the high-pressure vacuum flow 24. In some embodiments, the high-pressure vacuum flow 24 may be capable of moving a broad range of materials in various states of matter. The use of a high-pressure vacuum flow 24 for material extraction may facilitate substantial containment of removed undesired material 16, thereby limiting or preventing release into or contamination of the ambient environment with portion of the extracted undesired material 16.

The example material extraction assembly 10 shown in FIGS. 1-4 may be used to extract undesired material 16 from various environments. While described with respect to an industrial environment, at least some embodiments may be used to remove undesired material 16 from other environments, including, for example, commercial, residential, and natural environments. In some such examples, the example material extraction assembly 10 may be used to extract or harvest liquid, solid, and semi-solid materials from retention ponds (not shown) and other retention reservoirs for disposal. The retention reservoir may accumulate, for example, runoff, waste, pollutants, sediment, and other matter from higher elevation surfaces.

As shown in FIG. 1, for example, the material extraction system 10 may use a high-pressure vacuum flow 24 to extract materials from an industrial environment. For example, the high-pressure vacuum flow 24 may move the undesired material 16 along a flow path to separate it from the industrial environment. Once separated from the industrial environment, in some embodiments, the undesired material 16 may be transported to a site remote from the industrial environment, for example, for disposal, recycling, and/or remediation.

In some embodiments, for example, as shown in FIG. 1, the material extraction assembly may include a material collector 11, a vacuum source 28, and a fluid source 32 configured to provide pressurized fluid to the vacuum source 28. As shown in FIGS. 1-4, some embodiments of the material extraction assembly 10 may include a sound attenuating chamber 30 connected to the vacuum source 28, although it is contemplated that some embodiments may not include a sound attenuating chamber 30. In some embodiments, one or more of the material collector 11, the vacuum source 28, the sound attenuation chamber 30, or the fluid source 32 may be configured to be easily transported between geographical locations for use at different environments, for example, by being supported on one or more trailers including wheels, tracks, skids, or other devices for facilitating movement between geographical locations.

In some embodiments, one or more of the material collector 11, the vacuum source 28, or the sound attenuation chamber 30 may be arranged to form a flow path beginning at the source of the material (e.g., at the reaction vessel 14) and terminating at the sound attenuation chamber 30. The flow path may be used to extract undesired material 16 from the reaction vessel 14 and, in some embodiments, limit contamination of the ambient environment. For example, the vacuum source 28 may generate a vacuum in the flow path, thereby generating a fluid flow along the flow path. The fluid flow may be used to apply suction proximate the undesired material 16 in the reaction vessel 14 to draw the undesired material 16 into the flow path. The fluid flow in the flow path may cause the undesired material 16 to flow out of reaction vessel 14 and into material collector 11, thereby separating at least a portion of the undesired material 16 from the environment. In some embodiments, a major portion of the undesired material 16 may be deposited in the material collector 11. In some embodiments, a minor portion of the undesired material 16 may flow from the material collector 11, through the vacuum source 28, and into the sound attenuation chamber 30. In some embodiments, the sound attenuation chamber 30 may be configured to remove (or reduce) the minor portion of the undesired material 16 in the fluid flow prior to the fluid flow being exhausted into the ambient environment.

In some embodiments, to form the flow path, the material collector 11 may be pneumatically connected to the source of the undesired material (e.g., the reaction vessel 14). In some embodiments, the pneumatic connection between reaction vessel 14 may be formed using a manifold. The manifold may be connected to multiple reaction vessel ports 22 of the reaction vessel 14, thereby pneumatically connecting the material collector 11 to multiple locations of the reaction vessel 14. For example, the interior of the material collector 11 may be pneumatically connected to the reaction vessel 14. Pneumatically connecting the material collector 11 to multiple locations of reaction vessel 14 may facilitate extraction of undesired material 16 from each of the locations, for example, concurrently, simultaneously, sequentially, in parallel, etc.

Some reaction vessels 14 may be tall, such as 100 feet or taller. Due to the height of some reaction vessels 14 and the distribution of the zones 18 along the height, it may be challenging to access one or more of the zones 18 of the reaction vessel 14. In some embodiments, the manifold may include relatively rigid piping (e.g., poly pipe). The piping may render the manifold at least partially self-supporting, which may facilitate pneumatic connection of the manifold to multiple zones 18 and/or ports 22 of the reaction vessel 14. The manifold, in some embodiments, may pneumatically connect the material collector 11 to any number of locations on the reaction vessel 14, for example, such as those that are difficult to reach or access. The piping may be of low weight and/or easily attachable to a wide variety of structures, which may reduce the need for significant in-person access to difficult-to-reach locations on/in the reaction vessel 14 to extract undesired material 16.

In some embodiments, the manifold may be pneumatically connected to the material collector 11, for example, via a conduit 34, such as a hose. In some embodiments, the conduit 34 may be flexible to allow for pneumatic connection of the manifold and the material collector 11 in various orientations and positions with respect to one another. The conduit 34 may be sized so as not to limit the flow of fluid along the flow path. For example, as shown in FIGS. 1-4, in some embodiments, the conduit 34 may be of sufficient length and/or flexibility to facilitate extension of the conduit 34 to the top of the reaction vessel 14, through an aperture at the top or sides of the reaction vessel 14, and down into the lowest zones 18 of the reaction vessel 14, and movement of the conduit 34 to positions within the zones 18 to extract the undesired material 16 from the zones 18 using the vacuum flow 24 in the conduit 34.

In some instances, the undesired material 16 in the reaction vessel 14 may present a clogging potential. For example, the undesired material 16 may include relatively large components that may tend to wedge or catch on structures through which the undesired material 16 is drawn. In some embodiments, the conduit 34 may be, at least in part, transparent, translucent, and/or capable of providing an indication of the contents passing through the conduit 34, which may be usable to detect and/or diagnose whether the conduit 34 is clogging. As noted herein, the undesired material 16 may be heterogeneous and may include relatively large components that may tend to clog narrow passages (e.g., constrictions in the conduit 34). To reduce the risk of clogging, in some embodiments, the conduit 34 may include, at least in part, a smooth inner surface, such as may be present in poly pipe. A smooth inner surface may reduce the risk of, or prevent, clogging of the conduit 34.

Figure 15:
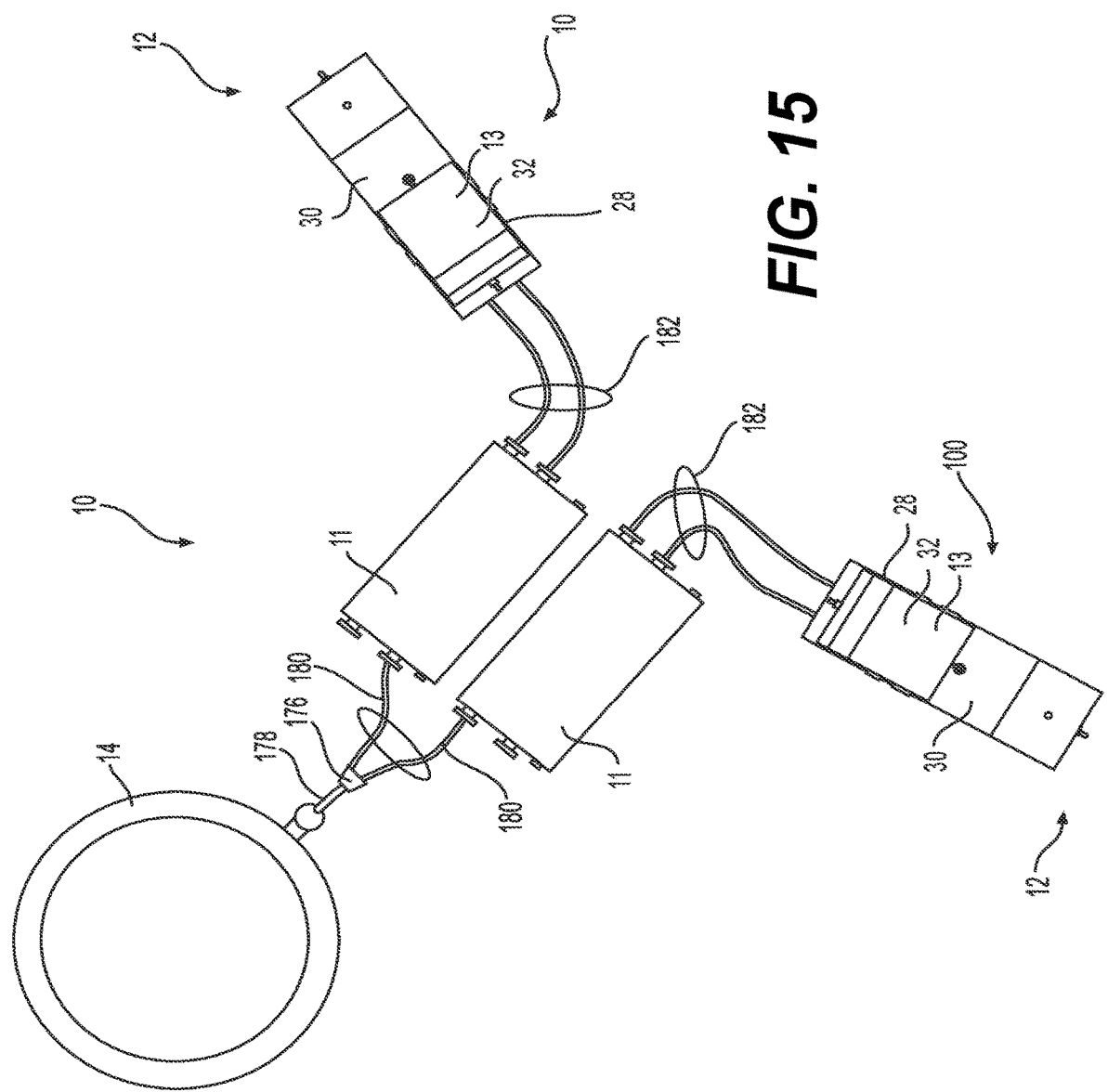
FIG. 15 is a schematic top view of example system including multiple example material extraction assemblies, according to embodiments of the disclosure.

Although in some examples, a suction manifold may be pneumatically connected to one material collector 11, in some embodiments, the suction manifold may be connected to multiple material collectors 11, and/or multiple suction manifolds may be connected to one or more material collectors 11. In some embodiments, the multiple material collectors 11 may be connected in parallel to, for example, scale-up the extraction capacity of the material extraction assembly 10, for example, by increasing the pressure of the high-pressure vacuum flow, etc., for example, as shown in FIG. 15.

In some embodiments, the undesired material 16 may flow into the material collector 11 after flowing through the manifold. A major portion of the undesired material 16 may be collected in the material collector 11. In some embodiments, however, some (e.g., a minor portion) of the undesired material 16 may flow out of the material collector 11 in the flow path of the high-pressure vacuum flow 24. In some embodiments, the material collector 11 may remove a major portion of the undesired material 16 from the fluid flow it receives along the flow path of the vacuum flow 24. In some embodiments, the material collector 11 may receive all, or a portion, of the fluid flow out of the reaction vessel 14, and the material collector 11 may include one or more structures configured to trap a major portion of the undesired material 16 in the fluid flow received inside the material collector 11. Once trapped, the major portion of the undesired material 16 may be retained in the material collector 11, for example, for disposal, recycling, and/or remediation.

In some embodiments, the material extraction assembly 10 may be used to extract pyrophoric material from a source of the pyrophoric material. A pyrophoric material is a material that may spontaneously ignite in the presence of air, for example, at a temperature at or below about 130 degrees Fahrenheit (F) or, for example, as defined in the Globally Harmonized System of Classification and Labelling of Chemicals (GHS) or as defined by the United States Occupational Safety and Health Administration. For example, the pyrophoric material may be a pyrophoric catalyst, such as, for example, a catalyst that exhibits pyrophoric properties before, during, and/or after use in a refinery process, such as a catalytic hydrogenation process. In some embodiments, the material extraction assembly 10 may be used to extract pyrophoric catalyst from a source of the pyrophoric catalyst, such as the reaction vessel 14 or refinery apparatus, such as, the schematically depicted refinery tower shown in FIGS. 1-4.

As shown in FIGS. 1-4, in some embodiments, the material extraction assembly 10 may include one or more inert gas conduits, such as inert gas conduits 36a, 36b, and/or 36c, positioned to supply inert gas from an inert gas source 38 to one or more of the material collector 11 or the sound attenuation chamber 30. The inert gas source 38 may include a container or assembly configured to supply one or more pressurized inert gases to the one or more insert gas conduits 36a, 36b, or 36c. The one or more inert gases may include one or more of nitrogen, helium, neon, argon, krypton, xenon, radon, or any other substances having similar ignition-suppression characteristics. The one or more inert gases may be supplied to one or more of the material collector 11 or the sound attenuation chamber 30 in quantities and/or at pressures sufficient to prevent ignition of pyrophoric materials such as pyrophoric catalyst in the material collector 11 and/or the sound attenuation chamber 30.

As shown in FIGS. 1-4, some embodiments of the material extraction assembly 10 may include the collection conduit 34 positioned to provide a flow path for the vacuum flow 24 between the reaction vessel 14 and the material collector 11, and in some embodiments, the material extraction assembly 10 may include a vacuum conduit 40 positioned to provide a flow path for the vacuum flow 24 between the material collector 11 and the sound attenuation chamber 30. As shown in FIGS. 1-4, in some embodiments, the material extraction assembly 10 may include a first inert gas conduit 36a positioned to supply inert gas from the source of inert gas 38 to the interior of the material collector 11. In some embodiments, the material collector 11 may include an inert gas inlet 42a connected to the first inert gas conduit 36a, and the interior of the material collector 11, and/or the inert gas inlet 42a of the material collector 11 may be configured to induce swirl in inert gas supplied to the interior of the material collector 11, which may promote distribution of the inert gas in the interior of the material collector 11, which may enhance suppression of ignition of the pyrophoric catalyst collected in the material collector 11. For example, the inert gas inlet 42a may be oriented at a non-zero or non-perpendicular angle relative to the location at which the inert gas inlet 42a is positioned on the material collector 11 to cause inert gas entering the interior of the material collector 11 via the inert gas inlet 42a to swirl or circulate within the interior of the material collector 11. In some embodiments, the interior of the material collector 11 may include a deflector positioned at the inert gas inlet 42a to cause inert gas entering the interior of the material collector 11 via the inert gas inlet 42 to swirl or circulate within the interior of the material collector 11.

Figure 2:
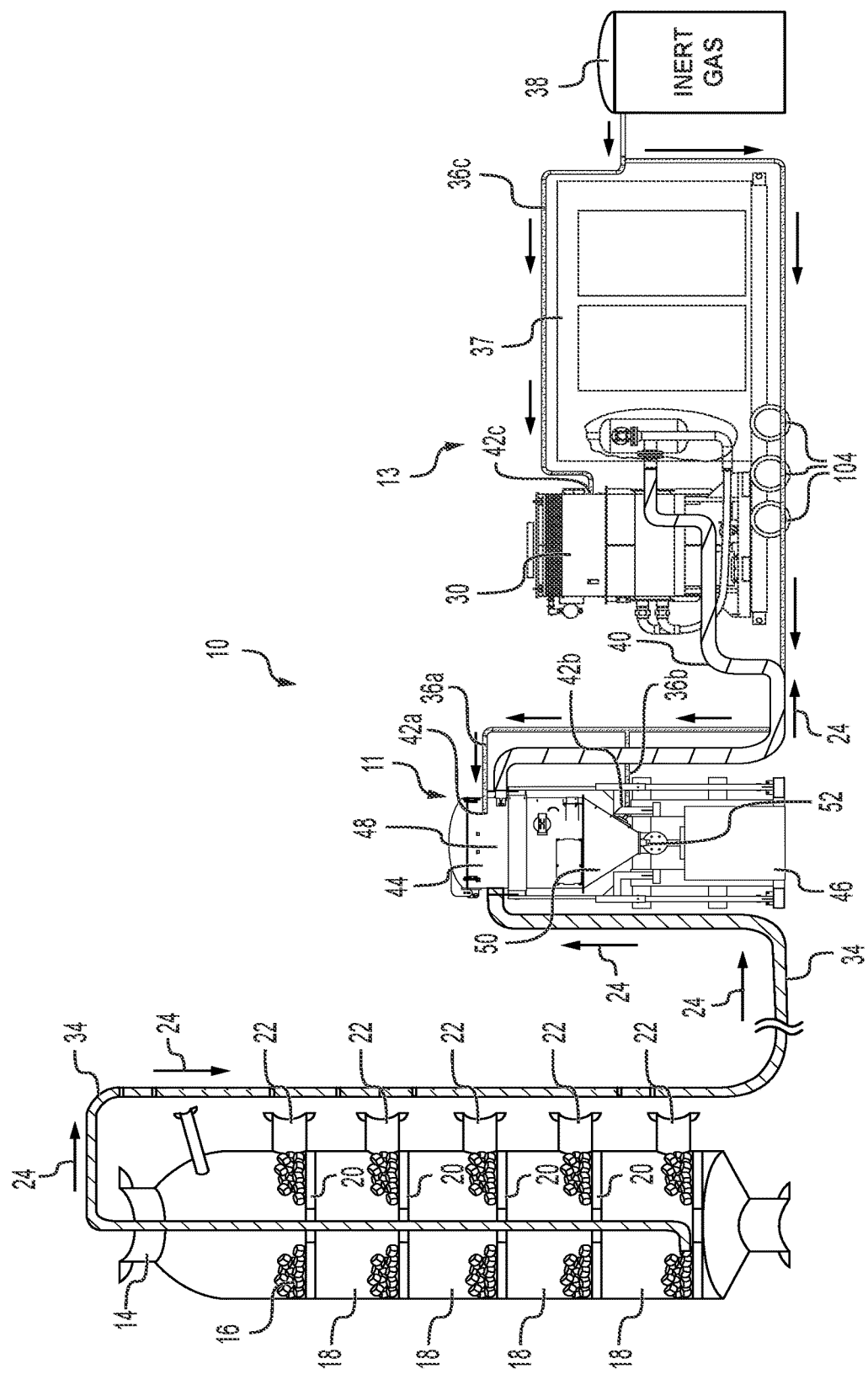
FIG. 2 is a schematic plan view of another example extraction assembly including an example material collector and an example inert gas supply used to extract pyrophoric material from an example refinery assembly, according to embodiments of the disclosure.

As shown in FIGS. 1 and 2, in some embodiments, the material collector 11 may include a material receiver 44 and a collection container 46 positioned under the material receiver 44 and configured to receive at least a portion of the undesired material 16 (e.g., the pyrophoric catalyst) from the material receiver 44, for example, such that the material receiver 44 is positioned relative to the collection container 46, such that a portion of the undesired material 16 passing into the material receiver 44 is deposited into the collection container 46. For example, as shown in FIGS. 1 and 2, the material receiver 42 may include an upper portion 48 and a lower portion 50. In some embodiments, the upper portion 48 of the material receiver 44 may be substantially cylindrical, and the lower portion 50 of the material receiver 44 may be substantially conical and may include a deposit port 52 at an apex of the lower portion 50. The undesired desired material 16 may enter the material collector 11 at the upper portion 48 of the material receiver 44 and fall via gravity to the lower portion 50 of the material receiver 44 and fall through the deposit port 52 and into the interior of the collection container 46. In some embodiments, the collection container 46 may be any type of canister, such as, for example, a canister configured to be stacked and/or easily loaded onto a trailer and transported off-site. For example, the canister may be a canister marketed under the trademark, FLO-BIN™, although other types of canisters are contemplated.

As shown in FIGS. 1 and 2, in some embodiments, the material extraction assembly 11 may include a first inert gas conduit 36a between the source of inert gas 38 and the upper portion 48 of the material receiver 44 to supply inert gas from a source of inert gas 38 to the interior of the upper portion 48 of the material receiver 44. In some embodiments, a second inert gas conduit 36b may be between the source of inert gas 38 and the lower portion 50 of the material receiver 44 to supply inert gas from the source of inert gas 38 to the interior of the lower portion 50 of the material receiver 11. In some embodiments, the upper portion 48 of the material receiver 44 may include a first inert gas inlet 42a connected to the first inert gas conduit 36a, and the lower portion 50 of the material receiver 44 may include a second inert gas inlet 42b connected to the second inert gas conduit 36b. As noted above, in some embodiments, the upper portion 48 of the interior of the material receiver 44 and/or the first inert gas inlet 42a of the material receiver 44 may be configured to induce swirl in inert gas supplied to the interior of the upper portion 48 of the material receiver 44, and/or the lower portion 50 of the interior of the material receiver 44, and/or the second inert gas inlet 42b of the material receiver 44 may be configured to induce swirl in inert gas supplied to the interior of the lower portion 50 of the material receiver 44. Such example configurations may promote distribution of the inert gas in the upper portion 48 and/or the lower portion 50 of the interior of the material receiver 44, which may enhance suppression of ignition of the pyrophoric catalyst collected in the material receiver 44. In some embodiments, supplying inert gas to the lower portion 50 of the material receiver 44 may also promote movement of the undesired material 16 (e.g., pyrophoric catalyst) toward the deposit port 52, reducing the likelihood or preventing the undesired material 16 from backing-up or clogging at the apex of the material receiver 44 and failing to drop into the collection container 46.

Figure 5:
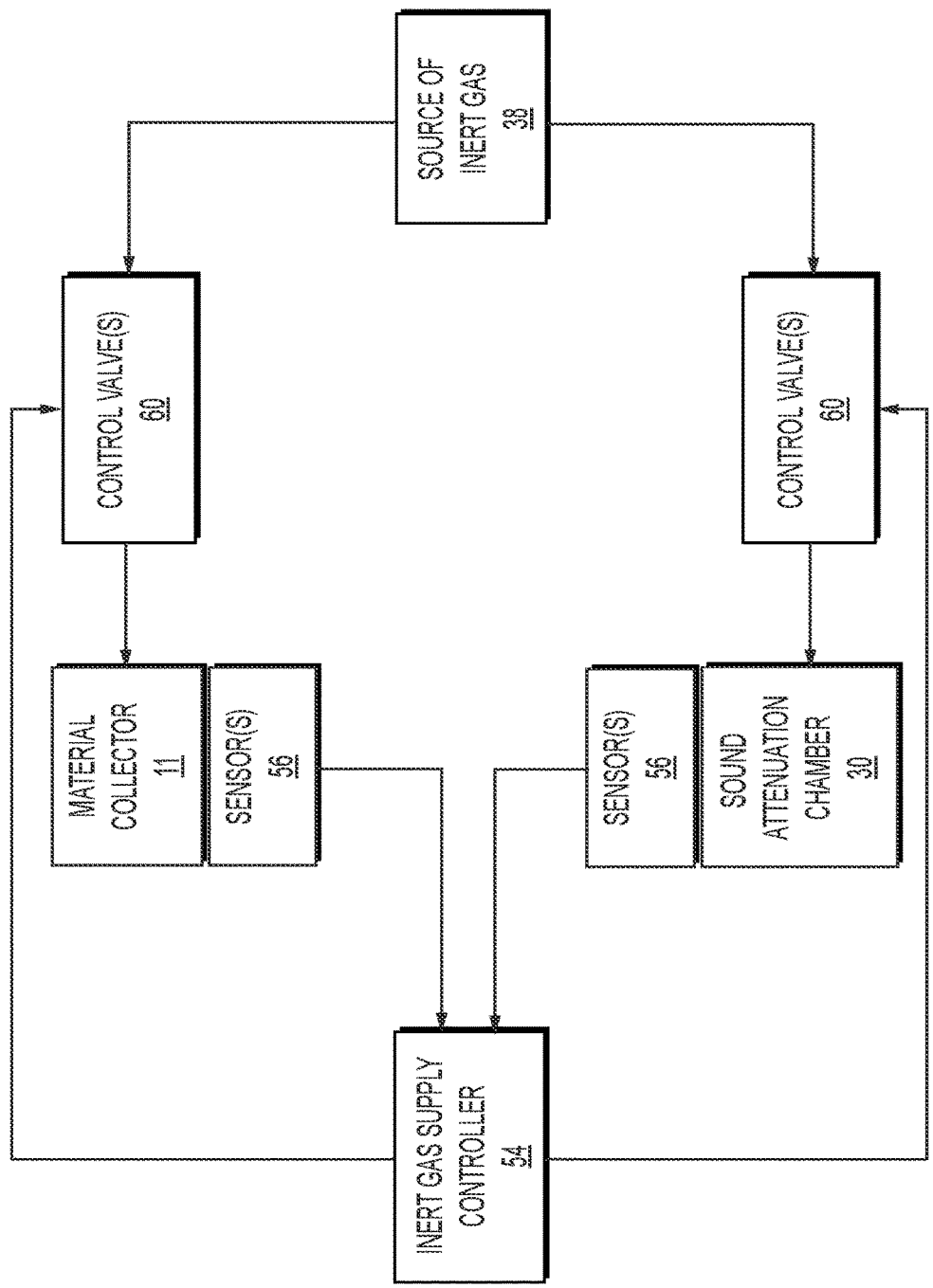
FIG. 5 is a block diagram of an example inert gas supply control assembly for semi- or fully-autonomously supplying inert gas to the material extraction assembly, according to embodiments of the disclosure.

FIG. 5 is a block diagram of an example inert gas supply control assembly 54 for semi- or fully-autonomously supplying inert gas to the material extraction assembly 10, according to embodiments of the disclosure. For example, as shown in FIG. 5, the inert gas supply control assembly 54 may include one or more sensors 56 associated with the material collector 11 and configured to generate one or more temperature signals indicative of a temperature in the interior of the material collector 11. The one or more sensors 56 may include any type of sensor configured to generate signals indicative of temperature. As shown in FIG. 5, the inert gas supply control assembly 54 may further include an inert gas supply controller 58 in communication with the one or more sensors 56 and configured to receive the one or more temperature signals indicative of a temperature in the interior of the material collector 11, and cause, based at least in part on the one or more temperature signals, supply of inert gas from the source of inert gas 38 to the interior of the material collector 11 via the first inert gas conduit 36a and/or the second inert gas conduit 36b. For example, one or more control valves 60 may be associated with the one or more inert gas conduits 36a and/or 36b, and the inert gas supply controller 58 may be configured to generate control signals causing operation of the one or more control valves 60 to switch between a closed condition preventing the flow of inert gas into the material collector 11 and an open condition allowing flow of inert gas via the inert gas conduits 36a and/or 36b to the material collector 11, (e.g., to the upper portion 48 of the material receiver 44 via the first inert gas conduit 36a and the first inert gas inlet 42a, and/or to the lower portion 50 of the material receiver 44 via the second inert gas conduit 36b and the second inert gas inlet 42b). The inert gas supply controller 58 may include computing hardware (e.g., processors, memory, storage devices, communication devices, other types of hardware devices including circuitry, etc.) and/or computing instructions (e.g., computer code) that when executed by the computing hardware cause the inert gas supply controller 58 to provide its functionality.

In some embodiments, the inert gas supply controller 58 may be configured to determine, based at least in part on the one or more temperature signals, whether the temperature in the interior of the material collector 11 (e.g., the material receiver 44) exceeds a threshold temperature, and when the temperature in the interior of the material collector 11 exceeds the threshold temperature, cause the supply of inert gas to the interior of the material collector 11 via the first inert gas conduit 36a and the first inert gas inlet 42a and/or via the second inert gas conduit 36b and the second inert gas inlet 42b, for example, by causing one or more of the control valves 60 to open. In some embodiments, the inert gas supply controller 58 may configured to determine, based at least in part on the one or more temperature signals, whether the temperature in the interior of the material collector 11 is below the threshold temperature, and when the temperature inside the interior of the material collector 11 is below the threshold temperature, discontinue the supply of inert gas to the interior of the material collector 11, for example, by causing one or more of the control valves 60 to close, thereby preventing flow of the inert gas from the source of inert gas 38 via the first inert gas conduit 36a and the first inert gas inlet 42a and/or via the second inert gas conduit 36b and the second inert gas inlet 42b, to the material collector 11.

In some embodiments, the inert gas supply control assembly 54 may be configured to semi- or fully-autonomously prevent ignition of pyrophoric material (e.g., pyrophoric catalyst) from spontaneously igniting in the material collector 11 by supplying inert gas in a sufficient quantity and/or at a sufficient pressure to suppress ignition of the pyrophoric material. For example, the threshold temperature may be 350 degrees Fahrenheit (F) or less, 250 degrees F. or less, 200 degrees F. or less, 150 degrees F. or less, 125 degrees F. or less, 100 degrees F. or less, or may range from about 60 degrees F. to about 250 degrees F., from about 60 degrees F. to about 200 degrees F., from about 60 degrees F. to about 150 degrees F., from about 70 degrees F. to about 140 degrees F., from about 80 degrees F. to about 130 degrees F., from about 90 degrees F. to about 120 degrees F., or from about 100 degrees F. to about 110 degrees F.

In some embodiments, in addition to, or as an alternative to inert gas, a cooling medium may be supplied to the interior of the material collector 11 to promote suppression of ignition of the pyrophoric material. For example, the cooling medium may include one or more of dry ice, a dry ice substitute, and/or other materials known to having similar cooling characteristics. In some embodiments, in a manner at least similar to the manner described above, the cooling medium may be supplied based at least in part on the temperature of the interior of the material collector 11. In some embodiments, a cooling medium dispensing system may be provided to semi- or fully-autonomously supply the cooling medium in controlled quantities and/or controlled pressures to the interior of the material collector 11, for example, based on the temperature in the interior of the material collector 11.

As shown in FIGS. 1-4, in some embodiments, the material extraction assembly 10 may include a third inert gas conduit 36c positioned to supply inert gas from the source of inert gas 38 to the interior of the sound attenuation chamber 30. As described herein, at least a portion (e.g., a minor portion) of the undesired material 16 extracted from the source of the undesired material 16 (e.g., pyrophoric catalyst extracted from the reaction vessel 14) that is not captured by the material collector 11, may be drawn into the sound attenuation chamber 30. Inert gas and/or a cooling medium may be supplied to the sound attenuation chamber 30 in quantities and/or at pressures sufficient to prevent ignition of pyrophoric materials, such as pyrophoric catalyst received in the sound attenuation chamber 30. In some embodiments, the sound attenuation chamber 30 may include a third inert gas inlet 42c connected to the third inert gas conduit 36c, and the interior of the sound attenuation chamber 30 and/or the third inert gas inlet 42c of the sound attenuation chamber 30 may be configured to induce swirl in inert gas supplied to the interior of the sound attenuation chamber 30, which may promote distribution of the inert gas in the interior of the sound attenuation chamber 30, which may enhance suppression of ignition of the pyrophoric catalyst collected in the sound attenuation chamber 30. For example, the third inert gas inlet 42c may be oriented at a non-zero or non-perpendicular angle relative to the location at which the third inert gas inlet 42c is positioned on the sound attenuation chamber 30 to cause inert gas entering the interior of the sound attenuation chamber 30 via the third inert gas inlet 42c to swirl or circulate within the interior of the sound attenuation chamber 30. In some embodiments, the interior of the sound attenuation chamber 30 may include a deflector positioned at the third inert gas inlet 42c to cause inert gas entering the interior of the sound attenuation chamber 30 via the third inert gas inlet 42c to swirl or circulate within the interior of the sound attenuation chamber 30.

As shown in FIG. 5, the inert gas supply control assembly 54 may include one or more sensors 56 associated with the sound attenuation chamber 30 and configured to generate one or more temperature signals indicative of a temperature in the interior of the sound attenuation chamber 30. The one or more sensors 56 may include any type of sensor configured to generate signals indicative of temperature. The inert gas supply controller 58 may be in communication with the one or more sensors 56 associated with the sound attenuation chamber 30 and may be configured to receive the one or more temperature signals indicative of a temperature in the interior of the sound attenuation chamber 30, and cause, based at least in part on the one or more temperature signals, supply of inert gas from the source of inert gas 38 to the interior of the sound attenuation chamber 30 via the third inert gas conduit 36c. For example, one or more control valves 60 may be associated with the third inert gas conduit 36c, and the inert gas supply controller 58 may be configured to generate control signals causing operation of the one or more control valves 60 to switch between a closed condition preventing the flow of inert gas into the sound attenuation chamber 30 and an open condition allowing flow of inert gas via the third inert gas conduit 36c to the sound attenuation chamber 30.

In some embodiments, the inert gas supply controller 58 may be configured to determine, based at least in part on the one or more temperature signals, whether the temperature in the interior of the sound attenuation chamber 30 exceeds a threshold temperature, and when the temperature in the interior of the sound attenuation chamber 30 exceeds the threshold temperature, cause the supply of inert gas to the interior of the sound attenuation chamber 30 via the third inert gas conduit 36c and the third inert gas inlet 42c, for example, by causing a control valve 60 associated with the third inert gas conduit 36c to open. In some embodiments, the inert gas supply controller 58 may configured to determine, based at least in part on the one or more temperature signals, whether the temperature in the interior of the sound attenuation chamber 30 is below the threshold temperature, and when the temperature in the interior of the sound attenuation chamber 30 is below the threshold temperature, discontinue the supply of inert gas to the interior of the sound attenuation chamber 30, for example, by causing the associated control valve 60 to close, thereby preventing flow of the inert gas from the source of inert gas 38 via the third inert gas conduit 36c to the sound attenuation chamber collector 30. In some embodiments, the inert gas supply control assembly 54 may be configured to semi- or fully-autonomously prevent ignition of pyrophoric material (e.g., pyrophoric catalyst) from spontaneously igniting in the sound attenuation chamber by supplying inert gas in a sufficient quantity and/or at a sufficient pressure to suppress ignition of the pyrophoric material. In some embodiments, the threshold temperature in the interior of the sound attenuation chamber 30 may fall within one or more of the threshold temperature ranges described herein.

As described herein with respect to FIGS. 10E, 10F, 11A, and 11B, for example, some embodiments of the sound attenuation chamber 30 may include filter media at least partially enclosed in the sound attenuation chamber 30 and configured to filter the vacuum flow 34 entering the sound attenuation chamber 30. The sound attenuation chamber 30 further may include one or more jet generators positioned relative to the sound attenuation chamber 30 to generate jets of fluid flow directed toward the filter media to at least partially maintain filtration capacity of the filter media, for example, by dislodging any particulates (e.g., of the undesired material 16, such as the pyrophoric catalyst) entrained in the vacuum flow 24 that reaches the sound attenuation chamber 30. In some embodiments, the third inert gas conduit 36c may be positioned to provide flow between the source of inert gas 38 and the jet generators. In some embodiments, supplying inert gas to the sound attenuation chamber 30 may include supplying inert gas from the source of inert gas 38 to the jet generators by adding inert gas to compressed fluid supplied to the jet generators and/or substituting inert gas for the compressed fluid supplied to the jet generators.

In some embodiments, in addition to, or as an alternative to inert gas, a cooling medium may be supplied to the interior of the sound attenuation chamber 30 to promote suppression of ignition of the pyrophoric material. For example, the cooling medium may include one or more of dry ice, a dry ice substitute, and/or other materials known to having similar cooling characteristics. In some embodiments, in a manner at least similar to the manner described above, the cooling medium may be supplied based at least in part on the temperature of the interior of the sound attenuation chamber 30. In some embodiments, a cooling medium dispensing system may be provided to semi- or fully-autonomously supply the cooling medium in controlled quantities and/or controlled pressures to the interior of the sound attenuation chamber 30, for example, based on the temperature in the interior of the sound attenuation chamber 30.

Figure 4:
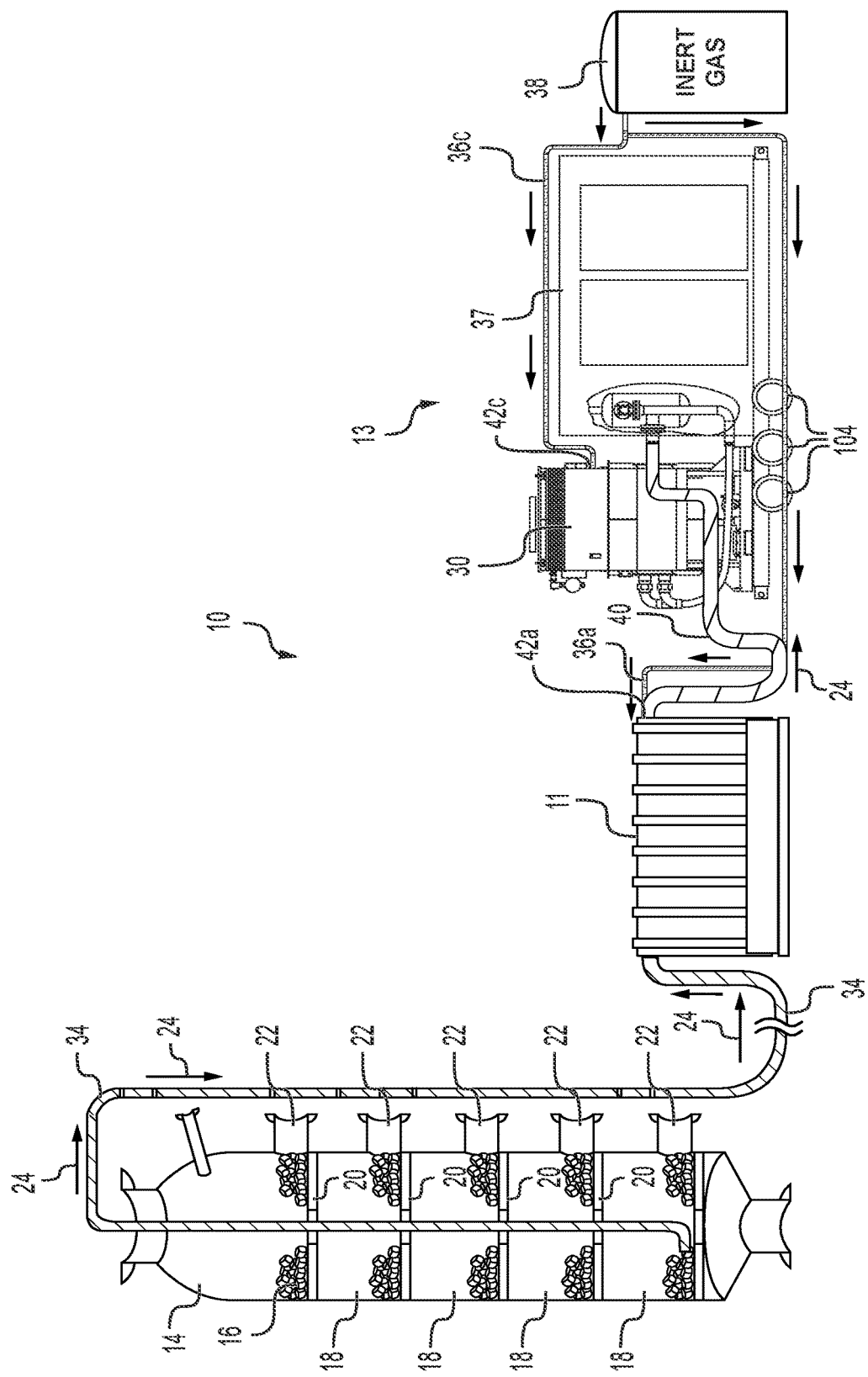
FIG. 4 is a schematic plan view of another example extraction assembly including another example material collector and an example inert gas supply used to extract pyrophoric material from an example refinery assembly, according to embodiments of the disclosure.

FIG. 2 and FIG. 4 are schematic plan views of other example material extraction assemblies 10 including an example material collector 11 and an example source of inert gas 38 used to extract pyrophoric material from an example reaction vessel 14 (e.g., a refinery assembly or refinery tower), according to embodiments of the disclosure. As described in detail with respect to FIGS. 13A through 13G, in some embodiments, the material extraction assembly 10 may include a compressor and vacuum generation assembly 13, a sound attenuating chamber 30 connected to the compressor and vacuum generation assembly 13, and a material collector 11. The compressor and vacuum generation assembly 13 may include a compressor housing 37 having an interior containing at least the vacuum source 28 and the fluid source 32. The fluid source 32 may be, for example, a compressor or other device configured to provide pressurized fluid to the vacuum source 28. In some embodiments, one or more of the material collector 11, the compressor and vacuum generation assembly 13 containing the vacuum source 28 and the fluid source 32, or the sound attenuation chamber 30 may be configured to be easily transported between geographical locations for use at different environments. Packaging multiple pieces of the compressor and vacuum generation assembly 13, such as the vacuum source 28, fluid source 32, and other components (see, e.g., FIG. 13A-FIG. 13G) together within the compressor housing 37 may allow the material extraction system 10 to have a more compact footprint. A smaller footprint may allow the material extraction system 10 to be, for example, supported on one or more trailers including wheels, tracks, skids, or other devices for facilitating movement between geographical locations, and to occupy less space at those locations.

The example material extraction assemblies 10 shown in FIG. 2 and FIG. 4 may be configured to supply inert gas from the source of inert gas 38 in a manner at least similar to the example material extraction assembly 10 shown in FIG. 1. For example, as described above, the material extraction assembly 10 shown in FIG. 2 may include one or more inert gas conduits, such as conduits 36a, 36b, and/or 36c, positioned to supply inert gas from an inert gas source 38 to one or more of the material collector 11 or the sound attenuation chamber 30. The inert gas source 38 may include a container or assembly configured to supply one or more pressurized inert gases to the one or more insert gas conduits 36a, 36b, and/or 36c. The one or more inert gases may include one or more of nitrogen, helium, neon, argon, krypton, xenon, radon, or any other substances having similar ignition-suppression characteristics. The one or more inert gases may be supplied to one or more of the material collector 11 or the sound attenuation chamber 30 in quantities and/or at pressures sufficient to prevent ignition of pyrophoric materials such as pyrophoric catalyst in the material collector 11 and/or the sound attenuation chamber 30.

Figure 3:
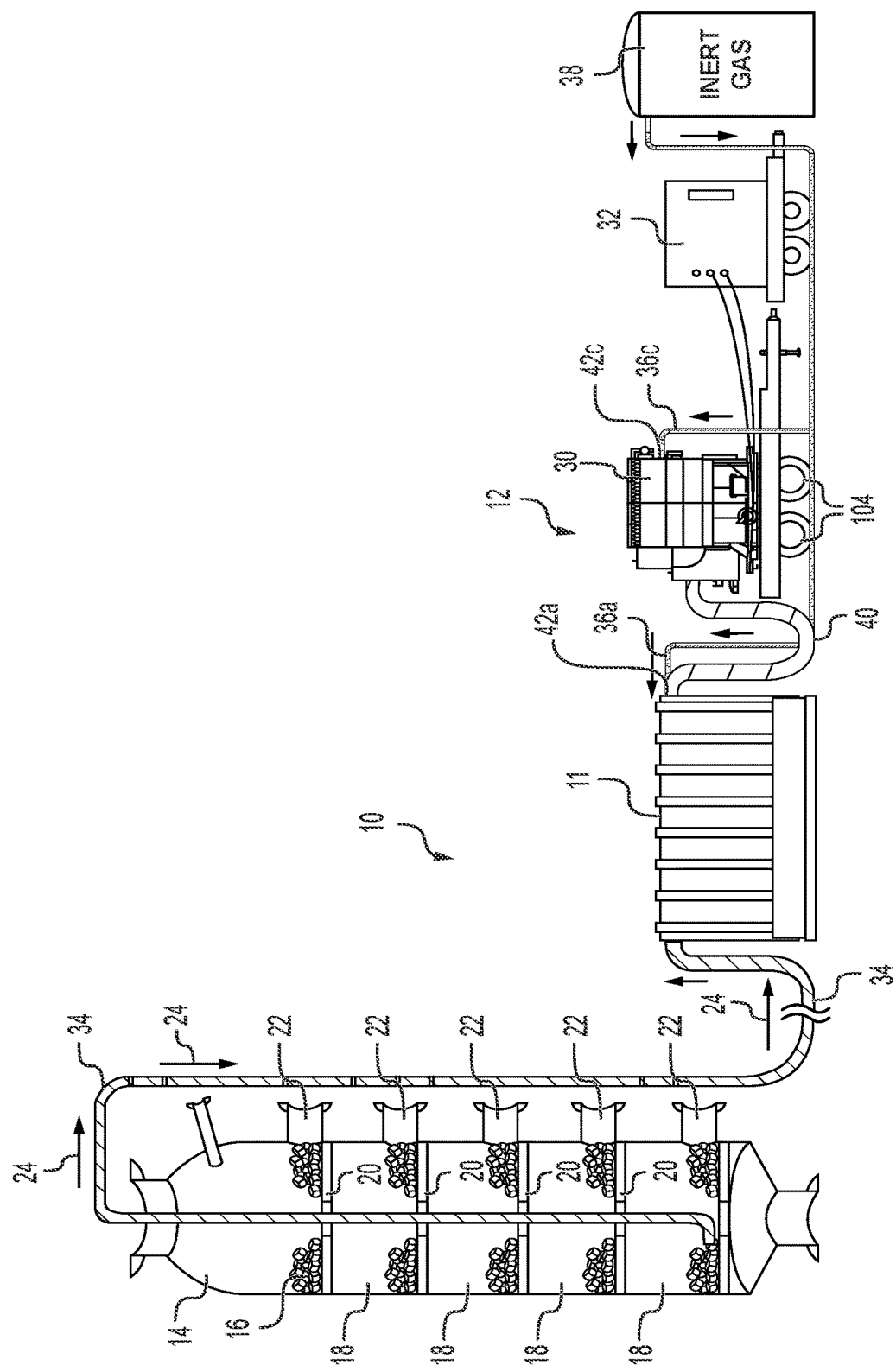
FIG. 3 is a schematic plan view of another example extraction assembly including another example material collector and an example inert gas supply used to extract pyrophoric material from an example refinery assembly, according to embodiments of the disclosure.

FIG. 3 is a schematic side view of another example material extraction assembly 10 including another example material collector 11 and an example source of inert gas 38 used to extract a pyrophoric material from an example reaction vessel 14 (e.g., a refinery assembly or refinery tower), according to embodiments of the disclosure, and FIG. 4 is a schematic side view of another example material extraction assembly 10 including another example material collector 11 and an example source of inert gas 38 used to extract pyrophoric material from an example reaction vessel 14, according to embodiments of the disclosure. The examples of material extraction assembly 10 shown in FIG. 3 and FIG. 4 may include at least some aspects that are similar to, or the same as, aspects of the example material extraction assemblies 10 shown in FIG. 1 and FIG. 2, respectively, except that the example material collectors 11 shown in FIG. 3 and FIG. 4 may differ from the example material collectors 11 shown in FIG. 1 and FIG. 2, respectively. For example, the example material collectors 11 shown in FIG. 3 and FIG. 4 may be substantially consistent with the example material collectors 11 shown and described herein with respect to FIGS. 6A, 6B, and 6C. In some embodiments, as shown in FIG. 3 and FIG. 4, a single inert gas conduit 36a may supply inert gas from the source of inert gas 38 to the interior of the material collector 11 via a first inert gas inlet 42a. Although only a single inert gas conduit 36a and inert gas port 42a is shown supplying inert gas to the material collector 11 shown in FIG. 3 and in FIG. 4, one or more additional inert gas conduits and corresponding inert gas inlets may be provided to supply inert gas to the interior of the material collector 11, for example, in order to distribute the inert gas more fully or more evenly throughout the interior of the material collector 11.

In some embodiments, the material extraction assembly 10 may be used for extraction of a variety of different materials from a variety of different environments. For example, the intentional generation or production of some materials for desired intermediate or final products may result in the deposit or accumulation of by-products or other materials used to facilitate the production of the desired products that need to be removed from the environment. In some embodiments, the systems, assemblies, apparatuses, and methods may provide efficient extraction of the material to be removed from various environments, such as, for example, work sites, industrial sites, commercial sites, residential sites, natural sites, etc. The industrial site may include, for example, chemical reaction towers (or other types of reaction vessels) in which chemical reactions are performed to obtain desirable products. Waste material may be generated as a byproduct from the chemical reactions.

For example, some types of chemical reactions may utilize a catalyst material to mediate the chemical reactions, for example, by causing the reaction to provide greater product yields, by causing the reaction to occur and/or increasing/decreasing a rate at which the reaction occurs, etc. In a chemical reaction tower, the catalyst material may be loaded into the chemical tower at various tower levels. Other materials, such as, for example, gasses, liquids, etc., may thereafter be introduced into the tower. The presence of the catalyst material may cause, mediate, or otherwise facilitate a desired chemical reaction to generate a desired product. The chemical reaction may cause the reactivity, morphology, or other properties of the catalyst material to change, thereby reducing the ability of the catalyst to perform its function. For example, the catalyst may be used up or otherwise render its presence in the chemical tower undesirable.

In other examples, some types of chemical reactions may utilize devices and/or materials to facilitate the chemical reactions. For example, a packing material may increase the surface area and number of edge surfaces over which the reaction occurs to improve reaction efficiency and/or to increase/decrease a rate at which the reaction occurs, increase the reaction product yield, etc. In a chemical reaction tower, the facilitating material may be, for example, pall rings that may be loaded into the chemical tower at various tower levels and distributed as packing. The pall rings may include and/or be formed from one or more of metal, ceramic, or polymeric materials. The pall rings may have one or more of any known pall ring sizes, configurations, and/or geometries.

The chemical reaction may also interact with the materials out of which the chemical reaction tower is formed. For example, some chemical reaction towers may be formed from concrete and steel. Chemical reaction towers may be formed from any number and types of materials. The catalyst or the other materials in the chemical reaction tower may react or otherwise interact with these materials of the chemical reaction tower, forming additional undesired products, which may be referred to as "tower products."

The undesired reaction products and/or the tower products, which may be referred to as "waste material," may move within the chemical reaction tower. For example, some of this material may partially or completely cover the catalyst or other important features of the chemical reaction tower, thereby reducing the effectiveness of the catalyst, for example, even in cases where the catalyst is not depleted but remains active. In some examples, the undesired reaction products and/or the tower products, the "waste material," may partially or completely cover the packing material (e.g., the pall rings) or other important features of the chemical reaction tower, thereby reducing the effectiveness of the packing material. This accumulation may inhibit the reactions of the chemical reaction tower, for example, even in instances where the packing material itself is not depleted or damaged.

The presence of the depleted catalyst material, catalyst or packing material covered in waste material, and/or the waste material itself, may impair future functioning of the chemical reaction tower. For example, the presence of this material in the chemical reaction tower may reduce the conversion efficiency (e.g., the quantity of desirable products produced versus the quantity of input materials) of the chemical reactions, increase a reaction time, may render the chemical reactions more difficult to control (or prevent them from occurring), and/or may otherwise reduce the ability of the chemical reaction tower to perform its intended function.

Some embodiments disclosed herein may relate to systems, assemblies, apparatuses, and methods for extracting material from a source of the materials, such as, for example, removing undesired material from environments, such as, for example, industrial environments. In some embodiments, the extracted material may include one or more of catalyst (e.g., pyrophoric catalyst), pall rings, beads, balls, pellets, sand, or bricks. Embodiments may also relate to systems, assemblies, apparatuses, and methods for conveying and depositing new and/or recycled material from a source of the material. In some embodiments, the conveyed or deposited material may include one or more of catalyst, pall rings, beads, balls, pellets, sand, or bricks. For example, some embodiments disclosed herein may facilitate extraction of undesired materials or deposition of new and/or recycled material from or to an industrial environment using, for example, a high-pressure vacuum flow. Removing undesired material from an industrial environment using a high-pressure vacuum flow may provide for time-efficient removal of the undesired materials and/or may reduce or prevent contamination of the ambient environment with the undesired material or portions thereof. Similarly, depositing new and/or recycled materials, such as packing material, using a high-pressure vacuum flow may provide for time-efficient replacement of said materials in the industrial environment.

Industrial environments, chemical reaction towers, and the associated material discussed herein are merely examples, and other types of environments and/or other types of materials are contemplated.

In some embodiments, one or more of the material collector 11, the compressor and vacuum generation assembly 13, or the sound attenuation chamber 30 may be arranged to form a flow path beginning at the source of the material (e.g., at the reaction vessel 14) and terminating at the sound attenuation chamber 30. The flow path may be used to extract undesired material 16 from the reaction vessel 14 and, in some embodiments, limit contamination of the ambient environment. For example, the vacuum source 28 may generate a vacuum in the flow path, thereby generating a fluid flow along the flow path. The fluid flow may be used to apply suction proximate the undesired material 16 in the reaction vessel 14 to draw the undesired material 16 into the flow path. The fluid flow in the flow path may cause the undesired material 16 to flow out of reaction vessel 14 and into material collector 11, thereby separating at least a portion of the undesired material 16 from the environment. In some embodiments, a major portion of the undesired material 16 may be deposited in the material collector 36. In some embodiments, a minor portion of the undesired material 16 may flow from the material collector 11, through the vacuum source 28, and into the sound attenuation chamber 30. In some embodiments, the sound attenuation chamber 30 may be configured to remove (or reduce) the minor portion of the undesired material 16 in the fluid flow prior to the fluid flow being exhausted into the ambient environment.

In some embodiments, to form the flow path, the material collector 11 may be pneumatically connected to the source of the undesired material (e.g., the reaction vessel 14). In some embodiments, the pneumatic connection between reaction vessel 14 may be formed using a conduit 26, which may include a suction hose, a suction manifold, and/or other conduit. For example, a suction manifold may be connected to a material collector 11, or the suction manifold may be connected to multiple reaction vessel ports 22 of the reaction vessel 14, thereby pneumatically connecting the material collector 11 to multiple locations of the reaction vessel 14. For example, the interior of the material collector 11 may be pneumatically connected to the reaction vessel 14. Pneumatically connecting the material collector 11 to a single location on the reaction vessel 14, may direct the full suction force along a single flow path. Alternately, pneumatically connecting the material collector 11 to multiple locations of reaction vessel 14 may facilitate extraction of undesired material 16 from each of the locations, for example, concurrently, simultaneously, sequentially, in parallel, etc.

Figure 6B:
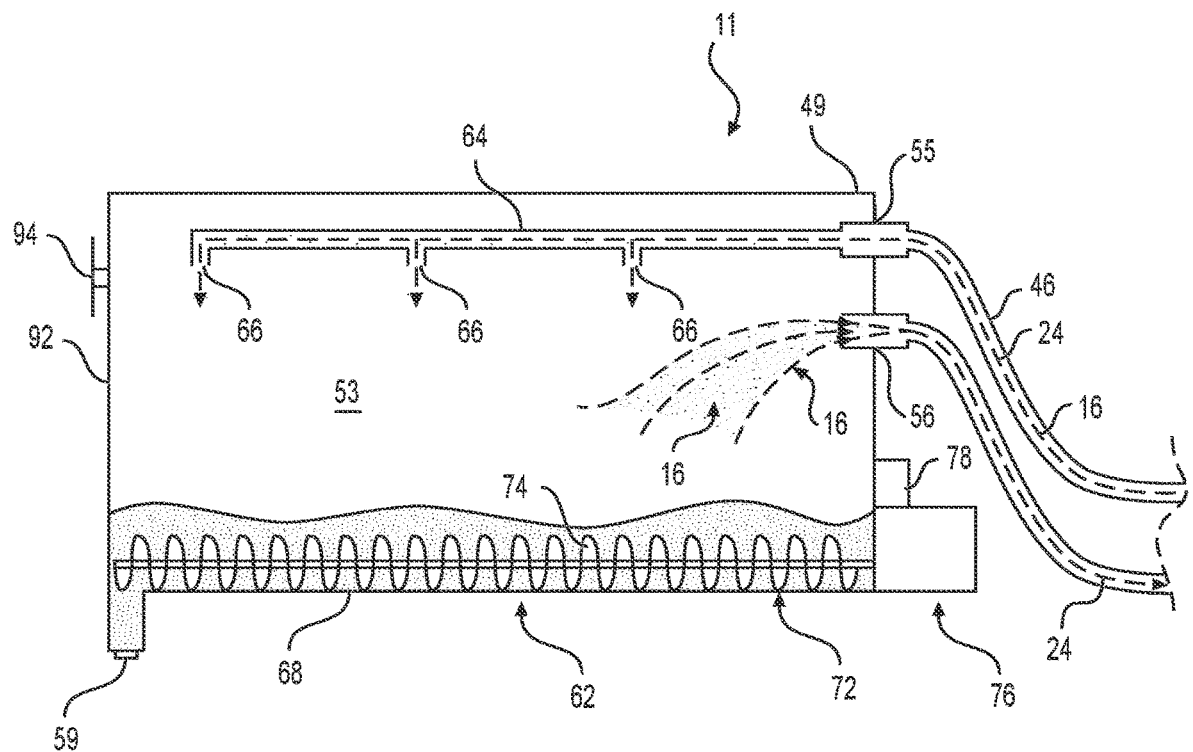
FIG. 6B is a schematic plan section view of the example material collector shown in FIG. 6A, according to embodiments of the disclosure.
Figure 6C:
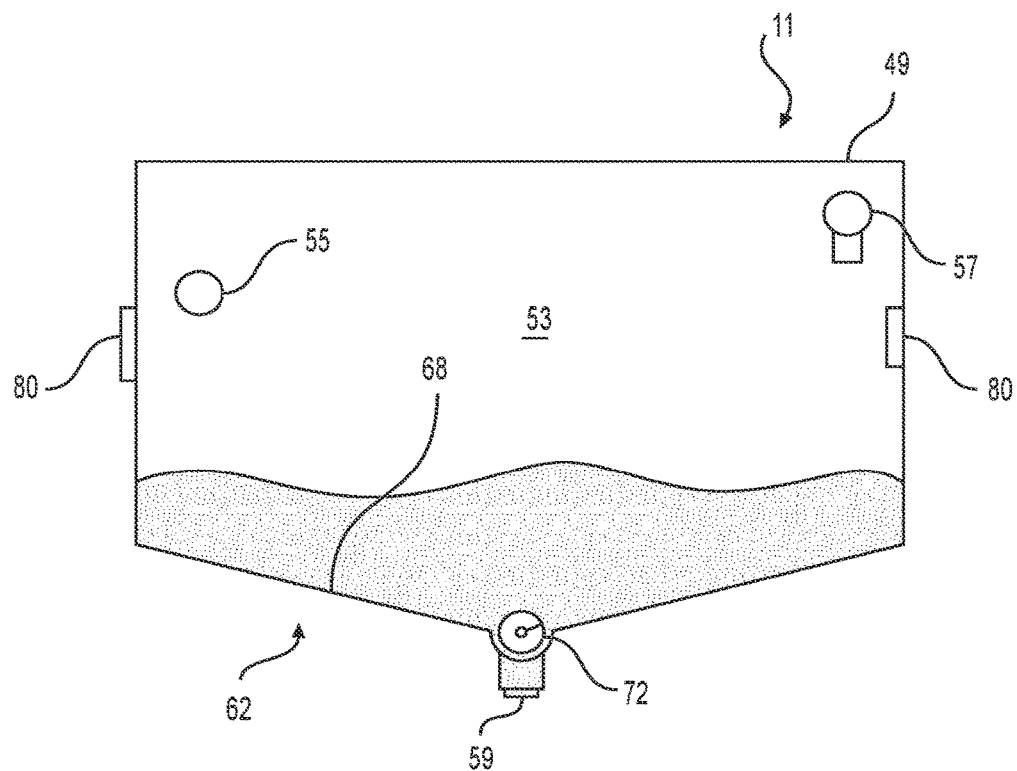
FIG. 6C is a schematic end section view of the example material collector shown in FIG. 6A, according to embodiments of the disclosure.

FIG. 6A, FIG. 6B, and FIG. 6C are schematic views of example material collectors 11, including an example vacuum box 49, according to embodiments of the disclosure. FIG. 6A is a schematic perspective end view of an example material collector 11 including an example vacuum box 49. In some embodiments, the vacuum box 49 may define a structure through which the vacuum flow 24, including entrained undesired material 16, may traverse along the flow path of the vacuum flow 24. In some embodiments, the vacuum box 49 may include a housing 51, and the housing 51 may include one or more walls at least partially defining an interior 53 of the housing 51 (see FIGS. 6B and 6C). In some embodiments, the interior 53 may be substantially sealed from the ambient environment by the housing 51, for example, so that a vacuum may be applied to the interior 53, and a flow path through the interior 53 may be established via the vacuum flow 24.

In some embodiments, as shown in FIGS. 6A, 6B, and 6C, a plurality of ports may be provided in/on the housing 51 to facilitate the flow of fluid into and out of the interior 53 of the housing 51. For example, each of the ports may (i) facilitate access to the interior 53, (ii) facilitate connection of conduits or other structures to provide fluid flow through the interior 53 along a flow path with other components of the material extraction assembly 10, and/or (iii) to facilitate removal of portions of undesired material 16 from the interior 53.

For example, the ports may include an inlet port 55, a vacuum port 57, and a discharge port 59. The inlet port 55 may be positioned on the housing 51 and configured to allow access to the interior 53 from outside the housing 51. The inlet port 55 may include an aperture through a wall of the housing 51 that facilitates pneumatic connection of the interior 53 to other components of the material extraction assembly 10. In some embodiments, the inlet port 55 may be pneumatically connected to a suction manifold, the reaction vessel ports 22, and/or to one or more access devices, for example, to pneumatically connect the interior 53 to one or more of the zones 18 of the reaction vessel 14. When connected to these reaction vessel ports 22, fluid flow including undesired material 16 from the reaction vessel 14 may flow into the interior 53 through the inlet port 55.

As shown in FIG. 6B, in some embodiments, the inlet port 55 may be connected to one or more conduits 61 and/or other fluid flow components to form a flow path to various locations outside the housing 51. In some embodiments, the inlet port 55 may be connected to the one or more conduits 61 to connect a location where the inlet port 55 passes through housing 51 to a location that is more easily accessible for a person to secure pneumatic connections between the inlet port 55 and other components of the material extraction assembly 10. For example, with reference to FIG. 6A, the inlet port 55 may extend through a wall of the housing 51 toward the top of the housing 51 and may include conduits 61 to enable the inlet port 55 to be accessible to a person located at a lower portion 62 of the material collector 11.

Applicant has recognized that the vacuum box 49 may be able to store only a limited quantity of material and that the amount of the limited quantity may depend, for example, on how the material is distributed in the interior 53 of the housing 51. For example, if material is deposited in the interior 53 near locations where fluid flow may exit the interior 53, significant quantities of the material in the interior 53 may be drawn out of the interior 53, rather than being retained in the vacuum box 49. The reaction vessel 14 (or other sources of material to be extracted) may include a greater volume of material than the vacuum box 49 is able to hold.

In some embodiments, the vacuum box 49 may be configured to facilitate distribution of material within (e.g., throughout) the interior 53 of the vacuum box 49. Distributing the material in the interior 53 may increase the amount of material that may be retained in the interior 53 without increasing the rate at which the material exits vacuum box 49 due to fluid flow through the interior 53 of the vacuum box 49. This may result in the vacuum box 49 having an increased effective material capacity (e.g., the maximum material capacity at which the quantity of material exiting a structure passes a threshold level) as compared to other structures that do not distribute material throughout their respective interiors. The increased effective material capacity of some embodiments of the vacuum box 49 may reduce the rate at which the vacuum box 49 may need to be replaced as a result of being full due to the use of high-pressure vacuum flow 24 for material extraction. In some embodiments, the vacuum box 49 may facilitate time-efficient replacement in a material extraction assembly, so as to enable the material extraction system to substantially continuously remove undesired material 16 using multiple vacuum boxes 49.

As shown in FIG. 6B, in some embodiments, the vacuum box 49 may include a conduit 64 configured to distribute the undesired material 16 within the interior 53 of the vacuum box 49. For example, the conduit 64 may be positioned in the interior 53 and connected to a portion of the inlet port 55 that passes through a wall of the housing 51, so as to position the fluid flow inside the interior 53 of the housing 51. In some embodiments, the conduit 64 may include multiple conduit ports 66 to facilitate distribution of the undesired material 16 within the interior 53 of the housing 51, for example, by directing the fluid flow from the reaction vessel 14 traveling along the flow path to multiple locations within the interior 53 of the housing 51. The multiple locations may be distributed along the length and/or width of the vacuum box 49, for example, so that the undesired material 16 entrained in vacuum flow 24 is distributed throughout the interior 53 (e.g., rather than being generally deposited at a single location). The conduit ports 66 may be positioned to direct the undesired material 16 in the vacuum flow 24 toward the floor 68 of the housing 51, which may, in some embodiments, be shaped (e.g., V-shaped) to cause the undesired material 16 to flow toward the center of the floor 68, for example, as shown in FIG. 6C. In some embodiments, the positioning of the conduit ports 66 may cause a major portion of the undesired material 16 to fall via gravity to the floor 68. For example, by being directed toward floor 68, the undesired material 16 entrained in the vacuum flow 24 may fall below the vacuum port 57, rendering the undesired material 16 less likely to exit the interior 53 of the housing 51 due to the force of gravity.

In some embodiments, the vacuum port 57 may be positioned on the housing 51 to facilitate access to the interior 53 from outside the housing 51, for example, to facilitate the high-pressure vacuum flow 26 to be applied to the interior 53 of the housing 51. The vacuum port 57 may include an aperture passing through a wall of the housing 51 and may allow for the interior 53 to be pneumatically connected to other components of the material extraction assembly 10. In some embodiments, the vacuum port 57 may be pneumatically connected to the vacuum source 28 to enable the vacuum source 28 to apply a vacuum to the interior 53 of the housing 51. The one or more conduits 70 and/or other fluid flow components may form a flow path from the interior 53 to various locations outside the housing 51. In some embodiments, the one or more conduits 70 may be connected at a location where the vacuum port 57 passes through a wall of the housing 51 to a location more easily accessible to a person to make pneumatic connections between the vacuum port 57 and other components of the material extraction assembly 10. For example, as shown in FIG. 6A, the vacuum port 57 may extend through a wall of the housing 51 toward the top of the housing 51 and may include conduits 70 to enable the vacuum port 57 to be accessible to a person toward the lower portion 62 of the material collector 11.

In some embodiments, the interior 53 may be placed along the flow path through which the undesired material 16 flows. In some embodiments, the inlet port 55 and the vacuum port 57 may be positioned with respect to the interior 53 of the housing 51 to establish a flow path into and out of the interior 53 of the housing 51. The flow path may cause fluid flow directed into the inlet port 55 to flow through the interior 53 and out the vacuum port 57. The flow path through the interior 53 may be placed along the flow path through the material extraction assembly 10. The flow path may be used in combination with other flow paths, for example, flow paths parallel to one another, to enhance the rate at which undesired material may be removed, to enhance the strength of the applied high-pressure vacuum flow 24 to facilitate removal of materials presenting a challenge to extraction (e.g., materials having a higher viscosity, materials including significant solid content, etc.), or for other purposes, for example, as shown in FIG. 15.

In some embodiments, the vacuum box 49 may be configured to move the undesired material 16 in the interior 53 to reduce the likelihood of it flowing out the vacuum port 57, which may improve the capacity of the vacuum box 49. For example, the vacuum box 49 may include a material mover 72 configured to move the undesired material 16 within the interior 53, for example, as shown in FIG. 6B. Moving the undesired material 16 in the interior 53 may further distribute the undesired material 16 in the interior 53, thereby further increasing the effective undesired material capacity of the vacuum box 49. In some embodiments, the material mover 72 may apply force to various portions of the undesired material 16 in the interior 53 to change the locations of the portions within the interior 53. As shown in FIG. 6B, in some embodiments, the material mover 72 may include an auger 74 and a drive unit 76 connected to the auger 74 and configured to drive (e.g., rotate) the auger 74.

In some embodiments, the auger 74 may be positioned in the interior 53 to distribute the undesired material 16 within the interior 53. The auger 74 may include a drill, one or more helical flights, and/or other structures for applying force to the undesired material 16 in the interior 53 of the housing 51. For example, when the auger 74 rotates, a drill or helical flights of the auger 74 may apply force to the undesired material 16 to move it within the interior 53. The movement caused by auger 74 may more evenly distribute the undesired material 16 within the interior 53, for example, to reduce the likelihood of the undesired material 16 flowing out the exhaust port 57. The drive unit 76 may include a motor or other type of actuator usable to rotate the auger 74 by application of a rotational force. In some embodiments, the drive unit 76 may include a hydraulic motor driven using electric power. The quantity of electric power required to rotate auger 74 by the drive unit 76 may be directly related to the quantity of undesired material 16 in the interior 53. For example, as the quantity of undesired material 16 in the interior 53 increases, it may require progressively larger amounts of electric power for the drive unit 76 to rotate the auger 74. As a result, the quantity of electrical power used by the drive unit 76 may be used to determine the load on the auger 74 and/or the quantity of the undesired material 16 in the interior 53 of the housing 51.

To manage the operation of auger 74, in some embodiments, the drive unit 76 may be operably connected to a drive controller 78, which may be coupled to system level controllers. The drive controller 78 may direct, instruct, or otherwise orchestrate operation of the drive unit 76. The drive controller 78 may include computing hardware (e.g., processors, memory, storage devices, communication devices, other types of hardware devices including circuitry, etc.) and/or computing instructions (e.g., computer code) that when executed by the computing hardware cause the drive controller 78 to provide its functionality.

Figure 7:
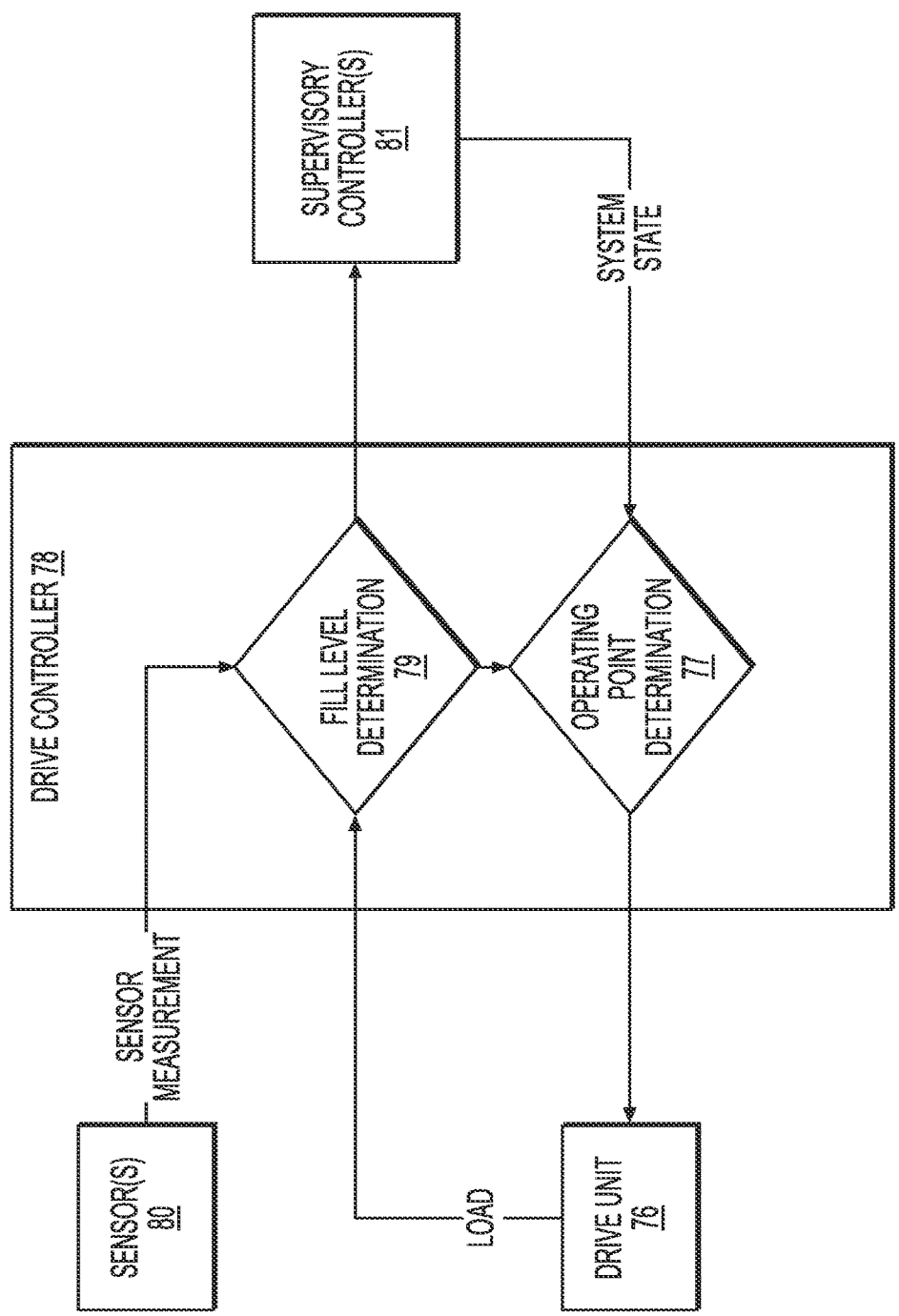
FIG. 7 is a block diagram of an example architecture for operating point determination for a material collector of a material extraction assembly, according to embodiments of the disclosure.

In some embodiments, the drive controller 78 may utilize its computing hardware to set an operating point 77 for the drive unit 76. For example, FIG. 7 is a block diagram of an example architecture for operating point 77 determination for a material collector 11 of a material extraction assembly 10, according to embodiments of the disclosure. For example, to set the operating point 77 of for the drive unit 76, the drive controller 78 may receive information from the drive unit 76 relating to the load placed on the drive unit 76 to drive, for example, the auger 74. For example, drive controller 78 may be configured to monitor the quantity of electric power used by the drive unit 76 to drive the auger 74 over time. For example, the drive unit 76 may communicate one or more signals indicative of its electrical power consumption to the drive controller 78. The drive controller 78 may include a data structure (e.g., a table, list, function, etc., stored in the computer hardware) usable to estimate the fill level 79 (e.g., a fill level determination 79 as shown in FIG. 7) of the vacuum box 49, for example, based at least in part on the electric power consumption of drive unit 76. For example, the data structure may include a lookup table that provides the fill level 79 of the vacuum box 49 as a function of its electrical power consumption.

To set the operating point 77 of the drive unit 76, in some embodiments, the drive controller 78 may obtain information from one or more sensors 80. For example, the one or more sensors 80 may be positioned at various locations on/in the housing 51 (and/or other locations) and may be operably connected to the drive controller 78 (e.g., in communication with the drive controller 78). The one or more sensors 80 may be configured to generate signals indicative of one or more physical properties, communicating the signals to the drive controller 78, and/or displaying information relating to the physical properties (or quantities determined from the measured physical properties, such as, for example, the fill level 79 of the vacuum box 49). The drive controller 78 may include a data structure (e.g., a table, list, function, etc.) usable to estimate the fill level 79 of the vacuum box 49 based at least in part on the physical properties measured with the one or more sensors 80. The data structure may include a lookup table that provides the fill level 79 of the vacuum box 49 as a function of the measured physical properties. The measured physical properties may include, for example, temperatures, depths/heights of material in the interior 53, opacities of the material, quantities of light reflected by or transmitted through the material, etc.

To measure temperatures, in some embodiments, the vacuum box 49 may include one or more sensors 80 such as thermocouples or other devices for measuring temperature. The one or more sensors 80 may be positioned to measure the temperature of the housing 51, the interior 53, or other components of the vacuum box 49. In some embodiments, the data structure may provide the fill level 79 of the vacuum box 49 as a function of, for example, the temperature of one or more portions of the vacuum box 49. In some embodiments, the one or more sensors 80 may be the same as the one or more sensors 56 described herein with respect to FIG. 5.

To measure depths or heights of the undesired material in the vacuum box 49, in some embodiments, the vacuum box 49 may include one or more sensors 80 including depth sensors, such as float sensors, interferometers, etc. The depth sensors 80 may be positioned in the interior 53, on the housing 51, and/or in other locations to measure the height of the undesired material 16 in the vacuum box 49. In some embodiments, the data structure may provide the fill level 79 of the vacuum box 49 as a function of, for example, the heights of the undesired material 16 in the vacuum box 49.

To measure available light, in some embodiments, the vacuum box 49 may include one or more sensors 80 that include photo-sensors (e.g., charge-coupled devices, etc.). The photo-sensors may be positioned to measure the intensity of light reflected by or transmitted by the undesired material 16 in the interior 53 (or other visual indicators), so as to determine the fill level 79 of the vacuum box 49. In some embodiments, the data structure may provide the fill level 79 of the vacuum box 49 as a function of, for example, the measured light intensity of the undesired material 16 in vacuum box 49.

To determine the fill level 79 of the vacuum box 49, in some embodiments, the drive controller 78 receives sensor signals from the one or more sensors 80 using one or more wireless or wired connections. The drive controller 78 may provide the measurements and/or the load on the drive unit 76 to system level controllers (e.g., supervisory controller(s)) using the one or more wireless or wired connections. The drive controller 78 may use the measurements to determine the fill level 79 of the vacuum box 48 using the data structures. Based on the determined fill level 79 and/or a state of the system (e.g., provided by system supervisory controller(s) 81), the drive controller 78 may determine an operating point 77 for the drive unit 76. The drive unit 76 may consume electric power based on the operating point 77, thereby enabling the drive controller 78 to control the rate at which undesired material 16 is moved within the vacuum box 49.

FIG. 8A is a schematic side view and FIG. 8B is a schematic end view of an example material collector 11 and an example carrier 84 for transportation and/or orientation of the material collector 11, according to embodiments of the disclosure. When in an industrial environment, for example, the vacuum box 49 may be subject to forces applied to it by the environment. To manage these forces, in some embodiments, the vacuum box 49 may include structural housing support members 82 positioned on/in the housing 51. The structural housing support members 82 may be positioned along the length of housing 51 and may at least partially encircle multiple walls of the housing 51. In some embodiments, the structural housing support members 82 may at least partially encircle three or more walls of the housing 51 (e.g., a top wall and two side walls). The structural housing support members 82 may have a thickness that extends away from the housing 51, so as to reduce the likelihood of force being directly transmitted to the housing 51. The structural housing support members 82 may enable the housing 51 to be efficiently repositioned by distributing load for moving the vacuum box 49 across the housing 51. The structural housing support members 82 may also increase the rigidity of the housing 51 (e.g., by enhancing the cross section of the housing 51, where the structural housing support members 82 are connected to the housing 51), thereby allowing the vacuum box 49 to be moved with reduced risk of damage (e.g., due to forces applied to the vacuum box 49 to move it).

In some embodiments, the vacuum box 49 may include a floor 68 having a V-shaped cross-section or other features. Such a floor 68 or other features may tend to make the housing 51 tip to one side or the other side if the housing 51 is placed directly onto a planar surface. To orient the vacuum box 49, in some embodiments, the vacuum box 49 may be provided with a carrier 84, for example, as shown in FIGS. 8A and 8B. The housing 51 and/or the structural housing support members 82 may be positioned on the carrier 84. The carrier 84 may be a structure configured to substantially maintain an upright orientation of the vacuum box 49. The carrier 84 may include a base plate 86 configured to apply force to the vacuum box 49 to move the vacuum box 49 in a manner that is unlikely to damage the vacuum box 49. In some embodiments, lifting member receivers 88 may be positioned on the base plate 86 and may extend into the base plate 86 to allow forks or other structures of heavy equipment to efficiently lift or otherwise apply force to the base plate 86. Forklifts or other types of machinery (e.g., cranes) may be capable of lifting the carrier 84 and the vacuum box 49 using the lifting member receivers 88 (or other features of the vacuum box 49). The support members 82 may be positioned between base plate 86 and the vacuum box 49 to distribute force from the base plate 86 to the vacuum box 49. The vacuum box 49 may have a floor 68 having a V-shaped cross-section, which may tend to cause the vacuum box 49 to list to one side or the other if positioned on a planar surface. The support members 82 may attach the base plate 86 to the vacuum box 49, so that when the carrier 84 is positioned on a flat surface, the vacuum box 49 is maintained in a predetermined orientation, such as an upright orientation. The base plate 86 may be provided with wheels 90 (and/or tracks and/or skids) to facilitate movement of the vacuum box 49. The wheels 90 may be positioned relative to the base plate 86 to allow the carrier 84 with the vacuum box 49 to roll while being loaded, unloaded, and moved around an environment to which the vacuum box 48 is deployed.

Once the vacuum box 49 is filled or approaches being filled with material, it may need to be unloaded before it may continue to be used. To facilitate rapid unloading of the vacuum box 49, in some embodiments, the vacuum box 49 may include a door 92 (FIG. 6B). The door 92 may substantially extend across one end of the housing 51. The door 92 may enable the interior 53 of the housing 51 to be physically accessed. The door 92 may include a handle 94 (FIG. 6B), which facilitates opening and closing of the door 92. When opened, the end of the housing 51 may be unsealed, thereby allowing for large scale access to the undesired material 16 in the housing 51. When the door 92 is closed, the interior 53 may generally be sealed. The door 92 may allow for efficient removal of undesired material 16 from the interior 53, thereby allowing for a full vacuum box 49 to be quickly emptied and returned to use for undesired material 16 extraction purposes. For example, to efficiently remove undesired material 16 from the interior 53, the door 92 may be opened, and the vacuum box 49 may be oriented, so that gravity force tends to cause material in the interior 53 to exit the housing 51 through the door 92.

Figure 9A:
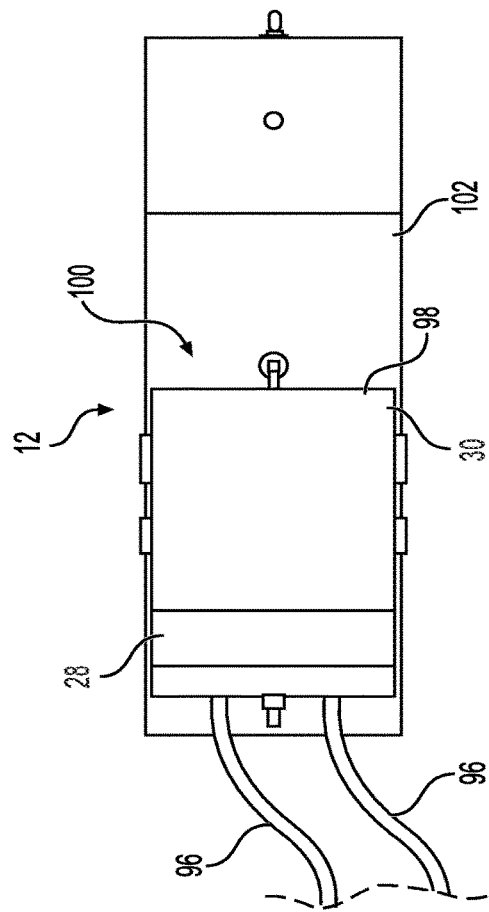
FIG. 9A is schematic top view of an example vacuum generation and sound attenuation assembly, according to embodiments of the disclosure.
Figure 9B:
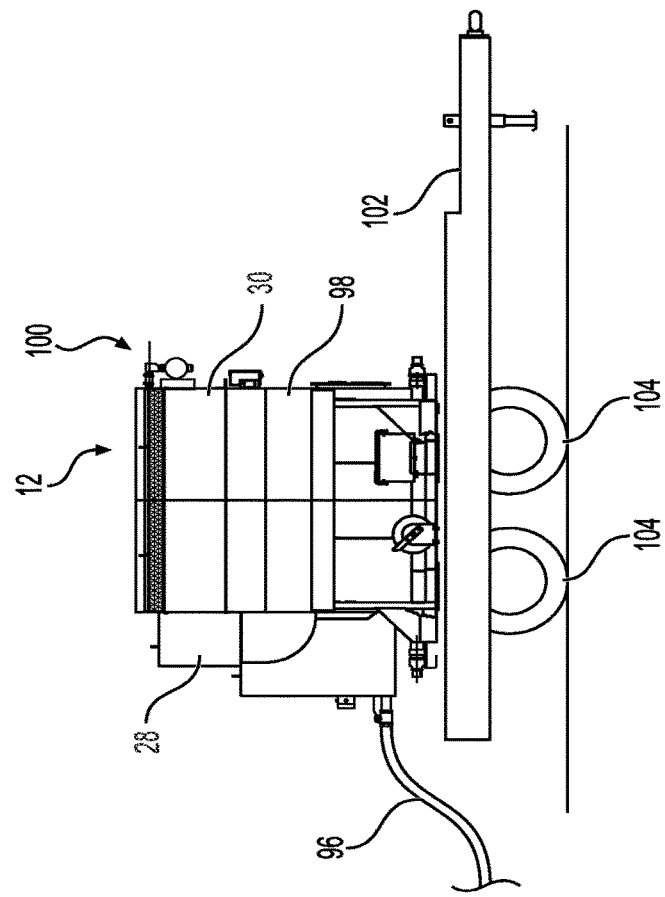
FIG. 9B is a schematic side view of the example vacuum generation and sound attenuation assembly shown in FIG. 9A, according to embodiments of the disclosure.

FIG. 9A is a schematic top view and FIG. 9B is schematic side view of an example vacuum generation and sound attenuation assembly 12, according to embodiments of the disclosure. To transfer the undesired material 16 from the reaction vessel 14 to the material collector 11, a high-pressure vacuum flow 24 may be applied to the material collector 11. In some embodiments, the vacuum generation and sound attenuation assembly 12 may include a vacuum source 28, which may be pneumatically connected to the material collector 11 by a conduit 96 (e.g., a hose). The pneumatic connection may allow the vacuum source 28 to apply a high-pressure vacuum flow 24 to the material collector 11. For example, the vacuum flow 24 may be applied to the interior 53 of the material collector 11 via the conduit 96 (or through other types of pneumatic connections between the components). The applied vacuum flow 24 may generate the vacuum induced fluid flow 24 along the flow path, thereby conveying the undesired material 16 from reaction vessel 14 to material collector 11.

As shown in FIGS. 9A and 9B, in some embodiments, the vacuum generation and sound attenuation assembly 12 may include a sound attenuation chamber 30 connected to the vacuum source 28. In some embodiments, the sound attenuation chamber 30 may include an attenuation housing 98 at least partially defining a chamber interior volume being positioned to receive at least a portion of the vacuum flow 24 from the vacuum source 28 and attenuate sound generated by the vacuum source 28 during operation. In some embodiments of the vacuum generation and sound attenuation assembly 12, the vacuum source 28 and the sound attenuation chamber 30 may be connected to one another to form a unified vacuum and attenuation module 100, for example, as shown in FIGS. 1, 3, 9A, and 9B. In some embodiments, the vacuum source 28 may be directly connected to the sound attenuation chamber 30. In the example embodiment shown, the unified vacuum and attenuation module 100 includes a chassis 102 supporting the vacuum source 28 and the sound attenuation chamber 30, and the chassis 102 may be configured to be transported between geographical locations. In some embodiments, wheels 104 may be connected to the chassis 102 to facilitate transportation, although tracks, skids, etc., may be connected to the chassis 102 instead of, or in addition to, wheels 104, depending, for example, on the type of terrain over which the vacuum and attenuation module 100 may be expected to traverse. In some embodiments, the chassis 102 may be self-propelled, for example, including a powertrain having an engine, hydraulic motor, and/or electric motor. Mounting the vacuum and attenuation module 100 on a mobile chassis 102 may facilitate rapid set-up, removal, and/or reconfiguration of the material extraction assembly 10 in accordance with embodiments of the disclosure.

In some embodiments, the vacuum source 28 may be implemented using a variety of configurations, depending, for example, on the environment to which the material collector 11 is deployed for operation. For example, in some embodiments, as shown in FIGS. 9A and 9B, the vacuum source 28 may generate a vacuum, which may be applied to the material collector 11. For example, as shown in FIG. 9C, which is a schematic view of a portion of an example vacuum generator, according to embodiments of the disclosure, the vacuum source 28 may include one or more vacuum generators 106 configured to generate the vacuum flow 24, and the vacuum generators 106 may be pneumatically connected to one or more material collectors 11, for example, via a conduit 96.

The one or more vacuum generators 106 may be configured to generate the vacuum flow 24 in different ways, depending at least in part on, for example, the environment to which the vacuum and attenuation module 100 is deployed. For example, in some embodiments, the vacuum generators 106 may be configured to generate the vacuum flow 24 using the flow of another fluid. For example, the vacuum generators 106 may be connected to a fluid source 32 (see, e.g., FIGS. 1 and 3) via a fluid supply conduit. In some such embodiments, the vacuum generators 106 may be configured to receive a pressurized supply of the fluid through the fluid supply conduit. The flow of the pressurized fluid may cause the vacuum generators 106 to generate a high-pressure vacuum flow 24, thereby applying a high-pressure vacuum flow 24 to one or more material collectors 11, which may, in turn, transfer the vacuum flow 24 from the one or more material collectors 11 to the vacuum source 28. The vacuum-induced fluid flow 24 received from the one or more material collectors 11 may include a minor portion of the undesired material 16 from the one or more material collectors 11, for example, as described herein.

Figure 9C:
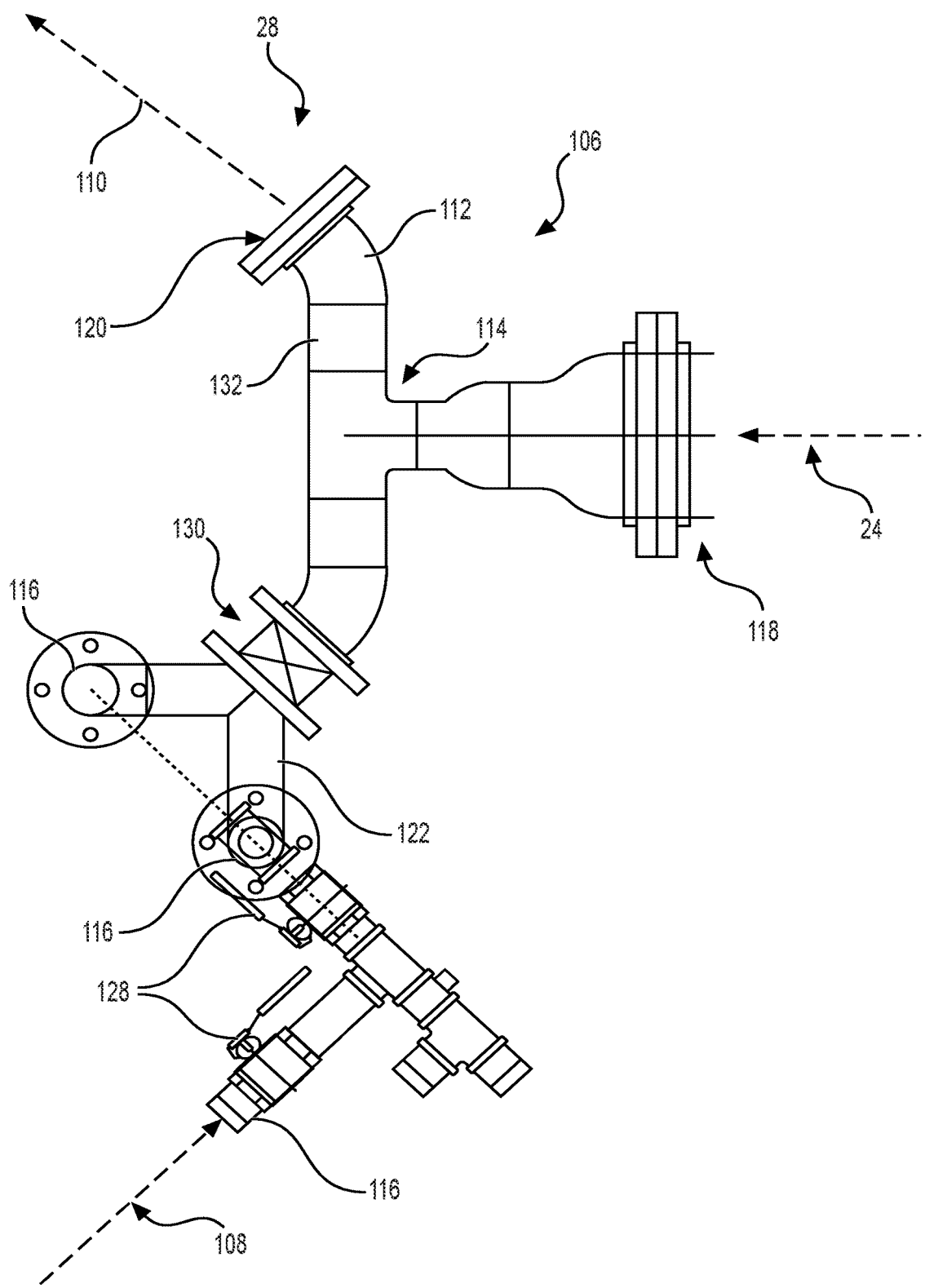
FIG. 9C is a schematic view of a portion of an example vacuum generator consistent with the example vacuum generation and sound attenuation assembly shown in FIG. 9A, according to embodiments of the disclosure.

When the one or more vacuum generators 106 generate the vacuum flow 24, in some embodiments, the vacuum generators 106 may combine vacuum-induced flow 24 and a fluid supply flow 108, and exhaust the combined flows as a vacuum exhaust fluid flow 110, for example, as schematically shown in FIG. 9C, which may include the minor portion of the undesired material 16. To limit or prevent contamination of the ambient environment with the minor portion of the undesired material 16, the vacuum generators 106 may be pneumatically connected to the sound attenuation chamber 30 via a conduit 112 (e.g., a hose). The vacuum exhaust fluid flow 110 may flow from the vacuum source 28 into the sound attenuation chamber 30 via the conduit 112. Accordingly, the vacuum source 28 may be in the fluid flow path from the reaction vessel 14 to sound attenuation chamber 30.

In some embodiments, in order to generate a more powerful high-pressure vacuum flow 24, multiple vacuum sources 28 and/or one or more sound attenuation chambers 30 may be positioned on a common chassis 102 to form a more powerful vacuum generation and sound attenuation assembly 12 (e.g., a more powerful unified vacuum and attenuation module 100). For example, multiple vacuum sources 28 may each be pneumatically connected to the (one or more) sound attenuation chambers 30, which may cause two (or more) separate flow paths (e.g., for each of the vacuum sources 28) and which may be combined at the one or more sound attenuation chambers 30. The vacuum sources 28 may be pneumatically connected to a common material collector 11 (e.g., to increase the strength of the high-pressure vacuum flow 24 through the common material collector 11) or different material collectors 11 (e.g., to enable the undesired material 16 to be transferred to multiple material collectors 11 in parallel).

In some embodiments, the vacuum source 28 may be implemented using a variety of different structures, depending at least in part on, for example, the environment to which vacuum source 28 is deployed. For example, in some embodiments, the vacuum source 28 may include one or more vacuum generators 106, each having a venturi mechanism 114 configured to receive pressurized fluid from the fluid source 32 (see FIGS. 1 and 3) and use a venturi effect to generate the vacuum flow 24 between the source of the material (e.g., the reaction vessel 14) and the vacuum generation and sound attenuation assembly 12. For example, the venturi mechanism 114 may be a vacuum generation mechanism that generates a vacuum using another fluid flow.

As schematically depicted in FIG. 9C, which shows an example vacuum generator 106 according to embodiments of the disclosure, the venturi mechanism 114 may include fluid supply ports 116 through which the supply of pressurized fluid from the fluid source 32 used to generate the vacuum is received. The venturi mechanism 114 also may include a vacuum port 118 through which the generated vacuum flow may be applied, and an exhaust port 120 through which the fluid flow used to generate the vacuum flow and any material drawn into the vacuum port 118 with the generated vacuum flow may be exhausted from the venturi mechanism 114.

In some embodiments, to generate the vacuum flow 24, the fluid supply ports 116 are pneumatically connected to the fluid source 32, which may be a mobile fluid supply. For example, the fluid supply ports 116 may be pneumatically connected to a compressed fluid stored at or in the fluid source 32. The compressed fluid may be used to generate the fluid supply flow 108 from the fluid source 32. The fluid supply flow 108 may be received through the pneumatic connection and into the fluid supply ports 116. The fluid supply flow 108 may be configured to drive the venturi mechanism 114, thereby generating the vacuum flow 24 produced by the vacuum source 28, which may be applied to other devices via the vacuum port 118.

The strength of the vacuum flow 24 generated by the venturi mechanism 114 may depend at least in part on, for example, the rate of the fluid supply flow 108 used to drive the venturi mechanism 114. In order to achieve higher vacuum pressure generation, in some embodiments, the vacuum source 28 may include a combiner 122. The combiner 122 may include a manifold for combining multiple fluid supply flows 108 received by the fluid supply ports 116 into a single fluid flow and directing the single fluid flow into the venturi mechanism 114 for generating the vacuum flow 24.

In some embodiments, to manage or control the flow rate, pressure, and/or volume of the fluid supply flow 108 into the venturi mechanism 114, which may be used to control or regulate the strength of the vacuum flow 24, fluid flow control valves 124 may be positioned between the fluid supply ports 116 and the fluid source 32. In some embodiments, the strength of the vacuum flow 24 generated by the venturi mechanism 114 may be substantially proportional to the flow rate, pressure, and/or volume of fluid flow into the fluid supply ports 116. The fluid flow control valves 124 may be used to limit (e.g., reduce, stop, etc.) the rate of fluid flow into the venturi mechanism 114 from the fluid supply ports 116.

In some embodiments, to apply the vacuum to one or more material collectors 11, the vacuum port 118 maybe pneumatically connected to the one or more material collectors 11. For example, the vacuum port 118 may be pneumatically connected to the one or more material collectors 11 to apply a vacuum to the one or more material collectors 11. Applying the vacuum to a material collector 11 may generate the vacuum-induced fluid flow 24 into the vacuum port 118 from the material collector 11. As a result, the vacuum-induced fluid flow 24 may draw undesired material 16 into the material collector 11 from the source of the material (e.g., the reaction vessel 14). A major portion of the undesired material 16 may be trapped by and within the material collector 11, and a minor portion of the undesired material 16 may flow into the vacuum source 28 in vacuum-induced fluid flow 24.

To prevent or limit contamination of the ambient environment by a portion of the undesired material 16, in some embodiments, the exhaust port 120 may be pneumatically connected to the sound attenuation chamber 30. For example, the exhaust port 120 may be pneumatically connected to the sound attenuation chamber 30, which may exhaust the vacuum-induced fluid flow 24, which may include the minor portion of the undesired material 16, and the fluid supply flow 108, for example, as a combined fluid flow into the sound attenuation chamber 30.

In some embodiments, the pneumatic connections between the ports 116, 118, and/or 120 of the vacuum source 28 may be made using conduits, such as hoses or other flexible tubular structures. The conduits may enable the pneumatic connections to be efficiently made, thereby reducing the setup time for assembling the material extraction assembly 10, for example, shown in FIGS. 1 and 3.

Applicant has recognized that the use of conduits, such as hoses or other flexible tubular structures may present a potential hazard to a person near the conduits. For example, the vacuum flow 24 generated by the vacuum source 28 may cause the conduits to flex or move due to the forces applied to them by the fluid flows. A person may be impacted by the conduits if the flexing or movement of the conduits is significant and/or unexpected. In some embodiments, the material extraction assembly 10 may reduce or eliminate one of more of the conduits, for example, by pneumatically connecting one or more of the components of the material extraction assembly 10 to one another in a manner that eliminates a need for at least some of the conduits (e.g., connecting components directly to one another). For example, the material extraction assembly 10, in some embodiments, may include direct attachment of the vacuum source 28 to one or more material collectors 11 and/or to the sound attenuation chamber 30. By directly attaching the vacuum source 28 to the one or more material collectors 11 and/or the sound attenuation chamber 30, conduits, such as hoses or other flexible structures may not be necessary. As a result, the potential hazard of impact by uncontrolled movement by the conduits or other flexible structures to a person may be reduced or eliminated.

As shown in FIG. 10A, FIG. 10B, FIG. 10C, FIG. 10D, FIG. 10E, FIG. 10F, FIG. 10G, FIG. 10H, FIG. 11A, and FIG. 11B (also FIGS. 9A, 9B, and 9C), in some embodiments, the vacuum source 28 is directly connected to the sound attenuation chamber 30 forming a unified vacuum and attenuation module 100. Directly connecting the vacuum source 28 to the sound attenuation chamber 30 may result in the vacuum-induced fluid flow to flow from the vacuum source 28 (e.g., as part of the vacuum exhaust fluid flow 110) directly into the sound attenuation chamber 30. In some such embodiments, both the vacuum source 28 and the sound attenuation chamber 30 may be rigid structures able to absorb forces applied to them by the vacuum flow 24 without significantly deforming or moving.

Applicant has recognized that the undesired material 16 may, in some instances, be challenging to move via fluid flow by virtue of, for example, the state of matter of the undesired material 16, the weight of the undesired material 16, the viscosity and/or surface tension of the undesired material 16, and/or other physical properties of the undesired material 16. Such characteristics of the undesired material 16 may limit the rate at which the undesired material 16 may flow through the fluid flow path if only a limited level of the vacuum flow 24 is generated by the vacuum generators 106. In some embodiments, the material extraction assembly 10 may be configured to provide a high-pressure vacuum flow 24, which may be suitable to expedite flow of the undesired material 16 through the fluid flow path. To expedite the flow of the undesired material 16, the vacuum source 28, in some embodiments, may include two or more vacuum generators 106, such as two, three, four, or more venturi mechanisms 114, which may be operated in parallel with each other in order to enhance the pressure of the vacuum flow 24 generated by the vacuum source 28. Each of the two or more vacuum generators 106 may be driven using the pressurized fluid from the fluid source 32 (and/or other sources of pressurized fluid, such as other fluid sources (e.g., mobile fluid supplies)).

Figure 10A:
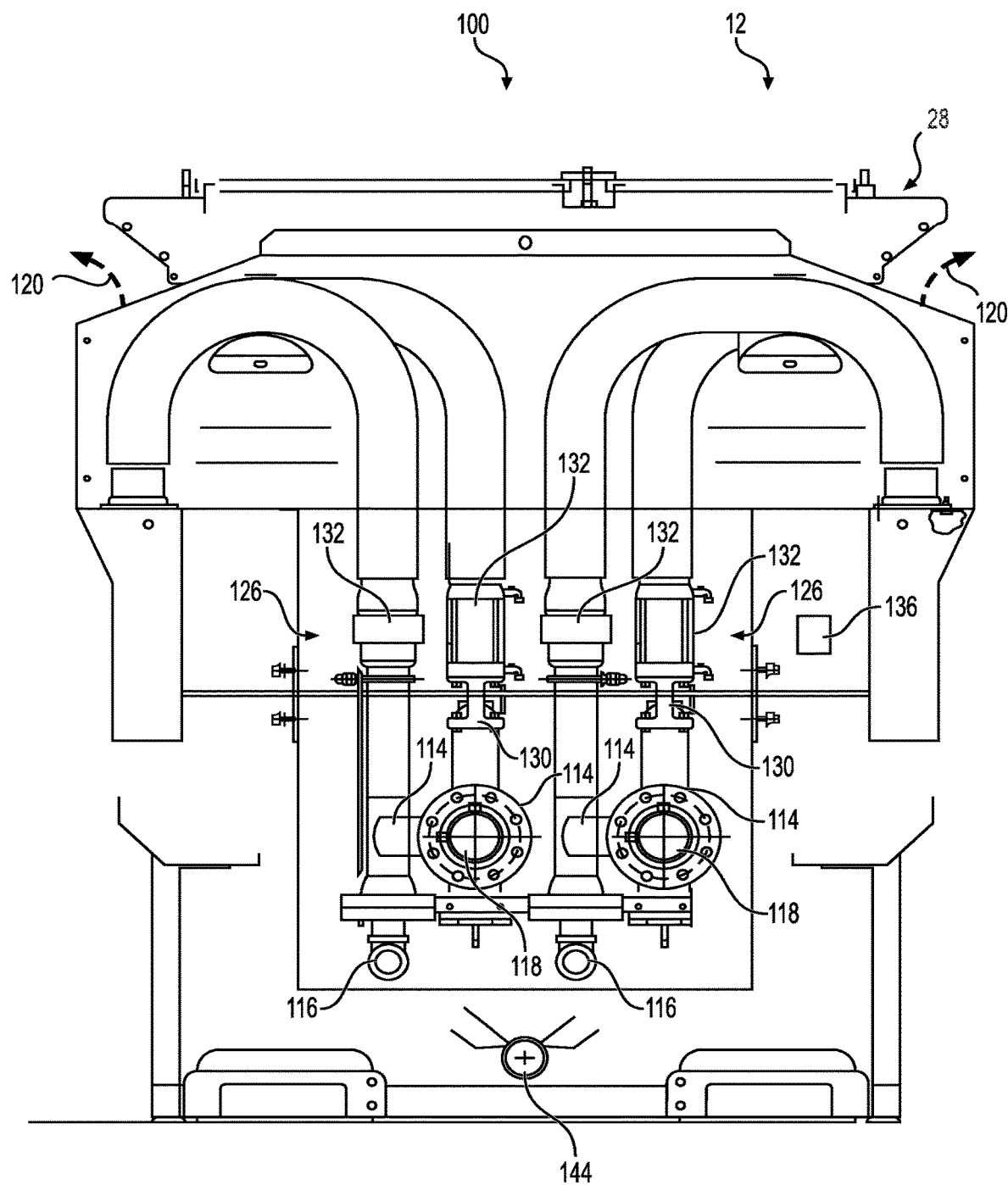
FIG. 10A is a schematic end view of an example vacuum generation and sound attenuation assembly showing an example vacuum source end, according to embodiments of the disclosure.
Figure 10B:
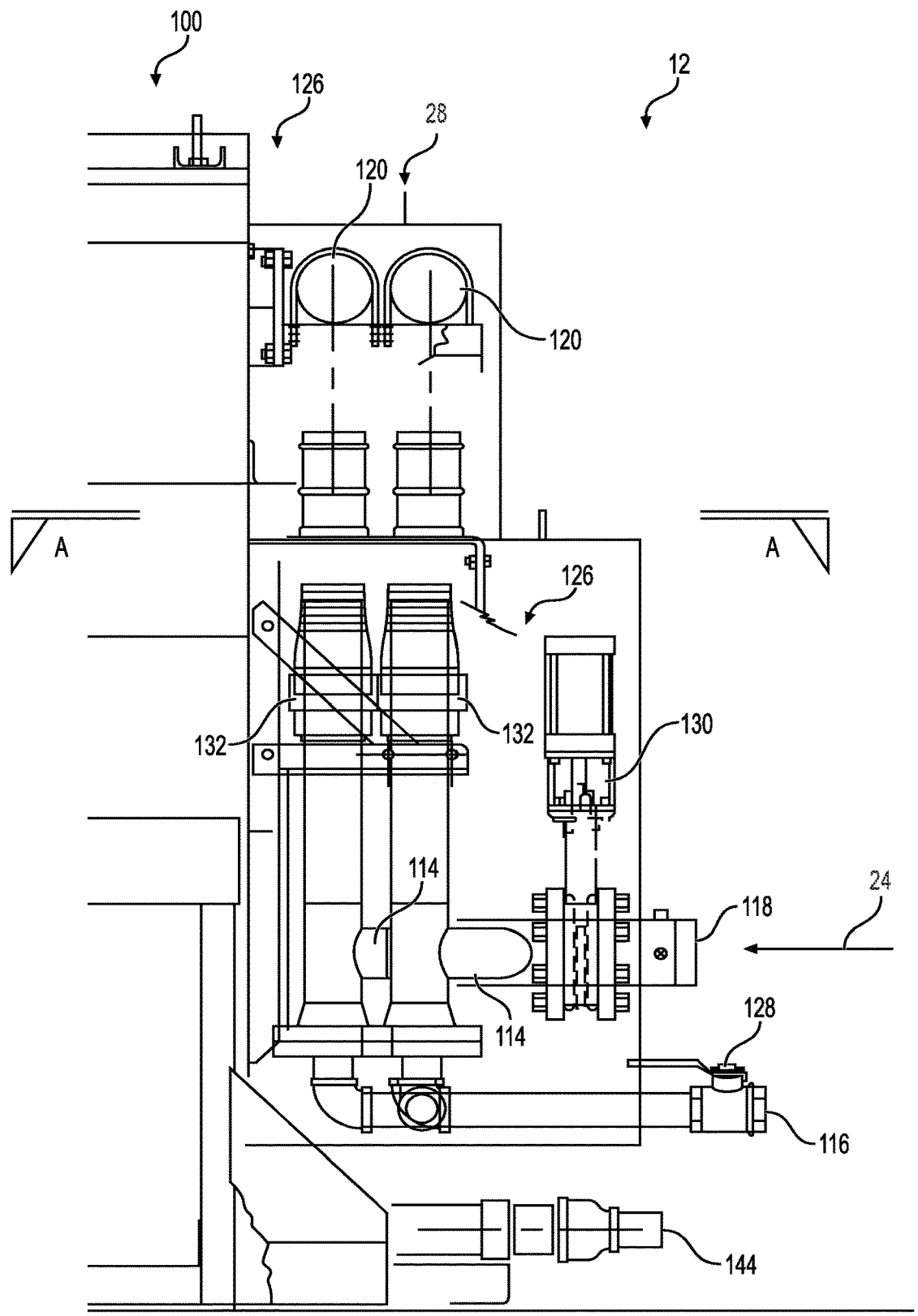
FIG. 10B is a schematic partial side view of the example vacuum generation and sound attenuation assembly shown in FIG. 10A, showing a side view of the example vacuum source end, according to embodiments of the disclosure.
Figure 10C:
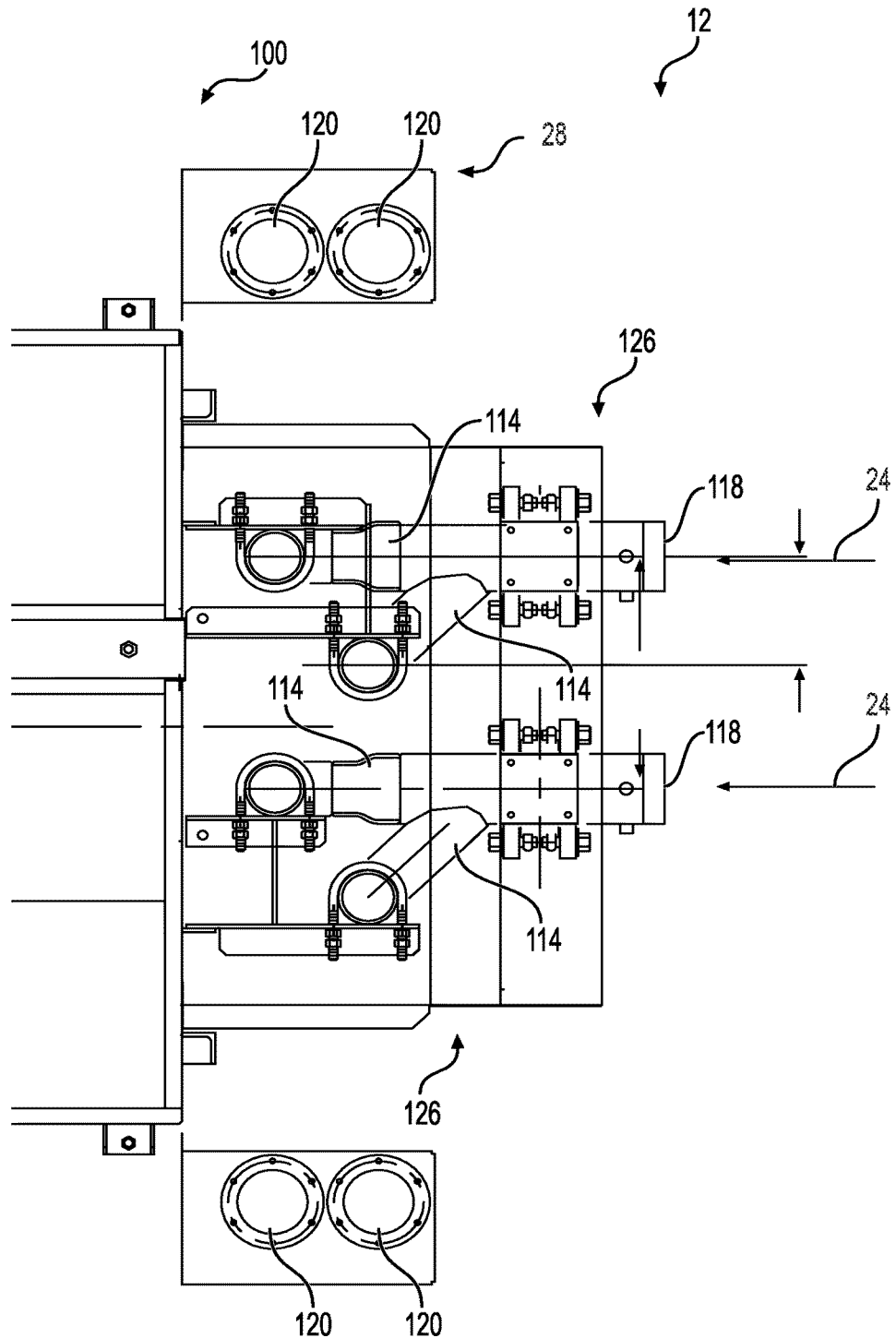
FIG. 10C is a schematic partial top view of the example vacuum generation and sound attenuation assembly shown in FIG. 10A, showing a top view of the example vacuum source end, according to embodiments of the disclosure.

FIGS. 10A, 10B, and 10C are schematic views of an example vacuum generation and sound attenuation assembly 12 showing an example vacuum source end, according to embodiments of the disclosure. The example vacuum generation and sound attenuation assembly 12 shown in FIGS. 10A through 10C includes an embodiment of vacuum source 28 having multiple venturi mechanisms 114. For example, as illustrated, the vacuum source 28 includes four venturi mechanisms 114. The four venturi mechanisms 114 may be operated simultaneously in parallel to provide a high-pressure vacuum flow 24 and different levels of vacuum pressure.

In some embodiments, to manage the pressure generated by vacuum source 28, the venturi mechanisms 114 may be divided into two dual vacuum sources 126. Each of the venturi mechanisms 114 of the two dual vacuum sources 126 may be fluidly connected in parallel to each other, for example, so that they each may be driven using a common fluid supply port 116, may commonly exhaust out of a common exhaust port 120, and/or may apply vacuum using a common vacuum port 118. In this example manner, each dual vacuum source 126 may provide a higher pressure vacuum flow 24 than may be provided using a single venturi mechanism 114 driven by a similar rate of fluid flow received from the fluid source 32.

To control the generation of the vacuum flow 24 by the one or more vacuum sources 28, in some embodiments, the ports 116, 118, and/or 120 of each dual vacuum source 126 may be controlled by corresponding respective control valves 128, 130, and/or 132. The control valves 128, 130, and/or 132 may be usable to control the rate of fluid flow through each of the respective ports.

Figure 10D:
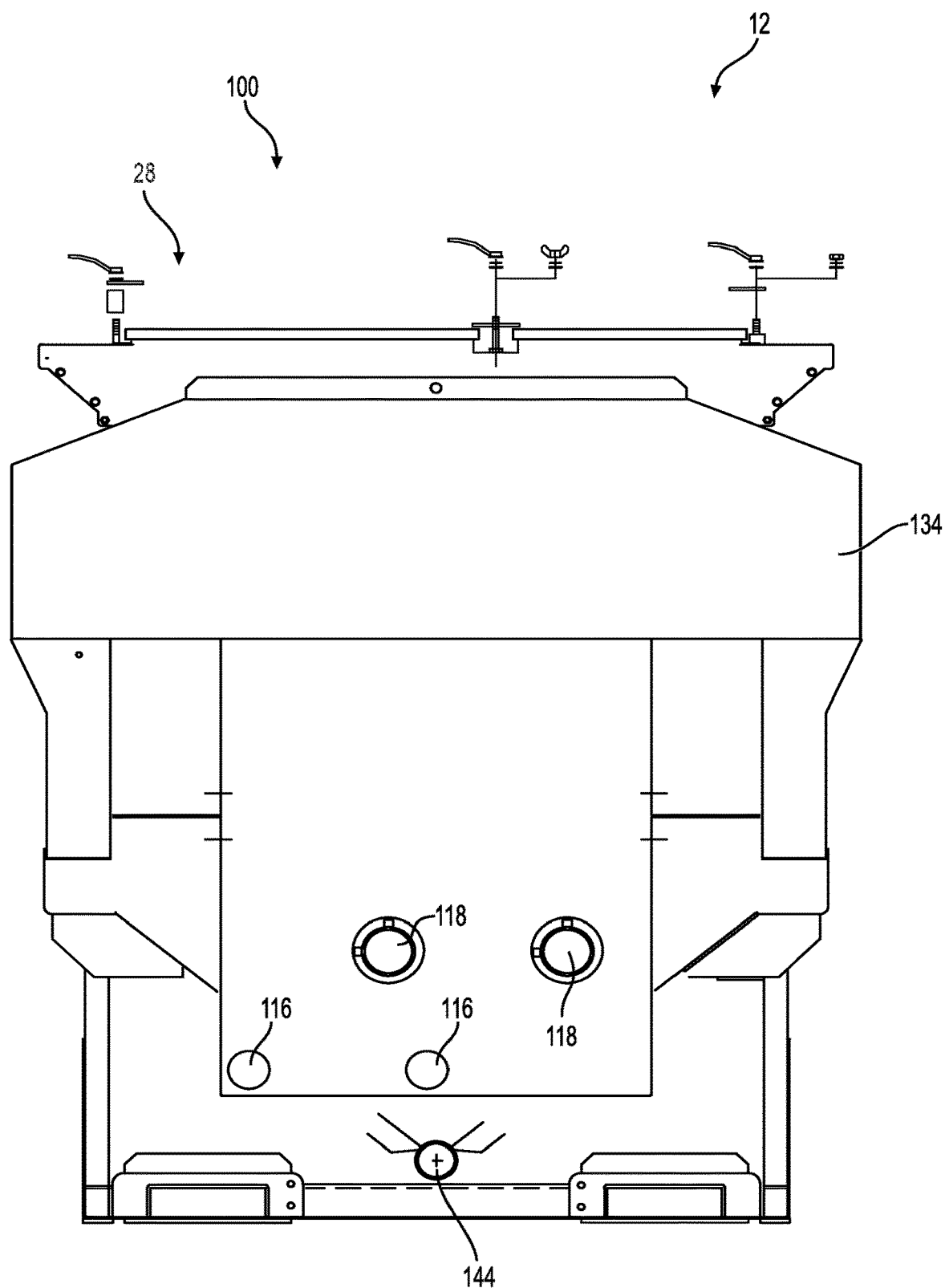
FIG. 10D is a schematic end view of the example vacuum generation and sound attenuation assembly shown in FIG. 10A, showing the example vacuum source end including an example housing at least partially enclosing the vacuum source, according to embodiments of the disclosure.
Figure 10E:
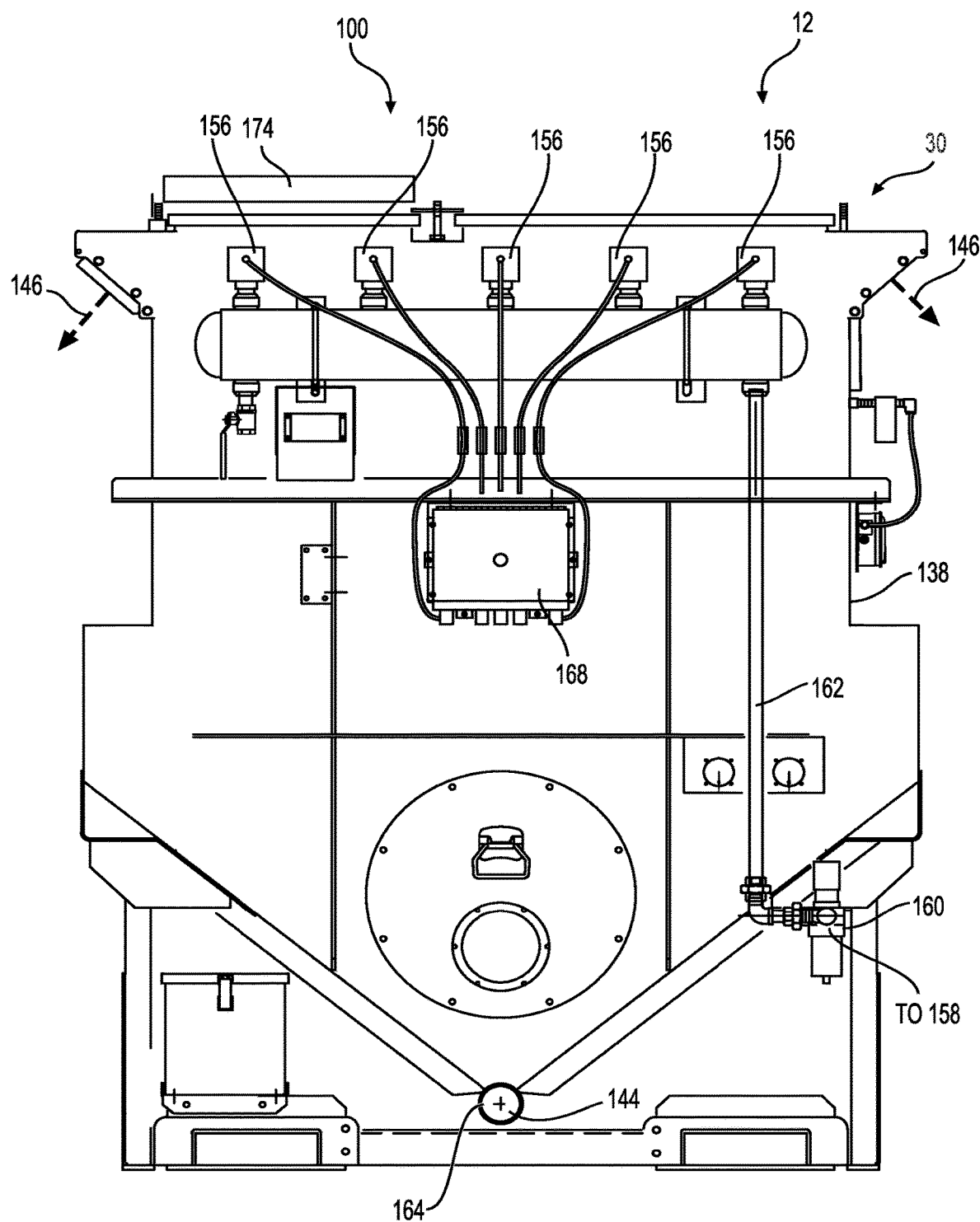
FIG. 10E is a schematic end view of the example vacuum generation and sound attenuation assembly shown in FIG. 10A, showing an example sound attenuation chamber end, according to embodiments of the disclosure.
Figure 10F:
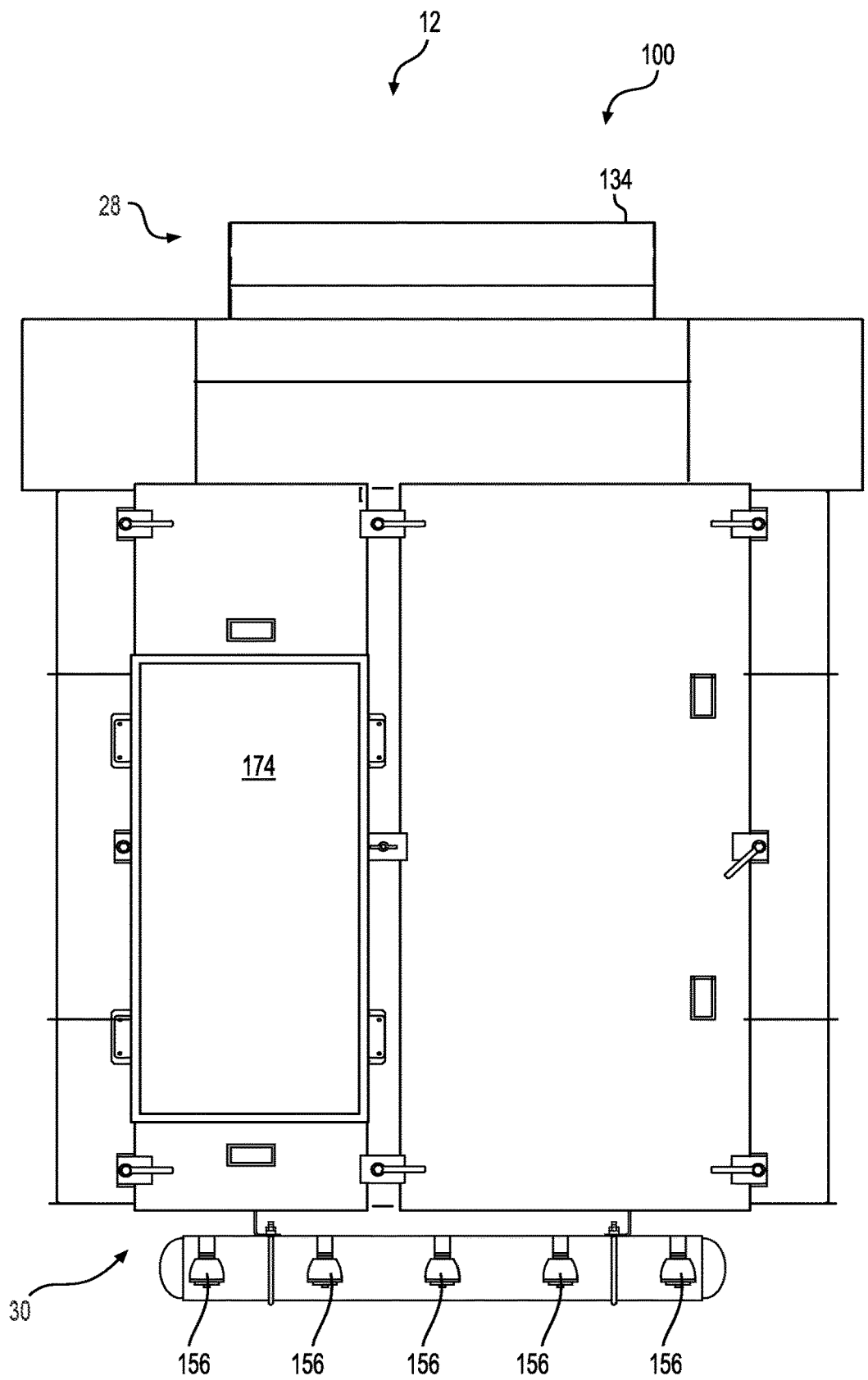
FIG. 10F is a schematic top view of the example vacuum generation and sound attenuation assembly shown in FIG. 10A, according to embodiments of the disclosure.
Figure 10H:
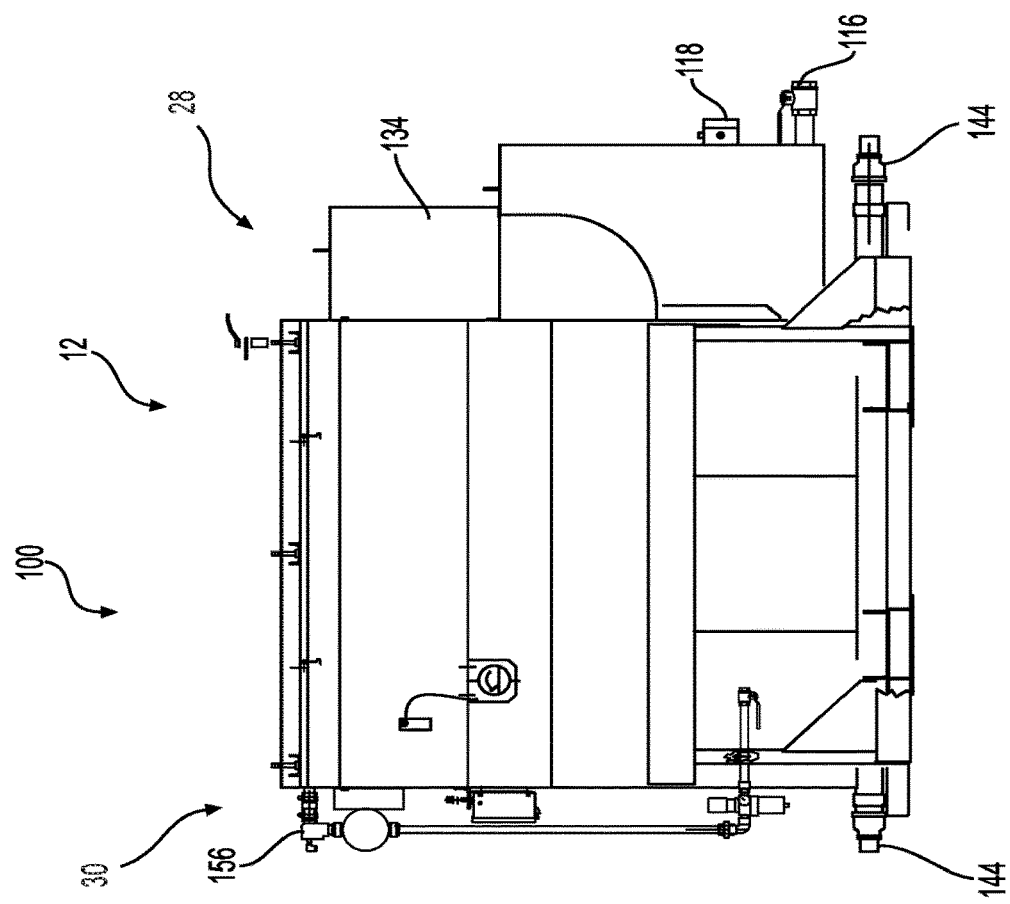
FIG. 10H is a schematic second side view, opposite the first side, of the example vacuum generation and sound attenuation assembly shown in FIG. 10A, according to embodiments of the disclosure.
Figure 10G:
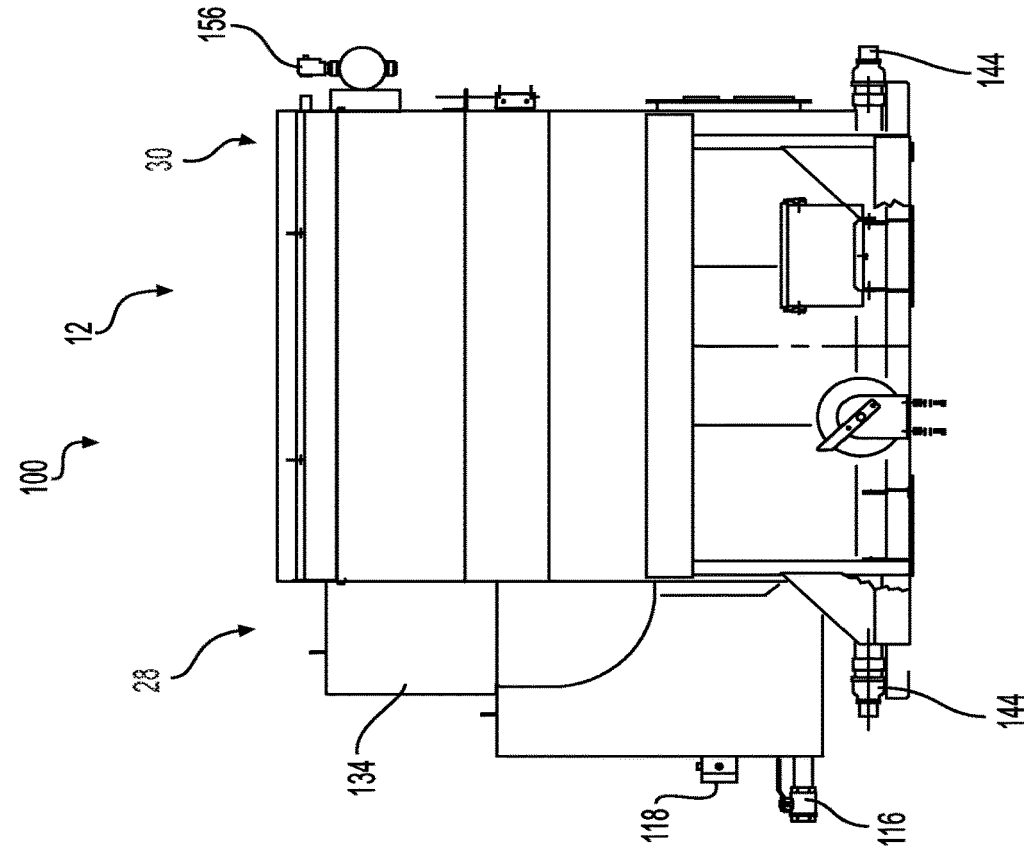
FIG. 10G is a schematic first side view of the example vacuum generation and sound attenuation assembly shown in FIG. 10A, according to embodiments of the disclosure.
Figure 11A:
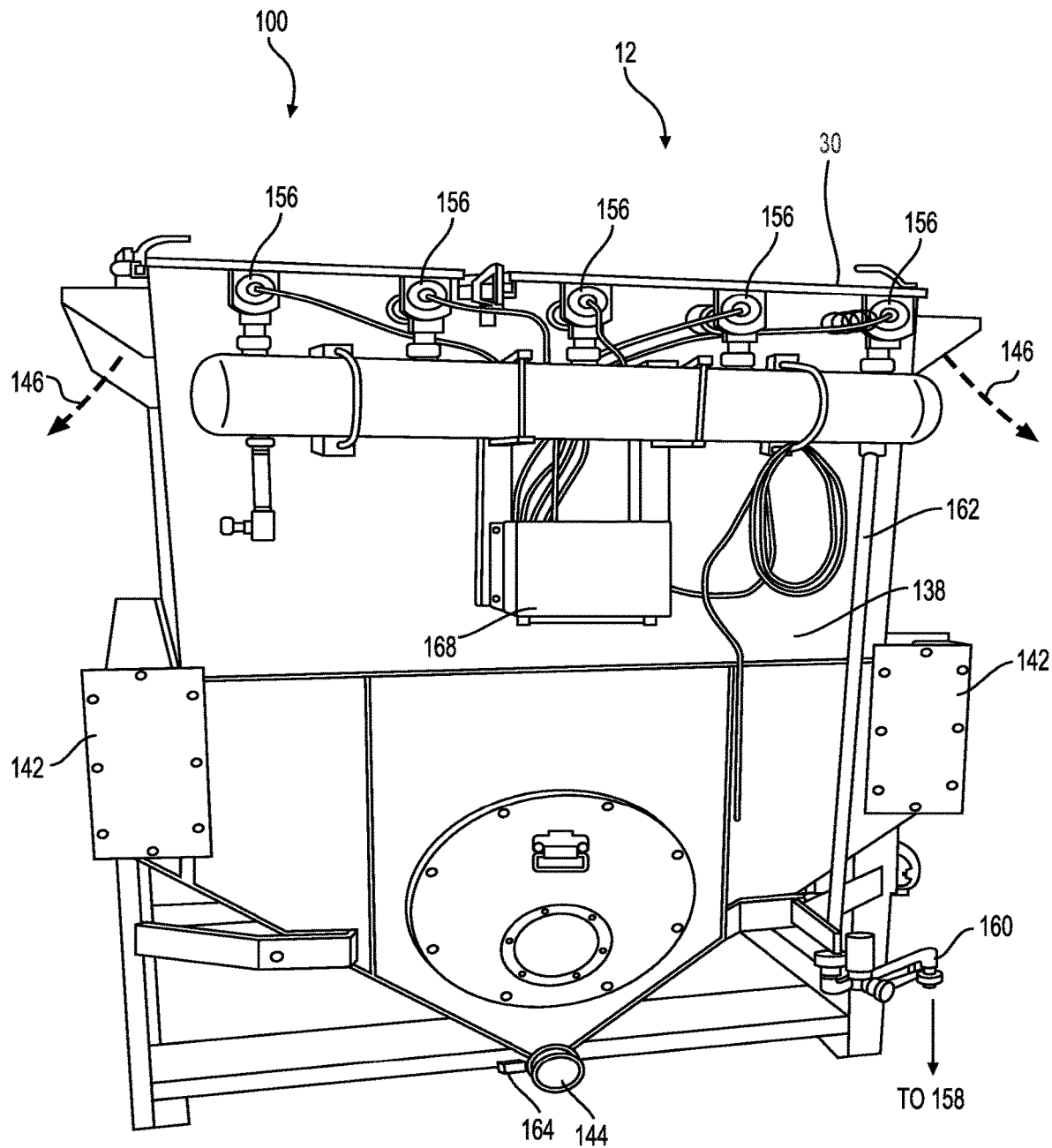
FIG. 11A is a schematic perspective view of an example vacuum generation and sound attenuation assembly, showing an example sound attenuation chamber end, according to embodiments of the disclosure.
Figure 11B:
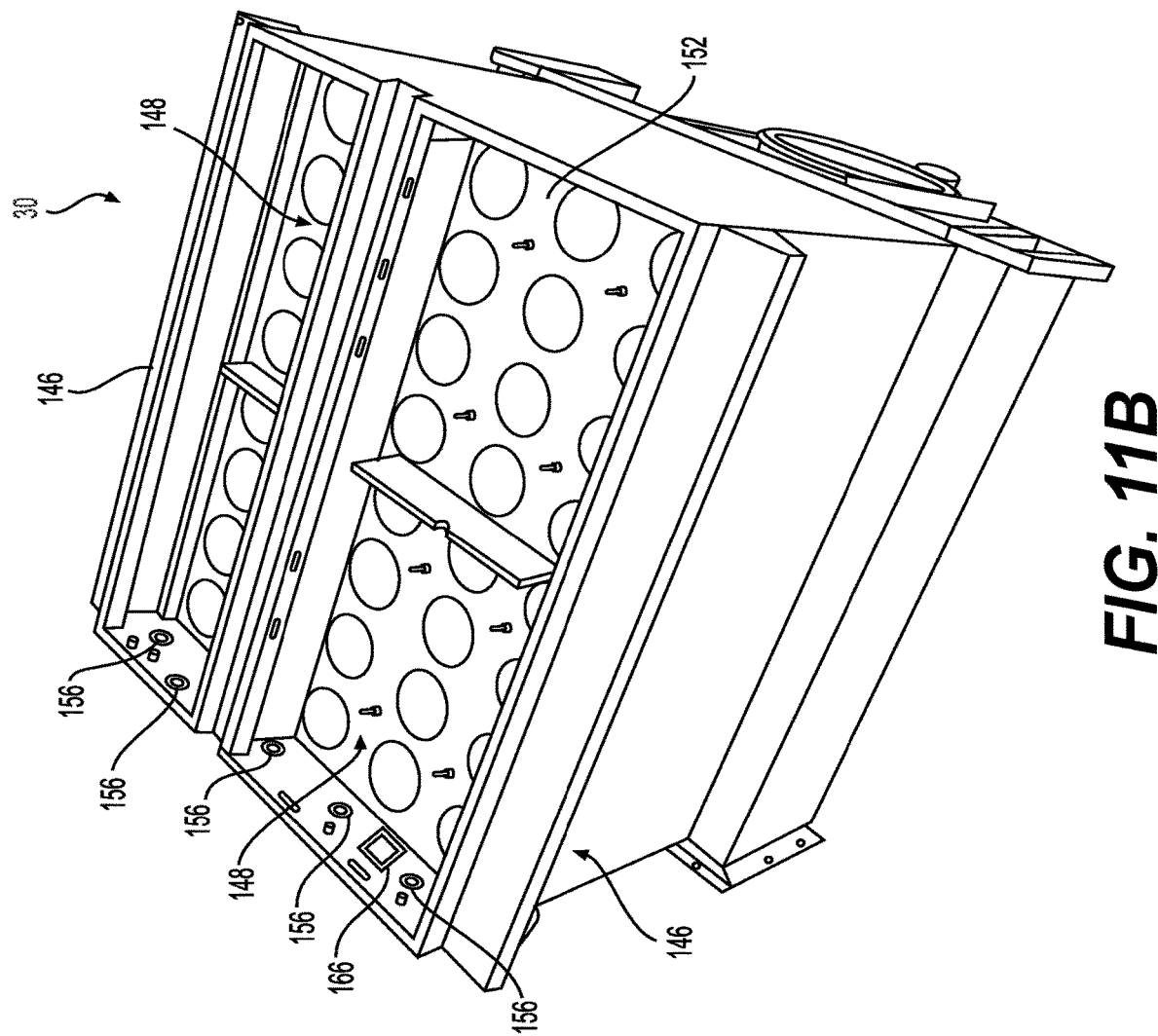
FIG. 11B is a schematic top perspective view of the example vacuum generation and sound attenuation assembly shown in FIG. 11A, with example filter media visible, according to embodiments of the disclosure.

Applicant has recognized that the strength of the vacuum flow 24 generated using multiple vacuum generators 106 including, for example, multiple venturi mechanisms 114, may present potential hazards. To manage or mitigate the potential hazards, in some embodiments, the vacuum source 28 may include a housing 134, for example, as shown in FIG. 10D. The housing 134 may be a physical structure positioned to at least partially enclose one or more of the venturi mechanisms 114. In some embodiments, the housing 134 may physically shield the venturi mechanisms 114 from inadvertent strikes and/or may help acoustically insulate the venturi mechanisms 114 from the ambient environment. The housing 134 may include any number of walls or other types of structural members to physically shield the venturi mechanisms 114 from the ambient environment. In some embodiments, to manage or mitigate the potential hazard, the vacuum port control valve 130 may be at least partially enclosed by the housing 134 and may be configured to be remotely operable. For example, the vacuum port control valve 130 may be operably coupled to a vacuum valve control interface configured to control operation of the vacuum port control valve 130 remotely from the vacuum port control valve 130 (e.g., via a button, control panel, computer tablet, smart phone, or other mechanism operable by a person), which, when actuated, may cause the vacuum port control valve 130 to close the vacuum port 118. In such embodiments, if a problem with operation occurs, the vacuum flow 24 generated by the vacuum source 28 may be quickly and/or remotely terminated.

In some embodiments, to manage the process of generating the high-pressure vacuum flow 24, the vacuum source 28 may include a vacuum source controller 136. The vacuum source controller 136 may be in communication with one or more of the control valves 128, 130, and/or 132. The vacuum source controller 136 may be configured to control operation of one or more of the control valves 128, 130, and/or 132 to provide vacuum flows having desired pressures. For example, the vacuum source controller 136 may be operably coupled to an adjustor, such as a switch, dial, or other mechanism that a person may operate to achieve a desired level of vacuum pressure to be generated by the vacuum source 28. The vacuum source controller 136 may use one or more signals from the adjustor to set the operation points for the one or more control valves 128, 130, and/or 132 to generate the desired vacuum pressure with, for example, the venturi mechanisms 114.

The vacuum source controller 136 may include computing hardware (e.g., processors, memory, storage devices, communication devices, other types of hardware devices including circuitry, etc.), and/or computing instructions (e.g., computer code) that when executed by the computing hardware cause the vacuum source controller 136 to provide its functionality. The vacuum source controller 136 may include a lookup table or other data structure usable to determine the operating points for the one or more control valves 128, 130, and/or 132, based on a desired vacuum flow level. Once operating points are determined, the vacuum source controller 136 may modify operation of one or more of the control valves 128, 130, and/or 132 based on the operating points. For example, vacuum source controller 136 may modify the quantities of power used to drive control valves 128, 130, and/or 132 to set the quantity of fluid flow through each of the ports 116, 118, and/or 120.

In some embodiments, to limit or prevent contamination of the ambient environment with undesired material 16, the sound attenuation chamber 30 may be configured remove undesired material 16 from the vacuum-induced fluid flow 24 prior to exhaustion into the ambient environment. To do so, the sound attenuation chamber 30 may be pneumatically connected to the vacuum source 28. In some embodiments, the sound attenuation chamber 30 is pneumatically connected to the vacuum source 28 by a conduit (e.g., a hose). In some embodiments, for example, as shown in FIGS. 10A-10H, the sound attenuation chamber 30 is directly and pneumatically connected to the vacuum source 28, thereby reducing reliance on a conduit, which may provide a potential hazard during operation of the material extraction assembly 10.

Applicant has recognized that some industrial environments, such as the example environment including a reaction vessel 14 shown in FIGS. 1-4, may include personnel tasked to operate the equipment in these environments. The presence of such personnel may restrict the acceptable level of sound that may be produced for undesired material removal purposes. The sound attenuation chamber 30, according to some embodiments, may be configured to attenuate sound generated by the vacuum source 28 and/or the fluid source 32 to sufficient levels, such that personnel may not need to wear protective hearing due to the sound generated by the material extraction assembly 10. In some embodiments, the sound attenuation chamber 30 may be configured to reduce the sound level generated by the material extraction assembly 10 by an amount ranging from ten percent to forty percent (e.g., by twenty-five decibels). For example, without the sound attenuation chamber 30, according to some embodiments, the material extraction assembly 10 may generate approximately 115 decibels of sound. In contrast, when the sound attenuation chamber 30 is incorporated into the material extraction assembly 10, the sound level may be reduced to about 89 decibels.

The sound attenuation chamber 30, in some embodiments, may both filter materials received from fluid flows before exhausting the received fluid flows and attenuate sound from received fluid flows before exhausting the received fluid flows into the ambient environment. In some embodiments, the sound may be attenuated to an extent that personnel in the area need not wear hearing protection, although personnel may need to wear hearing protection for other reasons.

FIGS. 10E, 10F, 11A, 11B, and 12 illustrate examples of embodiments of a sound attenuation chamber 30. The sound attenuation chamber 30, in some embodiments, may include an attenuation housing 138 at least partially defining a chamber interior volume 140 positioned to receive at least a portion of the vacuum flow 24 from the vacuum source 28 and attenuate sound generated by the vacuum source 28 during operation. The attenuation housing 138 may substantially seal the interior volume 140 from the ambient environment. The attenuation housing 138 may include one or more walls or other structural members to at least partially seal the interior volume 140.

In some embodiments, to filter undesired material 16 entering the sound attenuation chamber 30, the sound attenuation chamber 30 may include one or more inlet ports 142, one or more discharge ports 144, and/or one or more exhaust ports 146. At least some of the ports may be positioned on the attenuation housing 138 to provide access to the interior volume 140 from outside the attenuation housing 138. For example, the respective ports may include holes, apertures and/or other structures through one or more walls of the attenuation housing 138 that enable access to interior volume 140.

The inlet ports 142 may be pneumatically connected to the vacuum source 28. When pneumatically connected to the vacuum source 28, the inlet ports 142 may receive vacuum-induced flow 24 from the vacuum source 28. The minor portion of the undesired material 16 may be entrained in vacuum-induced flow 24, thereby presenting a potential contamination hazard if exhausted into the ambient environment without further filtering and/or treatment.

The exhaust ports 146, in some embodiments, may be pneumatically connected to the ambient environment. The fluid flow path through the material extraction assembly 10 may end at the exhaust ports 146. Consequently, in some embodiments, vacuum-induced flow 24 drawn from the source of the fluid (e.g., the reaction vessel 14, FIG. 1) and through the flow path may exit the flow path through the exhaust ports 146. The interior volume 140 may be in the flow path between the inlet ports 142 and the exhaust ports 146, such that vacuum-induced flow 24 flows through the interior volume 140 prior to being exhausted into the ambient environment.

In some embodiments, to partially attenuate sound, the exhaust ports 146 may be of substantially larger size than the inlet ports 142. The size difference between these ports may reduce or eliminate backpressure on the vacuum-induced flow 24. The flow path may expand greatly in cross-sectional area as the vacuum-induced flow 24 transitions from the inlet ports 142 into the interior volume 140. As a result, any sound generated by the vacuum-induced flow 24 may generally occur at an interface between the inlet ports 142 and the interior volume 140. In some embodiments, accordingly, the sound attenuation chamber 30 may, in part, dissipate the sound generated by the vacuum-induced flow 24 by generating it within the sound attenuation chamber 30, for example, such that the sound will dissipate prior to exiting the sound attenuation chamber 30.

In some embodiments, to filter undesired material 16 prior to exhaustion to the ambient environment, the interior volume 140 may include a filter media region 148. The filter media region 148 may include a portion of the interior volume 140 in which filter media 150 may be positioned. The filter media region 148 may be positioned, for example, such that the vacuum-induced flow 24 must substantially flow through the filter media region 148 and filter media 150 prior to being exhausted through the exhaust ports 146 to the ambient environment. In some embodiments, the interior volume 140 may include a filter media support plate 152. The filter media support plate 152 may be configured to support the filter media 150 within the filter media region 148. In some embodiments, the filter media support plate 152 may generally divide the interior volume 140 into two or more sections and may include holes through which the vacuum-induced flow 24 may travel between the sections. One or both sides of the filter media support plate 152 may include one or more baffles 154 configured to attenuate sound. The one or more baffles 154 may attenuate sound generated by the vacuum-induced flow 24, for example, prior to exhaustion out of the sound attenuation chamber 30.

In some embodiments, to filter undesired material 16 prior to exhaustion to the ambient environment, the filter media 150 may be configured to filter at least a portion of the minor portion of the undesired material 16 from the vacuum-induced flow 24. The filter media 150 may include any type of filter media for removing material from fluid flows. The filter media 150 also may be sound absorptive and, in part, help to dissipate the sound generated by the vacuum-induced flow 24. The filter media 150 may, in some examples, exhibit a relatively limited filtration capacity. As filter media 150 filters the undesired material 16, its permeability to fluid flow may decrease.

To manage the filtration capacity of the filter media 150, in some embodiments, the sound attenuation chamber 30 may include one or more jet generators 156 positioned relative to the sound attenuation chamber 30 to generate jets of fluid flow directed toward the filter media 150 to at least partially maintain the filtration capacity of the filter media 150. For example, the jet generators 156 may be positioned to generate jets of fluid flow directed toward the filter media 150 to at least partially refresh or restore the filtration capacity of filter media 150. For example, the jet generators 156 may be positioned outside the attenuation housing 138 and oriented facing into the filter media region 148.

When the jet generators 156 generate the jets, the jets may transfer undesired material 16 filtered by the filter media 150 out of the filter media 150 and into the interior volume 140. This may, in some embodiments, at least partially restore the permeability and/or the filtration capacity of the filter media 150. For example, the jets may cause undesired material 16 trapped in the filter media 150 to drop out of the filter media region 148, for example, through holes in the filter media support plate 152 and into interior volume 140.

To drive the jet generators 156, in some embodiments, the sound attenuation chamber 30 may include a jet fluid supply 158. The jet fluid supply 158 may be configured to store compressed fluid. In some embodiments, the jet fluid supply 158 may include a storage tank in which the compressed fluid is stored. The compressed fluid may be a gas, such as, for example, compressed air. The jet fluid supply 158 may be pneumatically coupled to the jet generators 156. The jet generators 156 may include one or more ports and one or more electrically driven actuators configured to control the rate at which the compressed fluid from the jet fluid supply 158 exits the jet generators 156. Thus, the jet generators 156 may modulate one or more of a strength of the jets of fluid flow, timing of the jets of fluid flow, or one or more other characteristics associated with the jets of fluid flow.

To fill the jet fluid supply 158, in some embodiments, the sound attenuation chamber 40 may include a fluid supply port 160. The fluid supply port 160 may be pneumatically connected to the jet fluid supply 158 to refill the jet fluid supply 158 with compressed fluid, for example, when another source of compressed fluid (e.g., the fluid source 32) is pneumatically coupled to the fluid supply port 160.

In some embodiments, due to a limited size of the interior volume 140, only a finite quantity of undesired material 16 may be stored in the interior volume 140. Over time the interior volume 140 may become filled with undesired material 16 as undesired material 16 is removed from the source of the material (e.g., the reaction vessel 14). Once the interior volume 140 is filled, the sound attenuation chamber 30 may become inoperable, for example, undesired material 16 may block fluid flow through the interior volume 140.

To manage the fill level 79 of the interior volume 140, in some embodiments, the sound attenuation chamber 30 may include one or more discharge ports 144. The discharge ports 144 may facilitate removal of undesired material 16 from the interior volume 140. In some embodiments, undesired material 16 may be removed from the interior volume 140 through the discharge port(s) 144 while the vacuum-induced flow 24 flows through the interior volume 140.

To remove undesired material 16 from the interior volume 140, in some embodiments, the discharge port 144 may be pneumatically connected to a material collector 11 (e.g., a vacuum box 49). For example, the discharge port 144 may be pneumatically connected to a material collector 11 via a conduit (e.g., such as a restrictive hose). When a high-pressure vacuum is applied to the material collector 11, undesired material 16 in the interior volume 140 may be drawn out of the interior volume 140, through the conduit, and into the material collector 11. Thus, both the major portion and the minor portion of the undesired material 16 extracted from the source of the material (e.g., the reaction vessel 14) may be transferred to a material collector 11. The discharge port 144 may be pneumatically connected to other components for undesired material discharge purposes without departing from embodiments disclosed herein.

To control when and/or the rate of removal of the undesired material 16 from the interior volume 140, in some embodiments, the sound attenuation chamber 30 may include a discharge port control valve 164. The discharge port control valve 164 may be positioned to control the rate of fluid flow through the discharge port 144. For example, the discharge port control valve 164 may include an electrically driven actuator usable to control the rate of fluid flow through discharge port 144. In some embodiments, the discharge port control valve 164 may control the rate of fluid flow through discharge port 144 to selectively remove undesired material 16 from the interior volume 140.

To determine when and/or at which rate to remove undesired material 16 from the interior volume 140, in some embodiments, the sound attenuation chamber 30 may include one or more sensors 166. The sensors 166 (FIG. 11B) may be positioned to monitor the filtration capacity of the filter media 150, the fill level 79 of the interior volume 140, and/or the flow rate of undesired material 16 out of the discharge port 144. The sensors 166 may be configured to generate signals indicative of any physical property of the sound attenuation chamber 30 and use the signals to determine these quantities. For example, the sensors 166 may include photo-sensors that measure the filtration capacity of the filter media 150 based on a quantity of light transmitted by the filter media 150. In some embodiments, the sensors 166 may include a transducer configured to measure the mass of undesired material 16 to determine the fill level 79 of the interior volume 140. The sensors 166 may include other components for measuring the same or different types of physical properties without departing from embodiments disclosed herein.

FIG. 13A, FIG. 13B, FIG. 13C, FIG. 13D, FIG. 13E, FIG. 13F, and FIG. 13G are schematic views of example vacuum generation and sound attenuation assemblies 12 according to embodiments of the disclosure. In the examples shown, a compressor housing 37 and a sound attenuation chamber 30 may be adjacently mounted on a common chassis 260. The chassis 260 may have wheels 104 for ease of transport and may also have lift lugs or other hard points for rigging operations, so as to be easily relocated and deployed by operators of the site using a crane, forklift, or other appropriate equipment and/or methods.

Figure 13A:
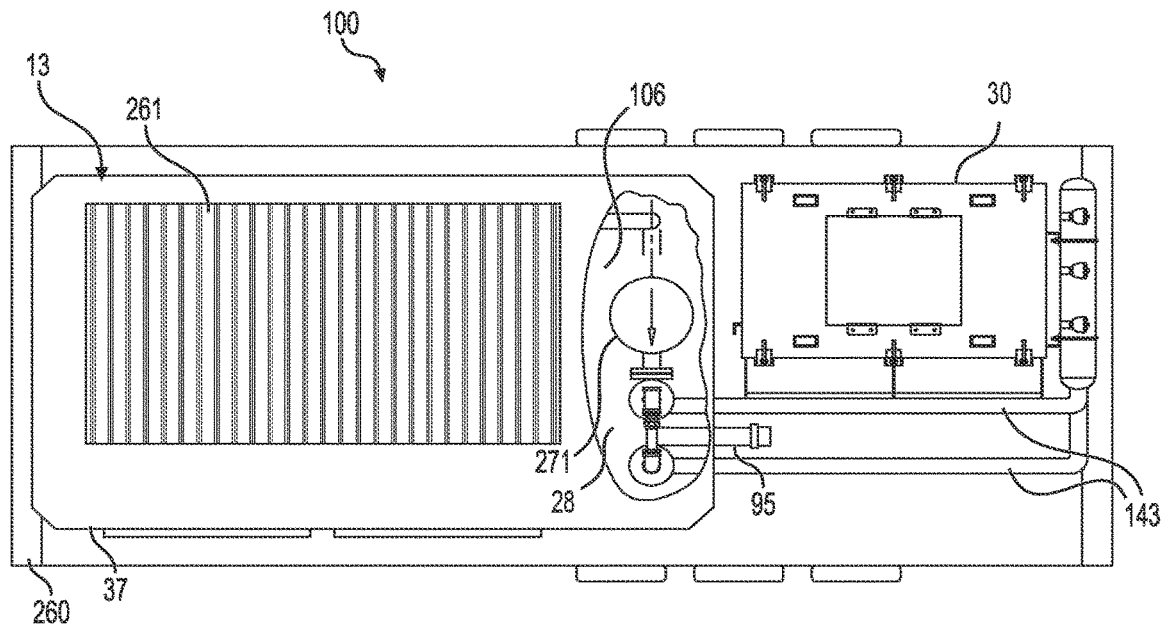
FIG. 13A is a schematic top view of the example vacuum generation and sound attenuation assembly, according to embodiments of the disclosure.
Figure 13B:
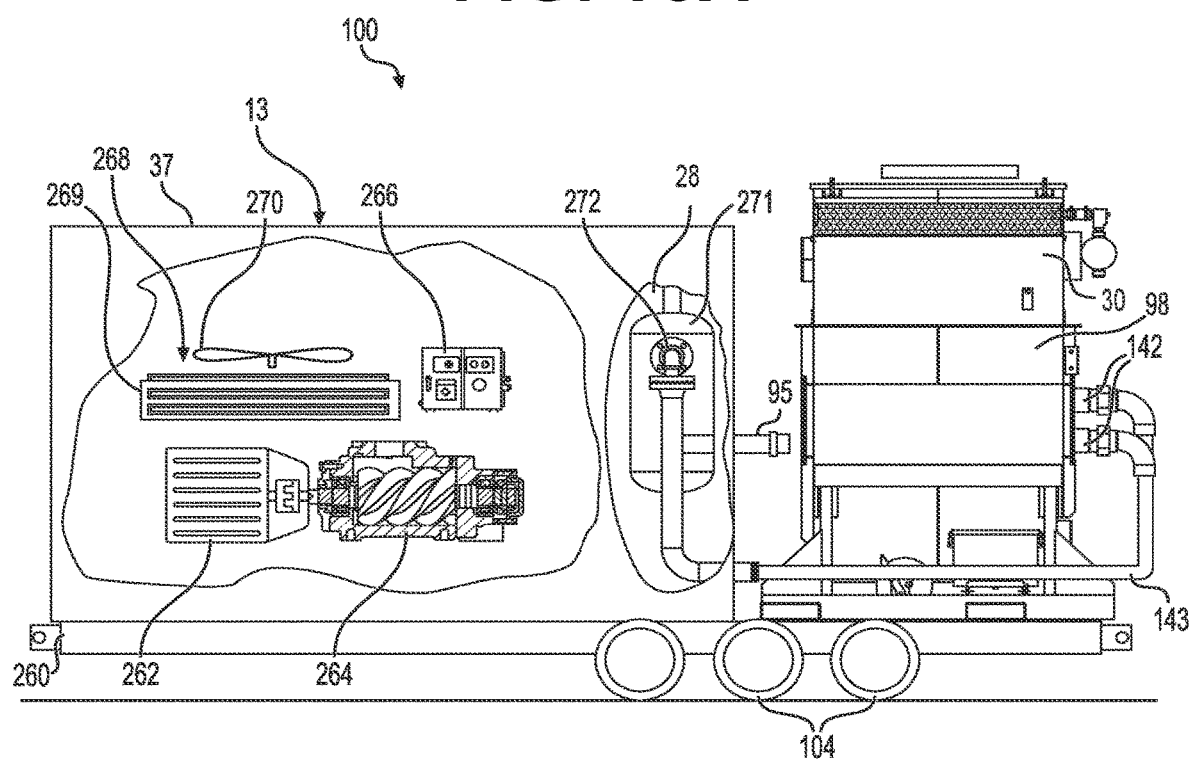
FIG. 13B is schematic side view of the example vacuum generation and sound attenuation assembly shown in FIG. 13A, according to embodiments of the disclosure.

FIG. 13A is a schematic top view and FIG. 13B is a schematic side view of an example vacuum generation and sound attenuation assembly 12 according to embodiments of the disclosure. The compressor housing 37 of a compressor and vacuum generation assembly 13 may include components utilized to generate, manage, and/or control the vacuum flow. The compressor housing 37 may include, for example, a hollow interior with an equipment pad for the components and access points for operators of the site to monitor and service the equipment. In some embodiments, one or more doors may be provided on compressor housing 37 to permit access, service, and/or replace components contained in the housing.

In some examples, the compressor and vacuum generation assembly 13 may include a fluid source including one or more compressors 264 powered by one or more motors 262 within the compressor housing 37. The one or more compressors 264 may be used to generate a supply of pressurized fluid to provide the vacuum source 28. The one or more compressors 264 may include, for example, a positive displacement rotary screw compressor sized to provide efficient flow of pressurized fluid over extended run duty cycles, although other compressor types are contemplated. A rotary screw compressor may, for example, have a pair of continuously rotating asymmetric screws to increase the pressure of a working fluid (e.g., air) in a chamber. Operating speeds of the compressor 264 may be varied to meet the vacuum flow requirements of applications, such as those shown in FIG. 2 and/or FIG. 4. Applicant has also recognized that the comparatively smooth and quiet operation of a rotary screw compressor may eliminate the need for a specialized foundation or mounting system (for example, a vibration-absorbing base, isolation mount, etc.) to maintain a smaller size footprint in the compressor housing 37. The one or more compressors 264 may also be powered by one or more prime movers, such as, for example, electric motors 262 suitable for compact and portable operation. For example, the one or more compressors 264 and/or the one or more electric motors 262 may be configured to provide a flow rate of 500 or more cubic feet per minute (cfm), 600 or more cfm, 700 or more cfm, 800 or more cfm, 900 or more cfm, or 1,000 or more cfm, for example, at a pressure of 50 or more pounds per square inch (psig), 60 or more psig, 70 or more psig, 80 or more psig, 90 or more psig, or 100 or more psig.

Figure 13C:
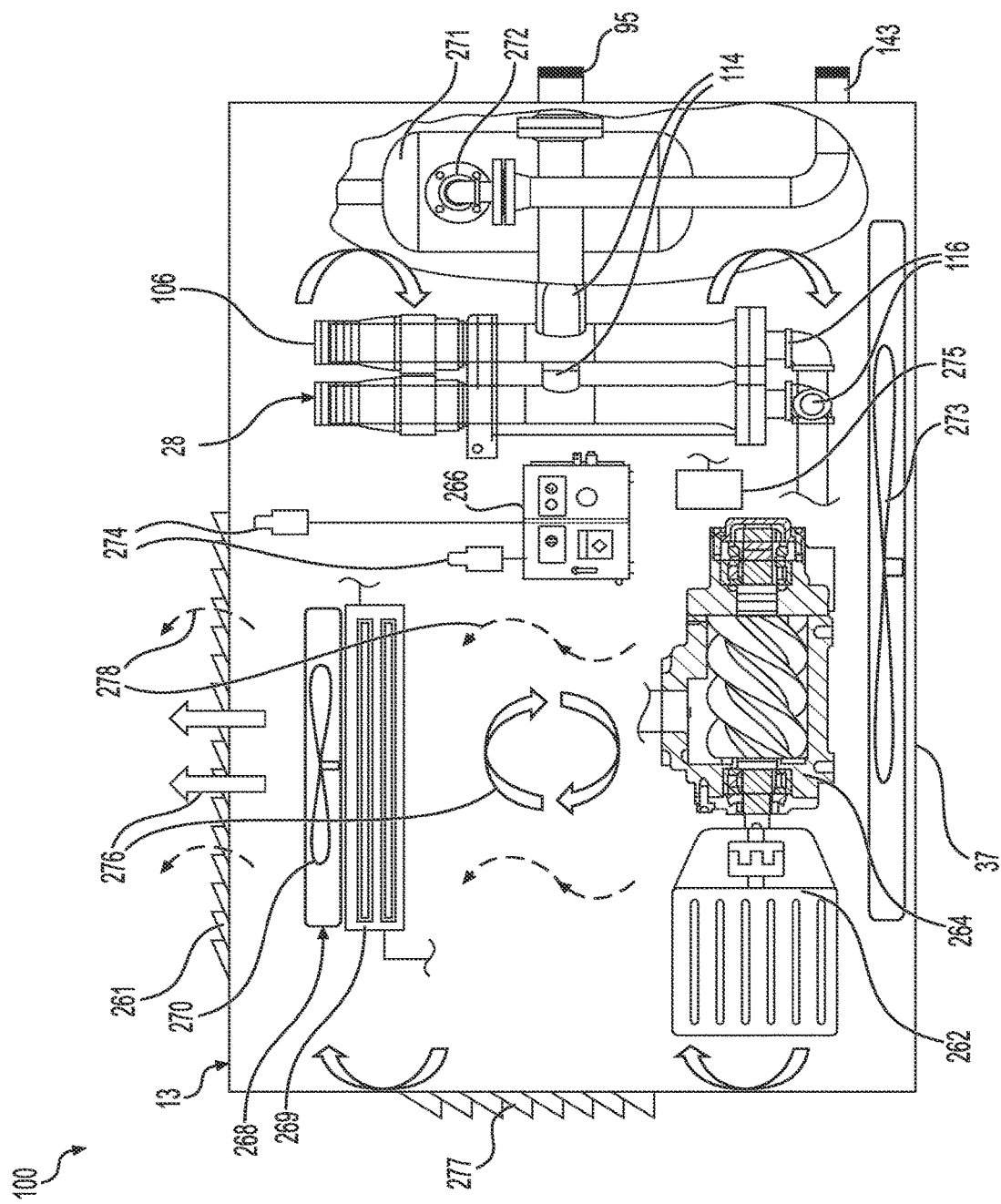
FIG. 13C is schematic side view of another example vacuum generation and sound attenuation assembly, demonstrating an example layout of components and airflows, according to embodiments of the disclosure.
Figure 13D:
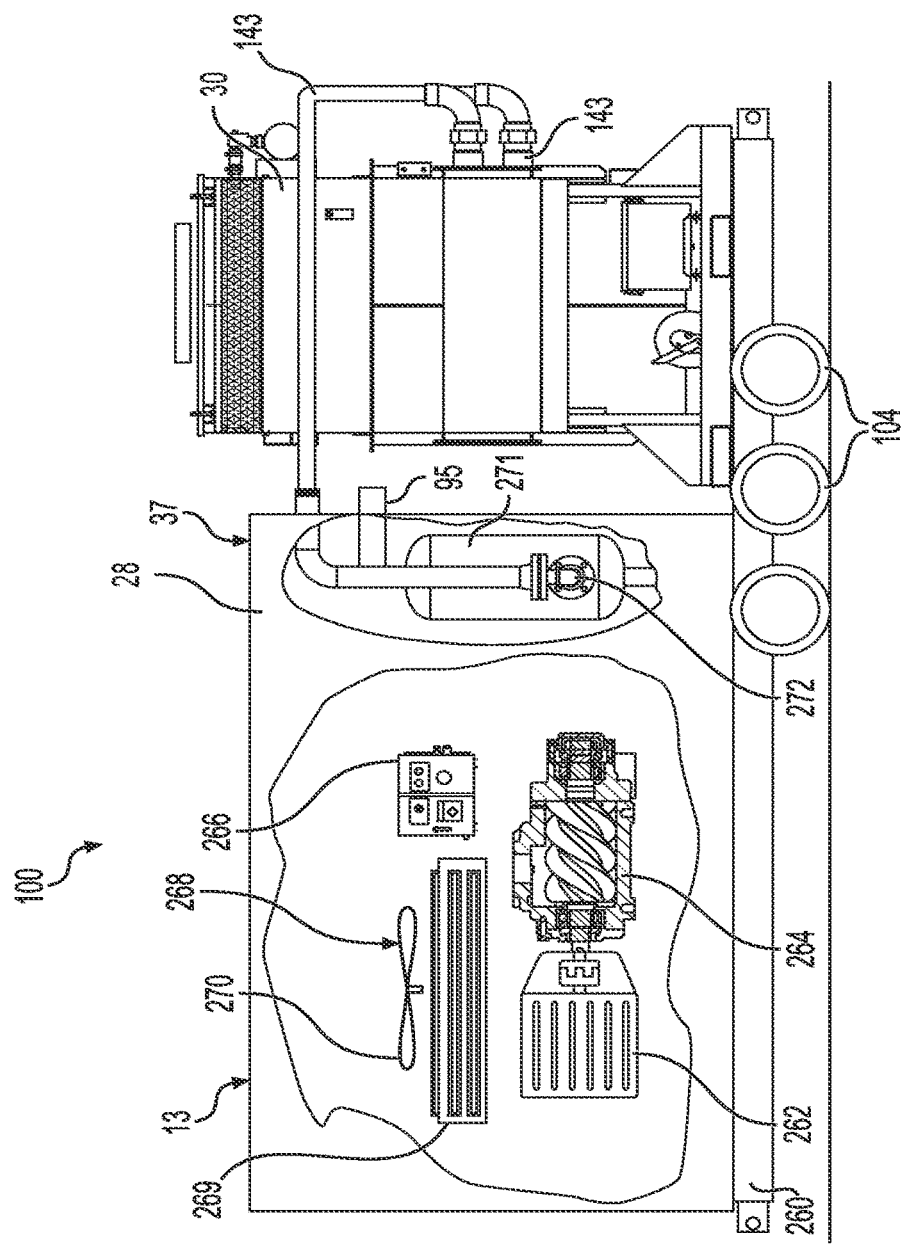
FIG. 13D is schematic side view of another example vacuum generation and sound attenuation assembly, according to embodiments of the disclosure.
Figure 13E:
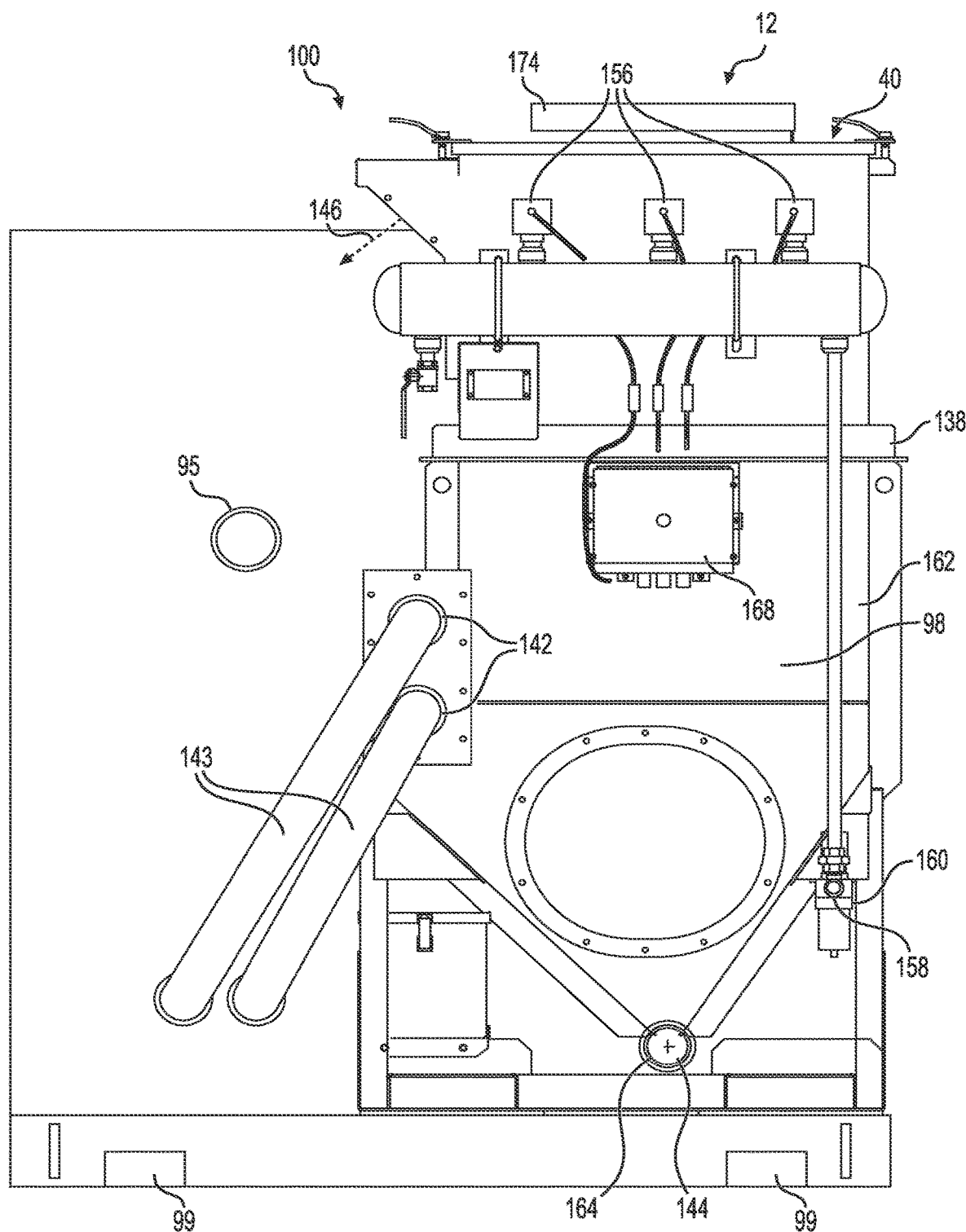
FIG. 13E is schematic end view of the example vacuum generation and sound attenuation assembly shown in FIG. 13A, according to embodiments of the disclosure.
Figure 13F:
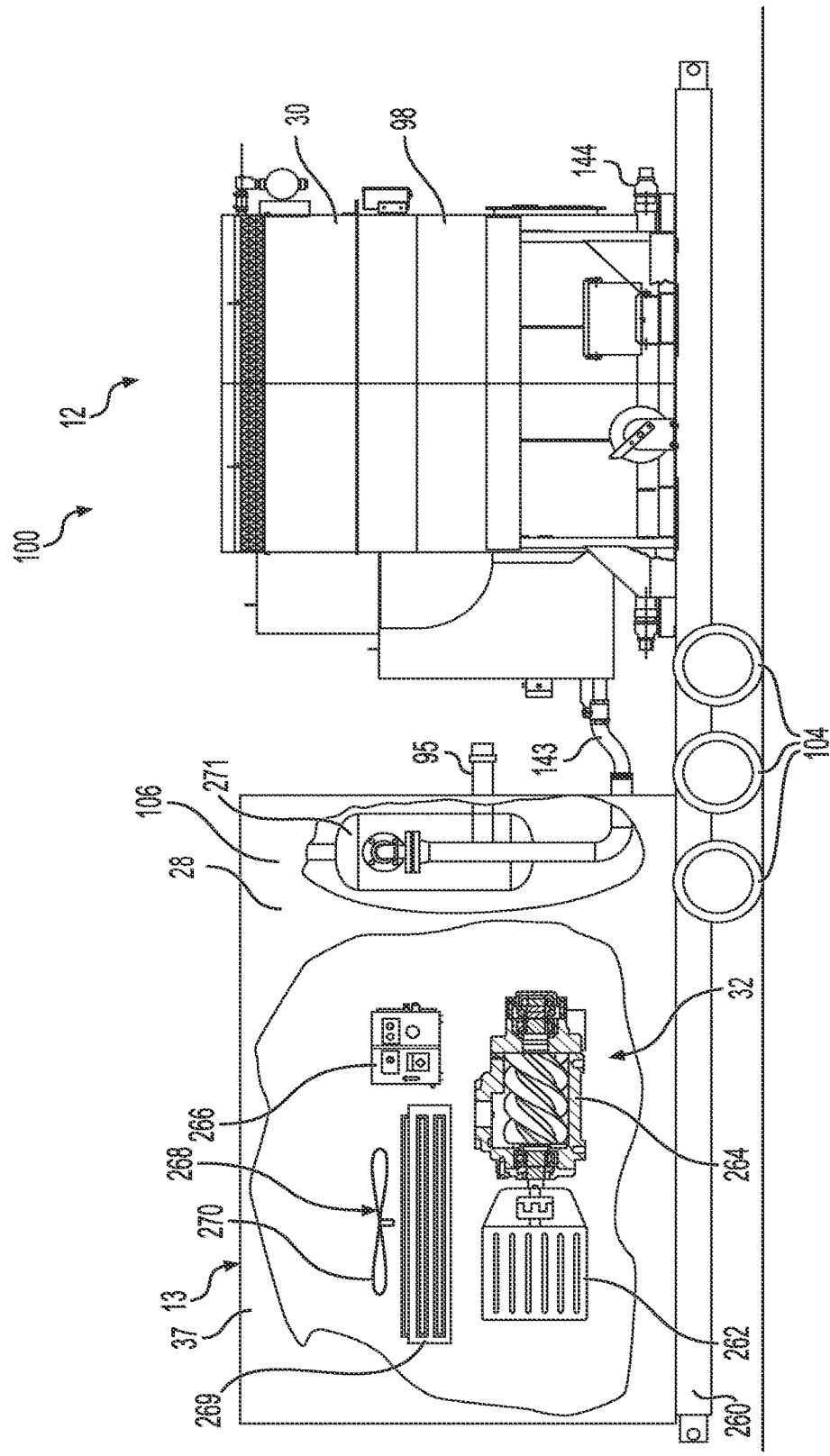
FIG. 13F is schematic side view of another example vacuum generation and sound attenuation assembly, according to embodiments of the disclosure.
Figure 13G:
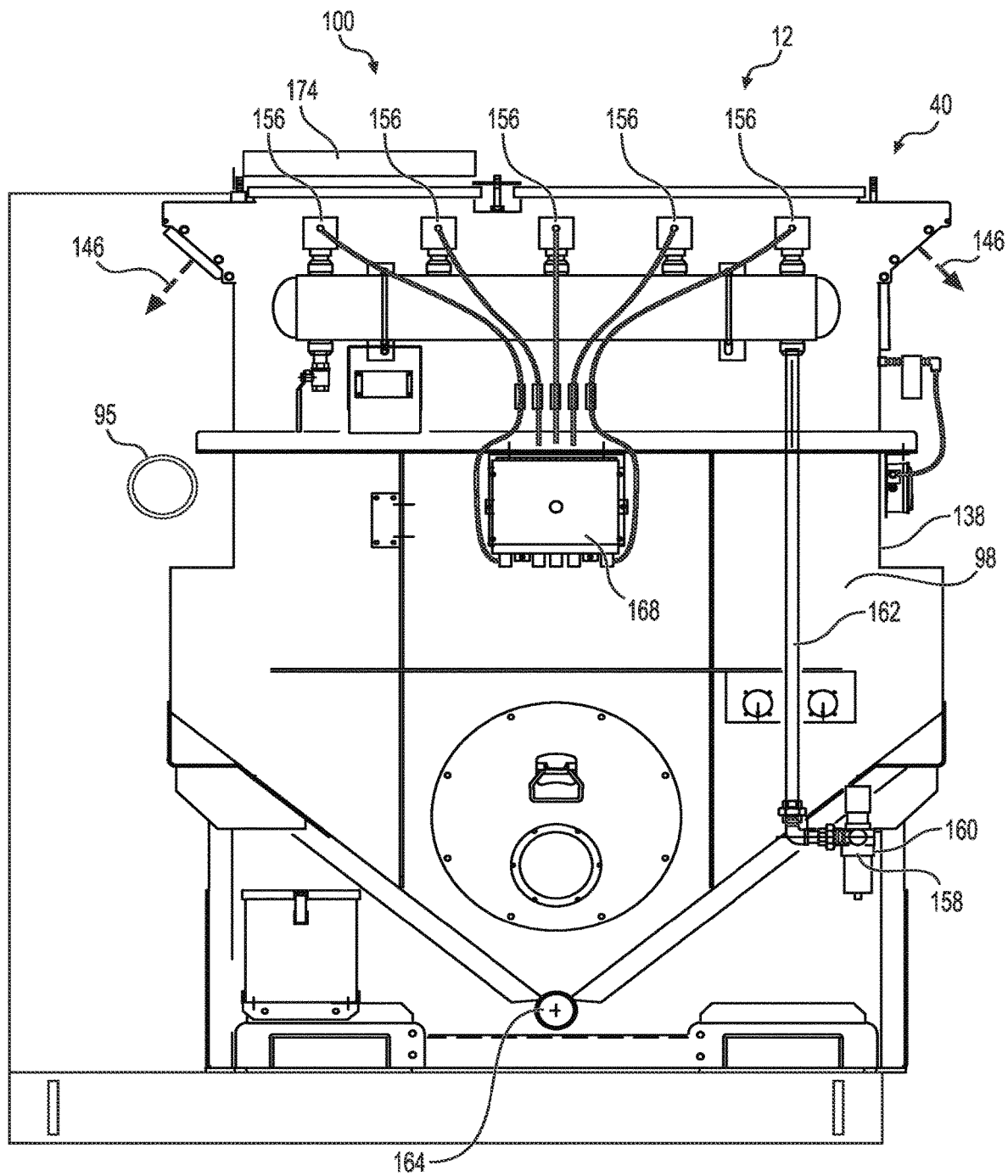
FIG. 13G is schematic end view of the example vacuum generation and sound attenuation assembly shown in FIG. 13E, according to embodiments of the disclosure.

In some embodiments, the compressor housing 37 may contain other components of the fluid source 32 supporting the operation of the one or more compressors 264. For example, a cooling system 268 may be configured to remove generated heat from the interior of the compressor housing 37. The cooling system 268 may include, for example, one or more after coolers 269. The after coolers 269 may include a heat exchanger to extract heat from the compressed air flow from the compressor 264. In some examples, the one or more after coolers 269 may include one or more heat exchange surfaces (e.g., a plurality of baffles or fins) to distribute heat more evenly. One or more fans 270 may be provided to draw waste heat from the after cooler 269 and force the heat out of the compressor housing 37 through one or more vents 261 in the compressor housing 37. In some embodiments, the one or more vents 261 (e.g., two or four vents) may be provided in the roof of the compressor housing 37, for example, as shown in FIG. 13A. Alternatively, or in addition, secondary vents 277 may be provided in or on the sides of the compressor housing, for example, as shown in FIG. 13C. The size and/or number of vents 261 and/or secondary vents 277 may be configured to provide sufficient entry of air from the surroundings for feeding the compressor 264 and/or to provide sufficient cooling for operation of the one or more electric motors 262 and/or the one or more compressors 264. In some embodiments, one or more vents 261 and/or secondary vents 277 may be provided with louvers and/or a system to prevent dust, debris, and/or water (e.g., rain) from entering through the roof or vents 261 and/or 277 of the compressor housing 37. In some embodiments, the air with condensed moisture from the after cooler 269 may subsequently enter a moisture separator 271 where the air may be caused to circulate around the separator body to separate and collect droplets of moisture from the air at the base of the separator by gravity.

In some embodiments, the compressor and vacuum generation assembly 13 may include a vacuum controller 266 within the compressor housing 37, so that operational set points may be controlled during operation (e.g., during continuous conveyance and/or extraction operations when material 16 may not be visible along at least portions of the flow path defined by the high-pressure vacuum flow 24). The vacuum controller 266 may be used to control various operating parameters in the compressor housing 37, such as motor speed and/or torque of the electric motor 262, or the volumetric flow rate and supply pressure of the compressor 264.

To control various operating parameters in the compressor housing 37, the vacuum controller 266 may obtain information from one or more sensors 274 (see FIG. 13C) in the compressor housing 37 that monitor operational conditions and provide feedback for the vacuum controller 266. For example, the one or more sensors 274 may be positioned at various locations on/in the compressor housing 37 (and/or other locations) and may be operably connected to the vacuum controller 266 (e.g., in communication with the vacuum controller 266). The one or more sensors 274 may be configured to generate signals indicative of one or more physical and/or environmental properties, communicating the signals to the vacuum controller 266, and/or displaying information relating to the properties (or quantities determined from the measured physical properties, such as, for example, flow rates, pressures, vapor pressures, moisture levels, temperatures, rotational speeds, and/or other operating parameters).

The vacuum controller 266 may be in communication with and control one or more valves through the compressor and vacuum generation assembly 13. The valves may include, but are not limited to, intake valves, blow down valves, thermal valves, minimum pressure valves, pressure relief valves, solenoid valves, etc. The vacuum controller 266 may control the one or more valves to adjust or tune operation of the compressor and vacuum generation assembly 13. For example, the strength of the vacuum flow 24 generated by the vacuum source 28 may be, for example, substantially proportional to the position of valves controlling a flow rate, pressure, and/or volume of fluid flow from the one or more compressors 264. In addition, the vacuum controller 266 may detect lower volumetric flow rates (for example, 100 cfm or less) and/or pressures during an initial startup of the vacuum source 28 and adjust parameters as necessary to ramp up to a desired flow rate. For example, the one or more electric motors 262 may be variable speed motors, and the vacuum controller 266 may set the amperage and/or voltage for the electric motors 262 during ramp up to prevent current surges which could otherwise trigger fuses or circuit breakers. In another example, the vacuum controller 266 may increase the amperage and/or voltage supplied to the electric motors 262 to prevent a stall in the event measured supply pressures drop below threshold levels during the ramp-up.

In some embodiments, the vacuum controller 266 may include computing hardware (e.g., processors, memory, storage devices, communication devices, other types of hardware devices including circuitry, etc.), and/or computing instructions (e.g., computer code) that when executed by the computing hardware cause the vacuum controller 266 to provide its functionality. The vacuum controller 266 may include a lookup table or other data structure usable to determine the setpoint levels to, for example, efficiently extract material from (or convey material to) one or more of the respective zones 18 of the reactor vessel 14.

In some embodiments, a user input device may be provided in communication with the vacuum controller 266. The user input may be communicated to the vacuum controller 266 via the user input device. The user input device may include, for example, one or more buttons, touch sensitive displays, levers, knobs, and/or other devices (e.g., control panels, tablet computers, and/or smart phones) that are operable by personnel to provide the vacuum controller 266 with information for operating and controlling the vacuum flow 24.

The compressor housing 37 may have ports, unions, and/or other fittings as a junction for fluidic communication between, for example, the vacuum source 28 of the compressor and vacuum generation assembly 13, the material collector 11, the reaction vessel 14, and/or the material source (see, e.g., the reaction vessel 14 shown in FIG. 2 and FIG. 4). To transfer the material 16 from the reaction vessel 14 to the material collector 11, a high-pressure vacuum flow 24 may be applied to the material collector 11. The high-pressure vacuum flow 24 may be transferred to the material collector 11 through one or more suction outlets 95. In some embodiments, the one or more suction outlets 95 may be a 4-inch diameter coupling, although other sizes and configurations of suction outlet 95 are contemplated. For example, the vacuum flow 26 may be applied to the interior 53 of the material collector 11 via the conduit 96 (or through other types of pneumatic connections between the components). The applied vacuum flow 24 may generate the vacuum-induced fluid flow 24 along the flow path, thereby conveying the undesired material 16 from reaction vessel 14 to material collector 11.

The compressor housing 37 may have, for example, one or more exhaust outlet ports 272 for the delivery of at least some of the vacuum flow 24 to the sound attenuation chamber 30. Conduits 143 of manifolds or ducts may be used to provide a flow path for the exhaust of the vacuum flow to inlet ports 142 of the sound attenuation chamber 30. The sound attenuation chamber 30 may have alternate configurations and sizes, such as that shown in FIGS. 13F and 13G.

As shown in FIGS. 13A, 13B, 13D, 13E, 13F, and 13G, in some embodiments, the vacuum generation and sound attenuation assembly 12 may include a sound attenuation chamber 30 connected to the vacuum source 28. In some embodiments, the sound attenuation chamber 30 may include an attenuation housing 98 at least partially defining a chamber interior volume being positioned to receive at least a portion of the vacuum flow 24 from the vacuum source 28 and attenuate sound generated by the vacuum source 28 during operation. In some embodiments of the vacuum generation and sound attenuation assembly 12, the vacuum source 28 and the sound attenuation chamber 30 may be connected to one another to form a unified vacuum and attenuation module 100, for example, as shown in FIGS. 2, 4, 13A, 13B, 13D, 13E, 13F, and 13G. In some embodiments, the vacuum source 28 may be directly connected to the sound attenuation chamber 30. In the example embodiment shown in FIGS. 13A through 13G, the unified vacuum and attenuation module 100 includes a chassis 260 supporting the vacuum source 28 and the sound attenuation chamber 30, and the chassis 260 may be configured to be transported between geographical locations. In some embodiments, wheels 104 may be connected to the chassis 260 to facilitate transportation, although tracks, skids, etc., may be connected to the chassis 260 instead of, or in addition to, wheels 104, depending, for example, on the type of terrain over which the vacuum and attenuation module 100 may be expected to traverse. In some embodiments, the chassis 260 may be self-propelled, for example, including a powertrain having an engine, hydraulic motor, and/or electric motor. Mounting the vacuum and attenuation module 100 on a mobile chassis 260 may facilitate rapid set-up, removal, and/or reconfiguration of the material extraction assembly 10 in accordance with embodiments of the disclosure.

FIG. 13C illustrates an example of components of the compressor and vacuum generation assembly 13 within the compressor housing 37. In an enclosed or semi-enclosed environment, there may be a high likelihood of generating thermal energy and accumulating moisture. Routing of the exhaust flows, and the expulsion of heat and moisture produced by generating a vacuum flow 24 from the supply of compressed fluid from a compressor, have been important design considerations in industrial vacuum applications. While some amounts of heat and moisture may be anticipated for these applications, accumulation may be costly in terms of maintenance and machinery downtime, which may also hinder productivity.

For example, as shown in FIG. 13C, a compact arrangement of components to maintain spacing within the confines of the compressor housing 37 may provide a pattern of circulation and venting to rid the environment of heat and moisture, which may be detrimental to the service life of a compressor 264. Applicant has found that space-saving layout of the vacuum generators 106 of the vacuum source 38 with respect to fluid supply ports 116 for flow of the pressurized fluid from the one or more compressors 264 and exhaust flow paths 143. For example, fluid supply ports 116 and/or associated supply valves for the venturi mechanisms 114 or the vacuum source 28 may enable smaller, more compact compressors 264 to be utilized. The additional free volume within the compressor housing 37 may allow for, for example, better circulation of air and moisture flows 276 and 278 within the compressor housing 37 for more efficient cooling and venting than would be possible with other vacuum-generating assemblies.

Additionally, the elevation positioning of the exhaust flow paths 143 from the vacuum generators relative to the suction inlet port 95 may improve efficiency of the compressor and vacuum generation assembly 13. For example, locating the exhaust flow paths 143 to a higher elevation within the compressor housing 37 (see, e.g., locations in FIG. 13D relative to FIG. 13C) relative to the venturi mechanisms 114 and suction inlet port 95 may allow more effective outflow of exhaust and the use of what may otherwise be dead space within the compressor housing 37. As an alternative, the exhaust flow paths 143 may occupy an elevated position on an opposite sidewall of the compressor housing 37. The exhaust flow paths 143 may additionally include openings or vents to eliminate back pressure.

In some embodiments, the compressor and vacuum generation assembly 13 may include a recirculation fan 273 within the compressor housing 37 to distribute and exhaust heated airflows 276 and moisture 278 generated by the compression and vacuum generation processes. The recirculation fan 273 may rotate at variable speeds so there is sufficient airflow and aeration within the interior volume of the compressor housing 37. As illustrated in FIG. 13C, the recirculation fan 273 may be positioned at a lower elevation in the compressor housing 37 relative to the one or more compressors 264 and the vacuum source 38. From this position, the recirculation fan 273 can direct airflow up and around these components and promote heat flows 276 and excess moisture flows 278 to leave the compressor housing 37 through one or more vents 261, for example, in the roof of the compressor housing 37. As an alternative, the recirculation fan 273 may be positioned at a higher elevation in the compressor housing 37 relative to the one or more compressors 264 and the vacuum source 28 (e.g., near the roof of the housing) to draw air and moisture flows up to exit through the roof. These more central locations for the recirculation fan 273 above or below the compressors 264 and the vacuum source 38 may allow for the layout and size of other components of the compressor and vacuum generation assembly 13 to be shorter and more compact relative to a recirculation fan positioned, for example, at either end of the compressor housing 37 and directing flows laterally to exit one or more vents on a side of the compressor housing 37. In addition, the vents 261 may have, for example, features such as angled fins or louvres to protect the compressor and vacuum generation assembly 13 from rain, dust, and/or other contaminants external to the compressor housing 37.

In some embodiments, the size and orientation of the vacuum source 28 of the compressor and vacuum generation assembly 13 may allow for the suction and exhaust from the source to be directed in different directions. For example, the one or more suction inlet ports 95 and exhaust outlet ports 272 may be positioned in a substantially lower location in the compressor housing 37, as shown in FIG. 13B, as compared to the substantially elevated location shown in FIG. 13D. Additionally, the one or more suction inlet ports 95 may be positioned at substantially different elevations within the compressor housing 37 than the elevation of the one or more exhaust outlet ports 272. For example, the one or more suction inlet ports 95 may be positioned at an elevation higher than that of the one or more exhaust outlet ports 272. Alternatively, the one or more exhaust outlet ports 272 may be positioned at a higher elevation within the housing relative to the one or more suction inlet ports 95 to use what may otherwise be dead space in the housing. Altering the orientation and configuration of the vacuum source 28 may provide a more compact and/or efficient arrangement of the vacuum source 28 (or other components) within the compressor housing 37. Generating the suction for the high-pressure vacuum flow 24 in lower portions of the compressor housing 37, for example, may save additional space within the compressor housing 37 for the circulation and venting of airflow and moisture. In addition, generating the suction for the high-pressure vacuum flow 24 in lower portions of the compressor housing 37, for example, may save additional space for the compressor and vacuum generation assembly 13 on the mobile chassis 260.

In some embodiments, the vacuum controller 266 may be in communication with one or more sensors 274 (see FIG. 13C) within the compressor housing 37 that monitor operational conditions and provide feedback for the controller. The controller 266, for example, may be configured to receive signals and/or remote triggers from the sensors 274. In some examples, the sensors may include one or more thermocouples to measure component surface temperatures, the temperature of airflows 276 circulating within the housing, and/or other temperatures of significance. In response to one or more thermocouple signal(s), the vacuum controller 266 may for example, initiate operation, or increase the rotational speed, of the recirculating fan 273. Alternatively, in response to one or more thermocouple signal(s), the vacuum controller 266 may for example, increase the flow rate through the one or more aftercoolers 269 of the cooling system 268.

The compressor and vacuum generation assembly 13 may also have an air dryer 275 within the compressor housing 37 to remove at least some of the moisture from the flow of compressed fluid. An air dryer 275 may also serve to supplement filters and/or water traps within the assembly. A dryer 275 may have added benefits in some applications where elevated moisture levels in the environment (for example, from condensate, suspended water vapor, and other sources) may affect the quality of operations, such as painting, the movement of moisture-sensitive materials such as cement, etc. One or more of the sensors 274 in the compressor housing 37 may be moisture sensors in communication with the vacuum controller 266. In response to one or more signals from the moisture sensors, the vacuum controller 266 may for example, issue commands to initiate operation, or increase the rotational speed, of the recirculating fan 273 to expel moisture flows 278 in the environment from the vents 261.

In some embodiments, the vacuum source 28 may be implemented using a variety of configurations, depending, for example, on the environment to which the material collector 11 is deployed for operation. For example, in some embodiments, the vacuum source 28 may generate a vacuum, which may be applied to the material collector 11. For example, the vacuum source 28 may include one or more vacuum generators 106 configured to generate the vacuum flow 24, and the vacuum generators 106 may be pneumatically connected to one or more material collectors 11, for example, via a conduit 96. In some examples, the one or more vacuum generators 106 may receive at least some electrical power via renewable means, such as batteries, solar panels, wind turbines, and/or other similar sources. In other embodiments, for example, the vacuum source 28 as shown in the arrangement in FIGS. 2 and 4 may generate a vacuum, which may be applied directly to the suction manifold 44.

The one or more vacuum generators 106 may be configured to generate the vacuum flow 24 in different ways, depending at least in part on, for example, the environment to which the vacuum and attenuation module 100 is deployed. For example, in some embodiments, the vacuum generators 106 may be configured to generate the vacuum flow 24 using the flow of another fluid. For example, the vacuum generators 106 may be connected to a fluid source 32 (for example, the compressor 264). The flow of the pressurized fluid may cause the vacuum generators 106 to generate a high-pressure vacuum flow 24, thereby applying a high-pressure vacuum flow 24 to one or more material collectors 11, which may, in turn, transfer the vacuum flow 24 from the one or more material collectors 11 to the vacuum source 28. The vacuum-induced fluid flow 24 received from the one or more material collectors 11 may include a minor portion of the undesired material 16 from the one or more material collectors 11, for example, as described herein.

When the one or more vacuum generators 106 generate the vacuum flow 24, in some embodiments, the vacuum generators 106 may combine vacuum-induced flow 24 and a fluid supply flow 108 and exhaust the combined flows as a vacuum exhaust fluid flow 110, which may include the minor portion of the undesired material 16, for example, as schematically shown in FIG. 12. To limit or prevent contamination of the ambient environment with the minor portion of the undesired material 16, the vacuum generators 106 may be pneumatically connected to the sound attenuation chamber 30 via a conduit 112 (e.g., a hose). The vacuum exhaust fluid flow 110 may flow from the vacuum source 28 into the sound attenuation chamber 300 via the conduit 112. Accordingly, the vacuum source 28 may be in the fluid flow path from the reaction vessel 14 to sound attenuation chamber 30.

In some embodiments, in order to generate a more powerful high-pressure vacuum flow 24, multiple vacuum sources 28 and/or one or more sound attenuation chambers 30 may be positioned on a common chassis 260 to form a more powerful vacuum generation and sound attenuation assembly 12 (e.g., a more powerful unified vacuum and attenuation module 100). For example, multiple vacuum sources 28 may each be pneumatically connected to the (one or more) sound attenuation chambers 30, which may cause two (or more) separate flow paths (e.g., for each of the vacuum sources 28) and which may be combined at the one or more sound attenuation chambers 30. In some embodiments, the vacuum sources 28 may be pneumatically connected to a common material collector 11 (e.g., to increase the strength of the high-pressure vacuum flow 24 through the common material collector 11) or different material collectors 11 (e.g., to enable the undesired material 16 to be transferred to multiple material collectors 11 in parallel).

In some embodiments, the vacuum source 28 may be implemented using a variety of different structures, depending at least in part on, for example, the environment to which vacuum source 28 is deployed. For example, in some embodiments, the vacuum source 28 may include one or more vacuum generators 106, each having a venturi mechanism 114, as will be understood by those skilled in the art, configured to receive pressurized fluid from the fluid source 32 (for example, the compressor 264) and use a venturi effect, as will be understood by those skilled in the art, to generate the vacuum flow 24 between the source of the material (e.g., the reaction vessel 14 shown in FIGS. 1-4) and the vacuum generation and sound attenuation assembly 12. For example, the venturi mechanism 114 may be a vacuum generation mechanism that generates a vacuum using another fluid flow.

The venturi mechanism 114 may utilize Bernoulli's Principle, whereby slower moving fluids create greater pressure than faster moving fluids, and thus the pressure of a flow acts inversely to the velocity of the flow. In some embodiments, the pressurized fluid supplied by the fluid source 32 to the vacuum generators 106 to generate a high-pressure vacuum flow 24 may have a nominal velocity and a nominal pressure. The pressurized fluid may be directed along a flow path and passed through a restriction in the venture mechanism 114, constricting the flow of the pressurized fluid and increasing its velocity. The increased velocity of the choked flow results in a considerable reduction in the pressure and the drawing of a partial vacuum in that section of the flow path. The high-pressure vacuum flow 24 may thus be generated reliably without any moving parts in the venturi mechanism 114 itself.

Leveraging this principle may increase the capacity and performance of the high-pressure vacuum flow 24 so that, for example, a higher degree of suction may be applied to undesired material 16 in reaction vessel 14, thereby increasing the transfer rate of undesired material 16 from reaction vessel 14 and allowing more difficult material to be transferred out of reaction vessel 14 (FIGS. 1-4).

Figure 14:
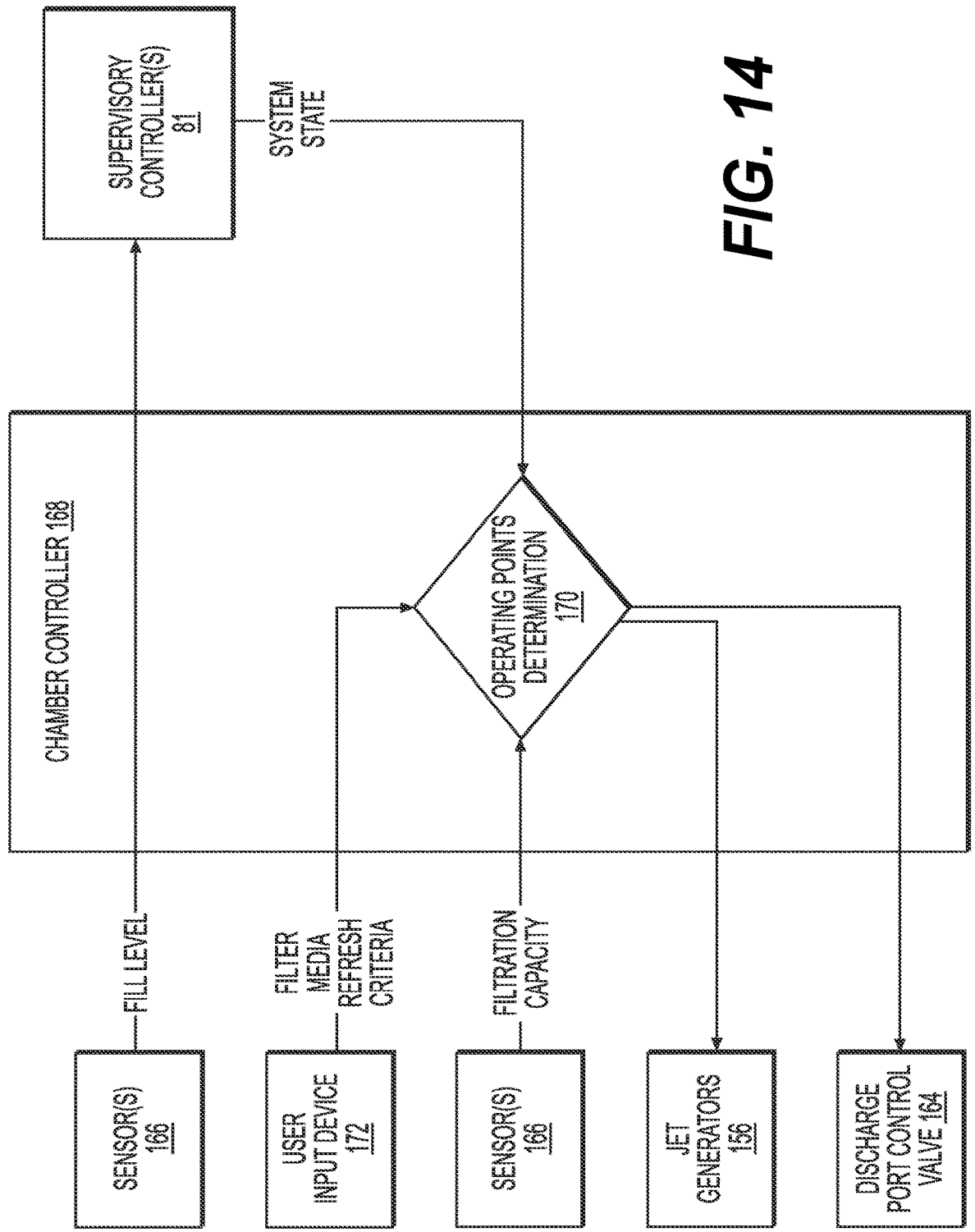
FIG. 14 is a block diagram of an example architecture for operating an example sound attenuation chamber of an example material extraction assembly, according to embodiments of the disclosure.

FIG. 14 is a block diagram of an example architecture for operating an example sound attenuation chamber 30 of an example material extraction assembly 10, according to embodiments of the disclosure. To coordinate operation of the sound attenuation chamber 30, in some embodiments, the sound attenuation chamber 30 may include a chamber controller 168 in communication with one or more of a discharge port control valve actuator, one or more jet generators 156, and the one or more sensors 166. For example, the chamber controller 168 may be operably connected to the discharge port control valve 164, the jet generators 156, and the sensors 166. The chamber controller 168 may obtain information from sensors 166 and selectively drive the discharge port control valve 164 and/or the jet generators 156 based on the information to ensure that (i) the filter media 150 is capable of continuing to filter fluid flows through the interior volume 140 and (ii) the interior volume 140 is not overfilled with undesired material 16. In some embodiments, the chamber controller 168 may be configured to operate in a coordinated manner with the inert gas supply controller 58 to supply inert gas to the interior of the sound attenuation chamber 30, for example, as described herein.

In some embodiments, the chamber controller 168 may include computing hardware (e.g., processors, memory, storage devices, communication devices, other types of hardware devices including circuitry, etc.), and/or computing instructions (e.g., computer code) that when executed by the computing hardware cause chamber controller 168 to provide its functionality. The chamber controller 168 may include a lookup table or other data structure usable to make an operating points determination 170 for the discharge port control valve 164 and/or the jet generators 156 based at least in part on the fill level 79 and filtration capacity of the filter media 150. Once the operating points are determined, the chamber controller 168 may be configured to modify operation of the discharge port control valve 164 and/or the jet generators 156 based at least in part on the operating points. For example, the chamber controller 168 may be configured to modify the quantities of power used to drive the discharge port control valve 164 and/or the jet generators 156 to set the quantity of fluid flows through each of the discharge port control valves 164 and/or the jet generators 156. As a result, in some embodiments, the sound attenuation chamber 30 may be more likely to be able to substantially continuously operate.

In some embodiments, to enable a person to control operation of the sound attenuation chamber 30, the sound attenuation chamber 30 may include a user input device 172. The user input device 172 may be in communication with the chamber controller 168. The user input may be communicated to the chamber controller 168 via the user input device 172. The user input device 172 may include, for example, one or more buttons, touch sensitive displays, levers, knobs, and/or other devices (e.g., control panels, tablet computers, and/or smart phones) that are operable by a person to provide the chamber controller 168 with information for operating or controlling the sound attenuation chamber 30.

The chamber controller 168 may be configured to receive information from a person via the user input device 172 regarding how frequently to refresh the filtration capacity of the filter media 150 and/or information regarding how frequently to discharge undesired material 16 from the interior volume 140. The chamber controller 168 may use such information when determining the operating points for the discharge port control valve 164 and/or the jet generators 156. For example, a person may provide operational preferences or other information using the user input device 172 to configure operation of the sound attenuation chamber 30.

In some embodiments, the chamber controller 168 may be powered using electricity. The sound attenuation chamber 30 may include one or more solar panels 174 that provide electrical power to the chamber controller 168. The chamber controller 168 may include one or more batteries in which power from the one or more solar panels 174 may be stored prior to use by the chamber controller 168 (and/or other controllers of the material extraction assembly 10).

Applicant has recognized that some environments, such as industrial environments similar to the environment illustrated in FIGS. 1-4, may include volatile hydrocarbon fluids (and/or other types of volatile materials) or other types of fluids susceptible to combustion. Some embodiments of the material extraction assembly 10, or one or more components thereof, may not be powered by combustible power sources. Rather, the material collector 11, the vacuum source 28, the sound attenuation chamber 30, and/or the fluid source 32 may be powered with electricity and/or compressed fluid. In some such embodiments, the material extraction assembly 10 may be capable of removing undesired materials from an environment, such as an industrial environment, without the risk of igniting combustible materials (e.g., pyrophoric catalyst) in the environment (or with a reduced risk).

To supply pressurized or compressed fluid, the fluid source 32, such as compressor 264, may compress fluid and store the compressed or pressurized fluid for future use. In some embodiments, the fluid source 32 may include an air compressor, and the air compressor may be configured to compress air from the ambient environment to generate the compressed or pressurized fluid. The fluid source 32 may compress other fluids without departing from embodiments disclosed herein.

To limit or prevent combustion risk, in some embodiments, the fluid source 32 may compress fluid using electricity. The fluid source 32 may obtain the electricity from any electricity source. In some embodiments, the fluid source 32 received power from the one or more electric motors 262. In some embodiments, the fluid source 32 may include one or more batteries for providing the electricity to the fluid source 32. In some embodiments, the fluid source 32 may include a power cable and/or other componentry for obtaining electricity from another source (e.g., from a utility company or other large-scale supplier, a solar setup, and/or or other non-combustion-based electricity producers, etc.).

Applicant has recognized that environments, such as industrial environments, such as the site illustrated in FIGS. 1-4, may require a high uptime by their operators. As a result, the time required to setup the material extraction assembly 10 may be a significant cost to the operators of the site. In some embodiments, the material extraction assembly 10 disclosed herein may provide for the efficient setup, operation, and removal of the material extraction assembly 10 in many environments, including industrial environments. In some embodiments, any of the components of the material extraction assembly 10 may be placed or mounted on chassis including trailers or other types of high mobility structures to enable them to be efficiently placed and oriented with respect to, for example, a reaction vessel.

Applicant has recognized that environments, such the example environment shown in FIGS. 1-4, may have different requirements for material removal. For example, different industrial environments may have different quantities of undesired material and/or undesired material at different industrial environments may have different physical properties. The material extraction assembly 10 in accordance with embodiments disclosed herein may provide for rapid deployment of a material extraction assembly 10 that is customized or tailored to meet the requirements of each industrial environment. As a result, different numbers of components may be deployed and connected (e.g., pneumatically connected) in parallel and/or in series to provide desired levels of vacuum strength and/or desired storage capacities for undesired material.

For example, as shown in FIG. 15, in some embodiments, a material extraction assembly may include multiple material collectors 11 (e.g., vacuum boxes), compressor and vacuum generation assemblies 13, and/or sound attenuation chambers 30. Each a compressor and vacuum generation assembly 13 may include, for example, multiple vacuum sources 28 and/or fluid sources 32. Each material collector 11 may be pneumatically connected to a reaction vessel 14 via a divider 176 and manifold 178 through conduits 180.

The divider 176 may be a pneumatic splitter that establishes two separate fluid flow paths through the respective material collectors 11.

By pneumatically connecting both material collectors 11, for example, to the source of the material (e.g., the reaction vessel 14) in parallel, undesired material 16 from the source of the material may be transferred to both material collectors 11 concurrently or substantially simultaneously. As a result, the material extraction assembly 10 may be capable of removing twice as much undesired material 16 before the material collectors 11 are filled. The material removal capacity of a material extraction assembly 10 in accordance with some embodiments may be scaled up (or down) as desired in this example manner to meet environment-based requirements. In such embodiments, any of the components may include any number of ports to facilitate the formation of multiple fluid flow paths. For example, as seen in FIG. 15, the material collectors 11 may include four ports (e.g., two inlet ports and two vacuum ports). The components shown in FIG. 15 may include different numbers of ports without departing from embodiments disclosed herein. Although the example material extraction assemblies 10 shown in FIG. 15 each include a compressor and vacuum generation assembly 13, for example, as shown in FIGS. 2, 4, and 13A through 13G, one or more of the material extraction assemblies 10 may include a vacuum generation and sound attenuation assembly 12, for example, such as those shown in FIGS. 1, 3, and 10A through 10H.

Each material collector 11 may be pneumatically connected to two vacuum sources 28 through hoses 182. By pneumatically connecting two vacuum sources 28 to a single material collector 11, the strength of the high-pressure vacuum in the material collector 11 may be increased. Consequently, a higher degree of suction may be applied to undesired material 16 in reaction vessel 14, thereby increasing the transfer rate of undesired material 16 from reaction vessel 14 and allowing more difficult material to be transferred out of reaction vessel 14. The suction strength of the material extraction assembly in accordance with embodiments may be scaled up (or down) as desired in this example manner to meet environment requirements.

In some embodiments, each of the vacuum sources 28 of the material extraction assemblies 10 may be pneumatically connected to a material collector 11 and/or suction manifold may also exhaust through a corresponding sound attenuation chamber 30. For example, the vacuum sources 28 that exhaust through a corresponding sound attenuation chamber 30 may be positioned on a trailer together to form a mobile unit. In this manner, the material extraction assembly 10 may be quickly and efficiently deployed and scaled up (or down) as desirable to meet environment requirements.

To facilitate efficient reconfiguration of the material extraction assembly 10, any of the pneumatic connections may be implemented using quick connect-disconnect connections and/or pneumatic isolators. The quick connect-disconnect connections may allow for any of the pneumatic connections to be quickly made and removed. The pneumatic isolators may automatically seal the material removal system when a pneumatic connection is disconnected. For example, pneumatic isolators may be positioned between the divider 176 and the material collectors 11. When one of the conduits 180 is disconnected from the divider 176, the pneumatic isolator may automatically seal the opening in the divider 176, to which the disconnected conduit was connected. In this manner, the disconnection of a conduit may not impact the other fluid flow paths. For example, the fluid flow path between the divider 176 and the remaining connected material collector 11 (e.g., with the other conduit) may not be impacted. Quick connect-disconnect connections and/or pneumatic isolators may be used to facilitate the pneumatic reconfiguration of any of the fluidic topologies illustrated throughout this application.

Applicant has recognized that environments similar to the example illustrated in FIGS. 1-4 may need to be filled with desired material after the undesired material 16 has been removed. For example, the reaction vessel 14 may need to be refilled with catalyst, packing materials such as pall rings, or other materials after undesired material 16 is removed. Systems, assemblies, apparatuses, and methods in accordance with embodiments disclosed herein may provide for rapid deployment of desired materials in certain environments.

Some embodiments of the material extraction assembly 10 may include a number of components configured to cooperatively operate to provide its functionality. To orchestrate the operation of these components, in some embodiments, the operation of the material extraction assembly 10 may be coordinated in an at least partially automated manner. For example, as explained herein, any of the components of the material extraction assembly 10 may include a supervisory controller 81, which may coordinate operation of one or more of the components.

Figure 16:
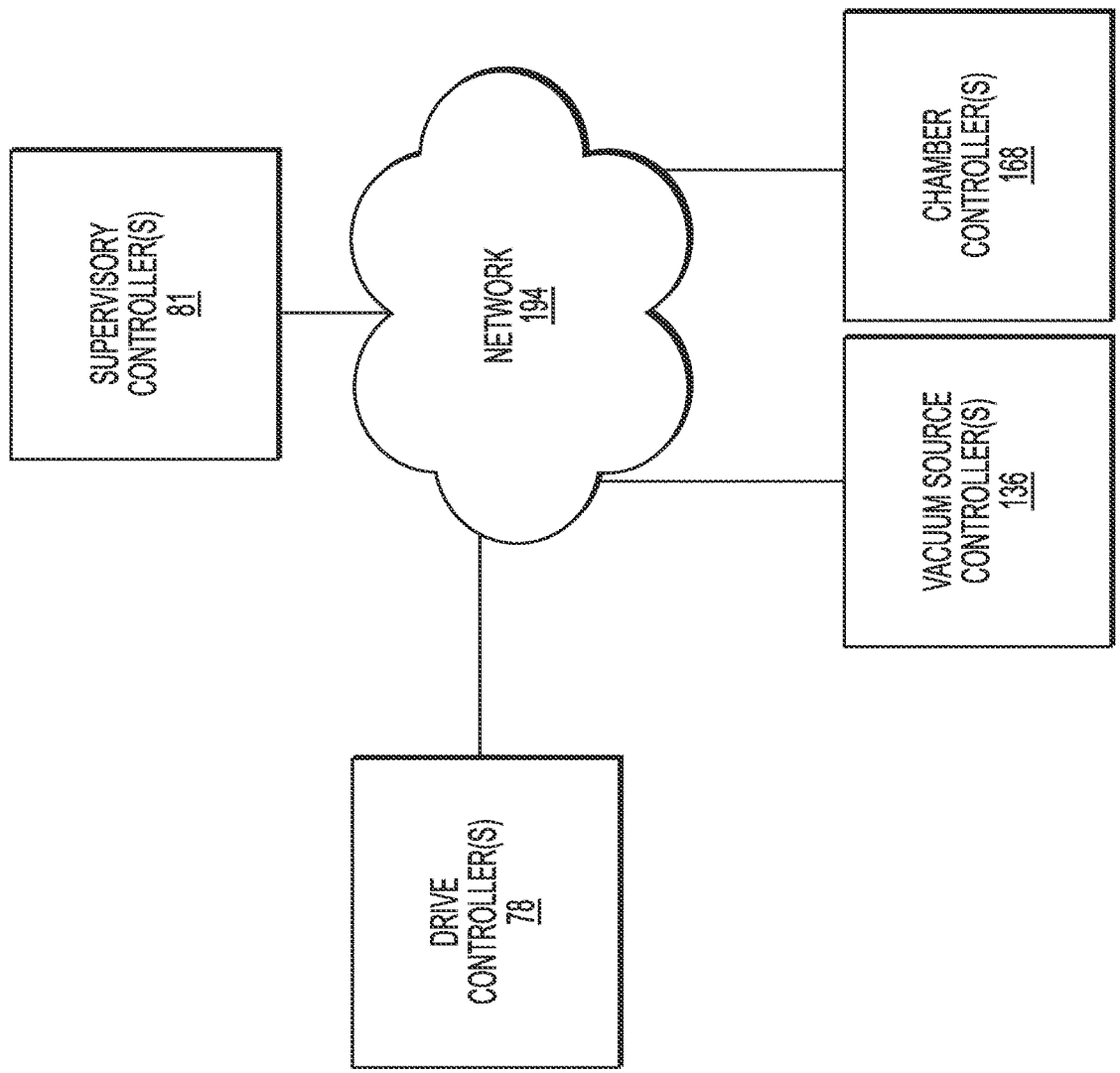
FIG. 16 is a block diagram of example supervisory controllers for coordinating substantially continuous material extraction, according to embodiments of the disclosure.
Figure 17A:
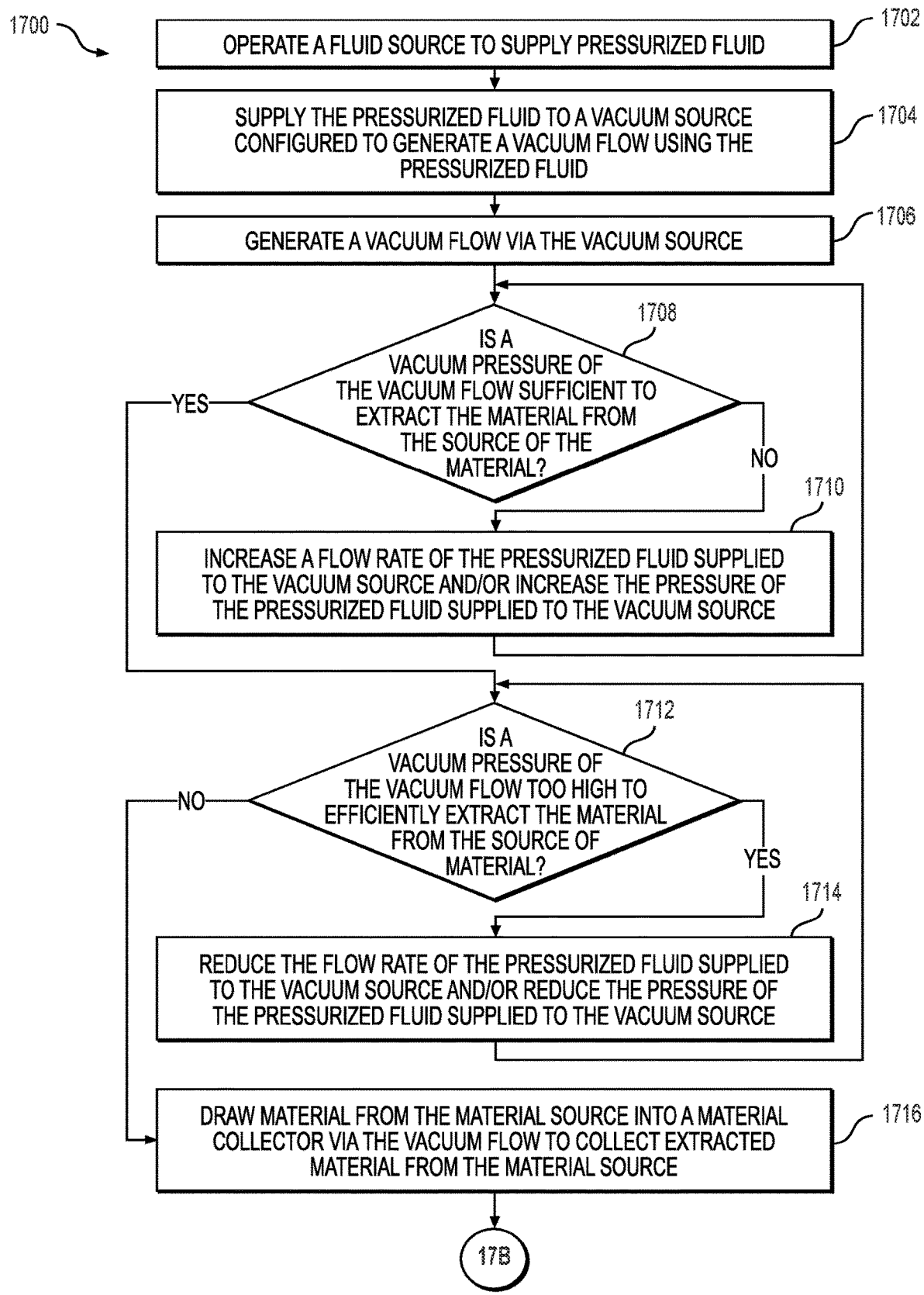
FIG. 17A is a block diagram of an example method for extracting pyrophoric material from a source of the pyrophoric material, according to embodiments of the disclosure.
Figure 17B:
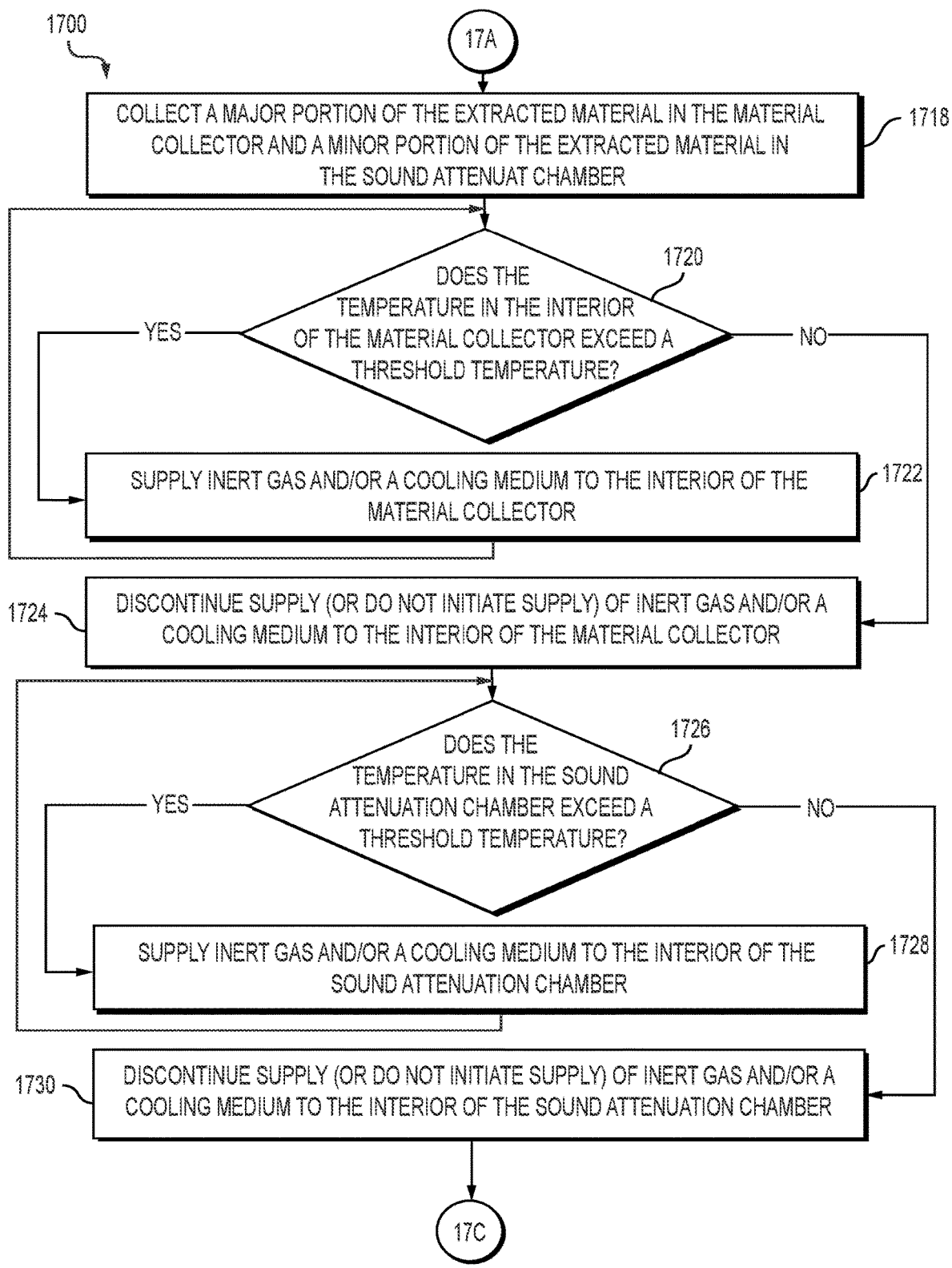
FIG. 17B is a continuation of the block diagram shown in FIG. 17A, according to embodiments of the disclosure.
Figure 17C:
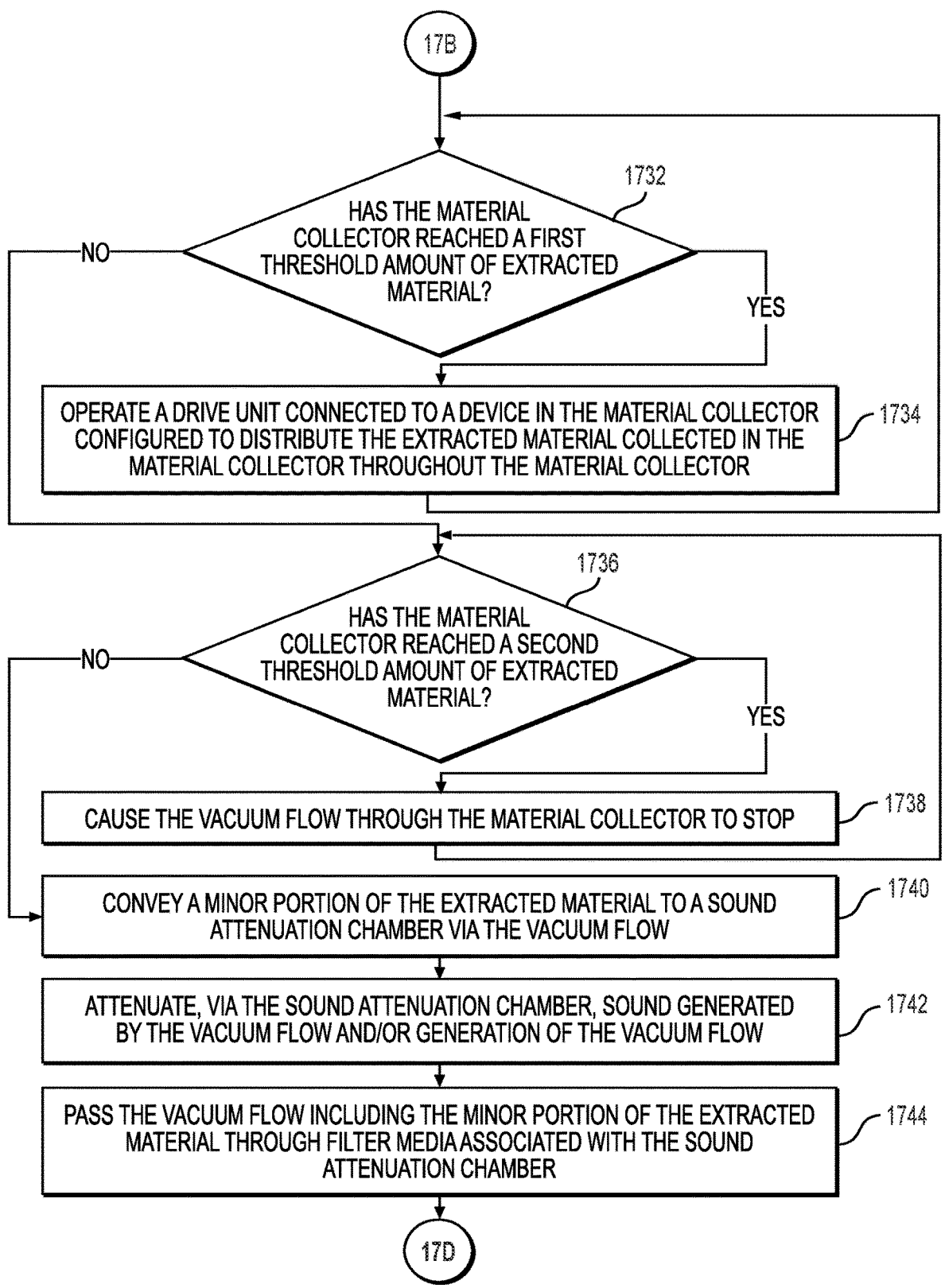
FIG. 17C is a continuation of the block diagram shown in FIGS. 17A and 17B, according to embodiments of the disclosure.
Figure 17D:
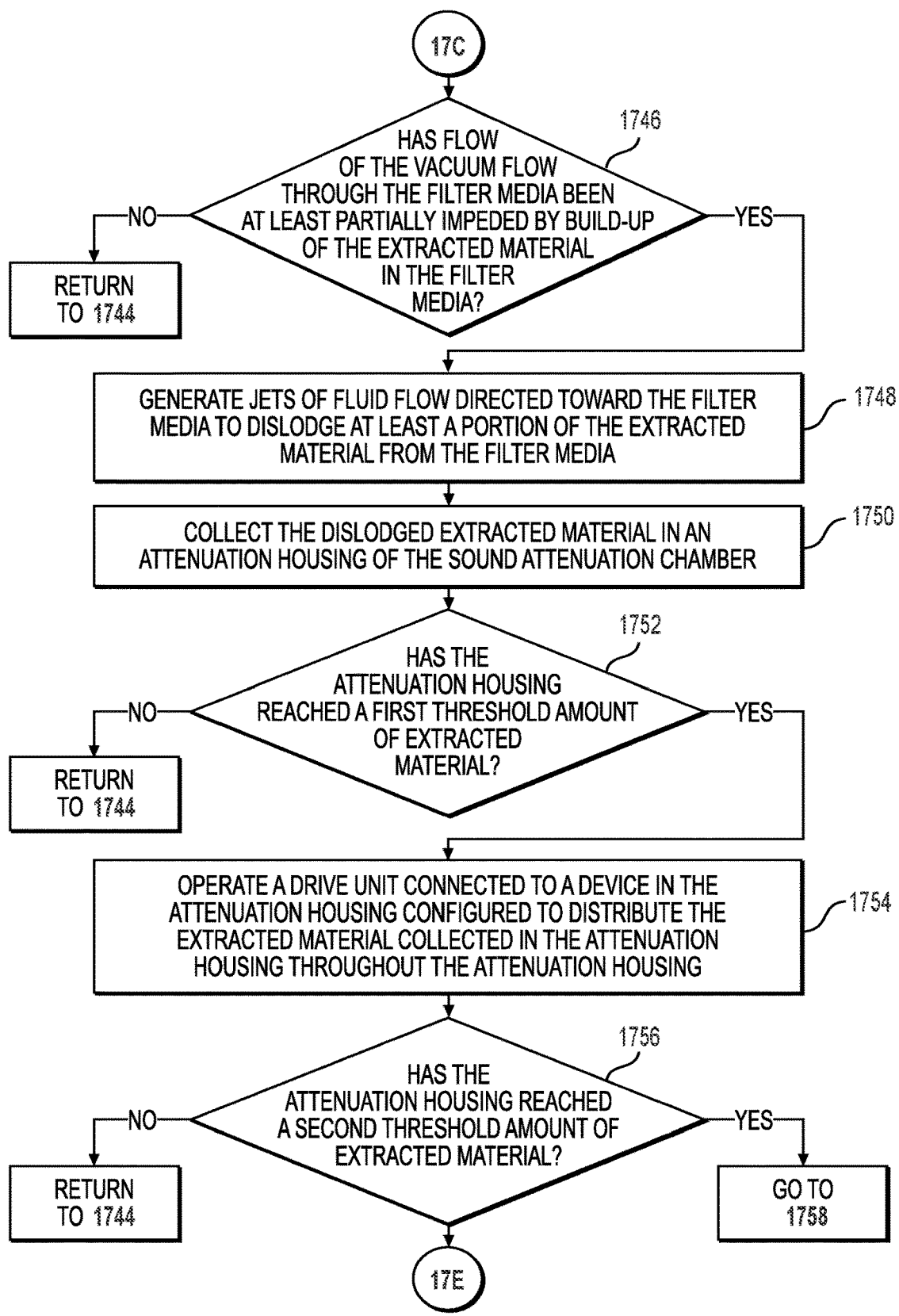
FIG. 17D is a continuation of the block diagram shown in FIGS. 17A, 17B, and 17C, according to embodiments of the disclosure.
Figure 17E:
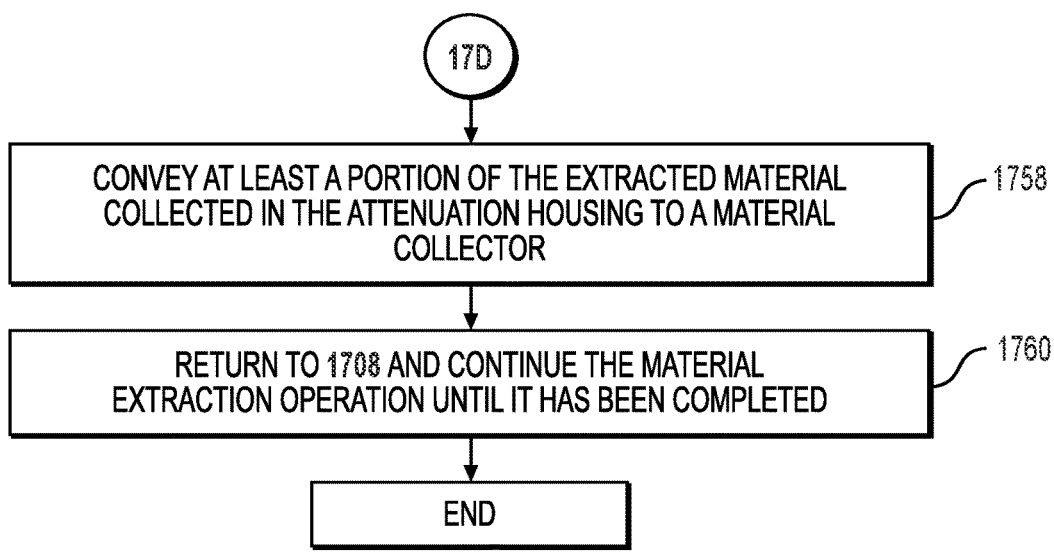
FIG. 17E is a continuation of the block diagram shown in FIGS. 17A, 17B, 17C, and 17D, according to embodiments of the disclosure.

As shown in FIG. 16, the material extraction assembly 10 may include one or more supervisory controllers 81, which may be in communication with one or more of the drive controller 78 associated with operation of one or more material collectors 11, an inert gas supply controller 58 (FIG. 5) associated with the supply of inert gas to the material extraction assembly 10, a vacuum source controller 136 associated with operation of one or more vacuum sources 28, and/or a chamber controller 168 associated with controlling operation of one or more sound attenuating chambers 30. The aforementioned supervisory controller(s) and other controllers may be in communication with one another via a network 194. The network 194 may include one or more wired and/or wireless networks through which the supervisory controller(s) 81 and other controllers may communicate.

According to some embodiments, for example, referring to FIGS. 1-4, a method to enhance extraction of pyrophoric material (e.g., pyrophoric catalyst) from a refinery apparatus (e.g., a reaction vessel or tower 14) may include supplying a pressurized fluid to a plurality of vacuum generators 106, and generating, via the plurality of vacuum generators 106 using the pressurized fluid, a vacuum flow 24. The method further may include associating a manifold (e.g., a hose, a pipe, and/or a conduit) with the refinery apparatus, the manifold providing a flow path for the vacuum flow 24. The method also may include extracting pyrophoric material from the refinery apparatus via the vacuum flow 24 through the manifold to a material collector 11, through which the vacuum flow 24 passes, depositing at least a portion of the extracted pyrophoric material in the material collector 11. The method further may include supplying one or more of inert gas or a cooling medium to the material collector 11. In some embodiments, the method also may include passing the vacuum flow 24 into a sound attenuation chamber 30 to reduce a sound level generated by one or more of the vacuum flow 24 or generating the vacuum flow. In some such embodiments, the method further may include supplying one or more of inert gas or a cooling medium to the sound attenuation chamber 30.

In some embodiments, the method may include supplying inert gas to the material collector 11, and supplying inert gas to the material collector 11 may include providing an inert gas conduit 36 between a source of inert gas 38 and the material collector 11 and causing inert gas to flow from the source of inert gas 38 to the material collector 11 via the inert gas conduit 36. In some embodiments, the method may include supplying inert gas to the material collector 11, and inducing swirl in the inert gas in the material collector 11.

In some embodiments, extracting pyrophoric material from the refinery apparatus via the vacuum flow 24 through the manifold to a material collector 11 through which the vacuum flow 24 passes may include passing the vacuum flow 24 through a material receiver 44 (e.g., FIGS. 1 and 2) positioned to cause the pyrophoric material to be deposited into a collection container 46. In some embodiments, supplying inert gas to the material collector 11 may include supplying inert gas to the material receiver 44 and, in some embodiments, inducing swirl in the inert gas in the material receiver 44. The material receiver 44 may include an upper portion 48 and a lower portion 50, and supplying inert gas to the material collector 11 may include providing a first inert gas conduit 36a between the source of inert gas 38 and the upper portion 48 of the material receiver 44, and, in some embodiments, providing a second inert gas conduit 36b between the source of inert gas 38 and the lower portion 48 of the material receiver 44. The method further may include causing inert gas to flow from the source of inert gas 38 to one or more of the upper portion 48 of the material receiver 44 via the first inert gas conduit 36a or the lower portion 50 of the material receiver 44 via the second inert gas conduit 36b. The method further may include one or more of inducing swirl in the inert gas in the upper portion 48 of the material receiver 44, or inducing swirl in the inert gas in the lower portion 50 of the material receiver 44. In some embodiments, the lower portion 50 of the material receiver 44 may be substantially conical and may include a deposit port 52 at an apex of the lower portion 50, and the method further may include inducing swirl in the inert gas in the lower portion 50 of the material receiver 44 to promote passage of the pyrophoric material through the deposit port 52 and into the collection container 46.

In some embodiments, the method further may include determining a temperature inside an interior of the material collector 11 and supplying one or more of inert gas or the cooling medium to an interior of the material collector 11 based at least in part on the temperature inside the interior of the material collector 11. For example, the method may include determining whether the temperature inside the interior of the material collector 11 exceeds a threshold temperature, and when the temperature inside the interior of the material collector 11 exceeds the threshold temperature, supplying the one or more of inert gas or the cooling medium to the interior of the material collector 11. The method also may include determining whether the temperature inside the interior of the material collector 11 is below the threshold temperature, and when the temperature inside the interior of the material collector 11 is below the threshold temperature, discontinuing supply of the one or more of inert gas or the cooling medium to the interior of the material collector 11.

In some embodiments, the method may include supplying inert gas to the sound attenuation chamber 30, and supplying inert gas to the sound attenuation chamber 30 may include providing an inert gas supply conduit 36c between a source of inert gas 38 and the sound attenuation chamber 30. For example, the method may include determining a temperature inside an interior of the sound attenuation chamber 30 and supplying one or more of inert gas or the cooling medium to the interior of the sound attenuation chamber 30 based at least in part on the temperature inside the interior of the sound attenuation chamber 30. For example, the method may include determining whether the temperature inside the interior of the sound attenuation chamber 30 exceeds a threshold temperature, and when the temperature inside the interior of the sound attenuation chamber 30 exceeds the threshold temperature, supplying the one or more of inert gas or the cooling medium to the interior of the sound attenuation chamber 30. The method further may include determining whether the temperature inside the interior of the sound attenuation chamber 30 is below the threshold temperature, and when the temperature inside the interior of the sound attenuation chamber 30 is below the threshold temperature, discontinuing supply of the one or more of inert gas or the cooling medium to the interior of the sound attenuation chamber.

In some embodiments, the method may include passing the vacuum flow into filter media 150 at least partially enclosed in the sound attenuation chamber 30 to filter the vacuum flow 24, and generating jets of fluid flow directed toward the filter media 150 to at least partially maintain filtration capacity of the filter media 150. The method may include supplying inert gas to the sound attenuation chamber 30 via the jets of fluid. In some embodiments, generating jets of fluid flow may include supplying compressed fluid from a source of compressed fluid to jet generators 156 (e.g., FIGS. 10E-10H, 11A, 11B, 13E, and 13G) positioned to direct the jets of fluid toward the filter media 150, and supplying inert gas to the sound attenuation chamber 30 via the jets of fluid may include one or more of adding inert gas to the compressed fluid or substituting inert gas for the compressed fluid. In some embodiments, the cooling medium may include one or more of dry ice or a dry ice substitute, for example, as described herein.

FIG. 17A, FIG. 17B, FIG. 17C, FIG. 17D, and FIG. 17E are a block diagram of an example method 1700 for extracting pyrophoric material, such as pyrophoric catalyst, from a source of the pyrophoric material, such as a refinery assembly, such as a reaction tower, for example, or any one or more of the example sources of material described herein, as well as others. The example method 1700 is illustrated as a collection of blocks in a logical flow graph, which represent a sequence of operations. In some embodiments of the method 1700, one or more of the blocks may be manually and/or automatically executed. In the context of software, where applicable, the blocks may represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the method.

FIG. 17A through FIG. 17E are a block diagram of an example method 1700 for extracting pyrophoric material, such as pyrophoric catalyst, from a source of the pyrophoric material, such as a refinery assembly, such as a reaction tower. At 1702 (see FIG. 17A), the example method 1700 may include operating a fluid source to supply pressurized fluid, for example, as described herein.

The example method 1700, at 1704, may include supplying the pressurized fluid to a vacuum source configured to generate a vacuum flow using the pressurized fluid, for example, as described herein. In some embodiments, one or more conduits may be provided between one or more fluid sources and the vacuum generator to supply pressurized fluid from the one or more fluid sources to the vacuum source, for example, as described herein.

At 1706, the example method 1700 may include generating a vacuum flow via the vacuum source, for example, as described herein. For example, the vacuum source may include a plurality of vacuum generators configured to use the pressurized fluid to generate the vacuum flow. In some embodiments, the vacuum source may include two or more, three or more, or four of more vacuum generators. In some embodiments, one or more of the vacuum generators may include a venturi mechanism configured to use the pressurized fluid flow the generate the vacuum flow.

The example method 1700, at 1708, may include determining whether a vacuum pressure of the vacuum flow is sufficient to extract the material from the source of the material, for example, as described herein. For example, pressure sensors and/or flow rate sensors may be provided upstream and/or downstream of the vacuum source, and a controller may receive sensor signals from the sensors and determine whether the vacuum pressure is sufficient. In some embodiments, the controller may be configured to compare the pressure and/or flow rate determined based at least in part of the sensor signals and compare the pressure and/or flow rate to pressure and/or flow rate information stored in memory (e.g., via a look-up table) for different types of materials that may be extracted. In some embodiments, an operator of the system may input, for example, via a user input device, the type of material being extracted, and the controller may be configured to determine the pressure and/or flow rate appropriate for extracting the type of material input by the operator. In some embodiments, the controller may be configured to automatically determine the type of material being extracted, for example, via infra-red sensors, image sensors, optical sensors, and/or laser sensors, such as LIDAR, and analytical models, such as, for example, machine-learning-trained analytical models. Other ways of determining sufficient vacuum pressure are contemplated.

If, at 1708, is determined that the vacuum pressure is not sufficient to extract the material, at 1710, the example method 1700 may include increasing one or more of a flow rate of the pressurized fluid supplied to the vacuum source or increasing the pressure of the pressurized fluid supplied to the vacuum source.

Thereafter, the example method 1700 may include returning to 1708 to determine whether the vacuum pressure of the vacuum flow is sufficient to extract the material from the source of the material.

If, at 1708, it is determined that the vacuum pressure of the vacuum flow is sufficient to extract the material from the source of the material, at 1712, the example method 1700 may include determining whether the vacuum pressure is too high to efficiently extract the material from the source of material. This may be performed in a manner at least similar to the example manner described with respect to 1708.

If, at 1712, it is determined that the vacuum pressure is too high, at 1714, the example method 1700 may include reducing one or more of a flow rate of the pressurized fluid supplied to the vacuum source or reducing the pressure of the pressurized fluid supplied to the vacuum source.

Thereafter, the example method 1700 may include returning to 1708 to determine whether the vacuum pressure of the vacuum flow is sufficient to extract the material from the source of the material.

If, at 1712, it is determined that the vacuum pressure is not too high, at 1716, the example method 1700 may include drawing material from the material source into a material collector via the vacuum flow to collect extracted material from the material source, for example, as described herein. One or more manifolds and/or one or more conduits may be provided between the source of the material and the material collector to convey the extracted material to the material collector, for example, as described herein.

At 1718 (see FIG. 17B), the example method 1700 may include collecting a major portion of the extracted material in the material collector and collecting a minor portion of the extracted material in a sound attenuation chamber, for example, as described herein.

The example method 1700, at 1720, may include determining whether a temperature inside the interior of the material collector exceeds a threshold temperature, for example, as described herein.

If, at 1720, it is determined that the temperature inside the interior of the material collector exceeds the threshold temperature, the method 1700, at 1722, may include supplying one or more of inert gas or a cooling medium to the interior of the material collector, for example, as described herein, and thereafter returning to 1720 to determine whether the temperature inside the interior of the material collector exceeds the threshold temperature.

If, at 1720, it is determined that the temperature inside the interior of the material collector is below the threshold temperature, the method 1700, at 1724, may include either discontinuing supply or not initiating supply of one or more of the inert gas or the cooling medium to the interior of the material collector, for example, as described herein.

The example method 1700, at 1726, may include determining whether a temperature inside the interior of the sound attenuation chamber exceeds a threshold temperature, for example, as described herein.

If, at 1726, it is determined that the temperature inside the interior of the sound attenuation chamber exceeds the threshold temperature, the method 1700, at 1728, may include supplying one or more of inert gas or a cooling medium to the interior of the sound attenuation chamber, for example, as described herein, and thereafter returning to 1726 to determine whether the temperature inside the interior of the sound attenuation chamber exceeds the threshold temperature.

If, at 1726, it is determined that the temperature inside the interior of the sound attenuation chamber is below the threshold temperature, the method 1700, at 1730, may include either discontinuing supply or not initiating supply of the one or more of inert gas or the cooling medium to the interior of the sound attenuation chamber, for example, as described herein.

The example method 1700, at 1732 (see FIG. 17C), may include determining whether the material collector has reached a first threshold amount of extracted material, for example, as described herein. In some embodiments, one or more sensors may be provided to generate signals indicative of the amount of extracted material in the material collector, for example, as described herein. In some examples, a controller may be provided and configured to receive the sensor signals, and based at least in part on the sensor signals, determine whether the first threshold has been met.

If, at 1732, it is determined that the material collector has reached the first threshold amount, at 1734, the example method 1700, may include operating a drive unit connected to a device in the material collector configured to distribute the extracted material collected in the material collector throughout the material collector, for example, as described herein. For example, the drive unit may be connected to an auger configured to rotate via the drive unit and redistribute at least some of the extracted material within the material collector, for example, as described herein.

At 1736, the example method 1700 may include determining whether the material collector has reached a second threshold amount of extracted material approaching maximum capacity of the material collector, for example, as described herein. In some embodiments, as noted above at 1732, one or more sensors may be provided to generate signals indicative of the amount of extracted material in the material collector. In some examples, a controller may be provided and configured to receive the sensor signals, and based at least in part on the sensor signals, determine whether the second threshold has been met.

If, at 1736, it is determined that the material collector has reached the second threshold amount of extracted material, at 1738, the example method 1700 may include causing the vacuum flow through the material collector to stop. This may include, for example, closing a valve in the conduit between the source of the material and the material collector to prevent the extracted material from continuing to flow into the material collector. In some embodiments, this may include ceasing the method 1700 until, for example, the material collector can be emptied or the conduit can be connected to a different material collector. In some embodiments, the conduit connecting the material collector to the source of the material may be disconnected from the source of the material and another material collector may be connected to the conduit. Thereafter, the method 1700 may be restarted. The full material collector may be taken to a location for disposal of the extracted material, recycling of the extracted material, or remediation of the extracted material.

If, at 1736, it is determined that the material collector has not reached the second threshold amount of extracted material approaching maximum capacity of the material collector, at 1740, the example method 1700 may include conveying a minor portion of the extracted material to a sound attenuation chamber via the vacuum flow, for example, as described herein. For example, a conduit may be provided between the material collector and the sound attenuation chamber providing a flow path for the vacuum flow to convey the minor portion of the material (e.g., material not trapped in the material collector) to the sound attenuation chamber. In some embodiments, the sound attenuation chamber of the vacuum source may be connected to one another (e.g., directly connected to one another), for example, to form a unitary vacuum and attenuation module, for example, as described herein.

At 1742, the example method 1700 may include attenuating, via the sound attenuation chamber, sound generated by the vacuum flow and/or generation of the vacuum flow, for example, as described herein.

The example method 1700, at 1744, may include passing the vacuum flow including the minor portion of the extracted material through filter media associated with the sound attenuation chamber (e.g., at least partially enclosed within the sound attenuation chamber) to capture at least a portion of the minor portion of extracted material in the filter media, for example, as described herein.

At 1746 (see FIG. 17D), the example method 1700 may include determining whether flow of the vacuum flow through the filter media may be at least partially impeded by build-up of the extracted material in the filter media. This may be determined, for example, by determining whether a pressure change associated with the vacuum flow between opposite sides of the filter media has reached a threshold level indicative of the vacuum flow through the filter media being at least a partially impeded by a build-up of the extracted material in the filter media. Other ways of determining whether the vacuum flow through the filter media is at least a partially impeded by a build-up of the extracted material in the filter media are contemplated.

If, at 1746, it is determined that the flow of the vacuum flow through the filter media may be at least partially impeded by build-up of the extracted material in the filter media, at 1748, the example method 1700 may include generating jets of fluid flow directed toward the filter media to dislodge at least a portion of the extracted material from the filter media, for example, as described herein. In some embodiments, the example method 1700 may include periodically generating the jets of fluid flow directed toward the filter media instead of, or in addition to, determining whether flow of the vacuum flow through the filter media may be at least partially impeded by build-up of the extracted material in the filter media. For example, the jets of fluid flow directed toward the filter media may be initiated based on parameters, such as, for example, the amount of time the material extraction assembly has been operating, the pressure level and/or flow rate of the vacuum flow, and/or the type of material being extracted from the material source. One of more of these parameters may be determined based at least in part on, for example, sensor signals, a controller, and/or operator input.

If, at 1746, it is determined that the flow of the vacuum flow through the filter media is not at least partially impeded by build-up of the extracted material in the filter media, the example method 1700 may include returning to 1744 (see FIG. 17C).

At 1750, the example method 1700 may include collecting the dislodged extracted material in an attenuation housing of the sound attenuation chamber, for example, as described herein. For example, the jets of fluid, when generated may cause at least a portion of the extracted material trapped in the filter media to fall from the filter media into the attenuation housing for collection.

The example method 1700, at 1752, may include determining whether the attenuation housing has reached a first threshold amount of extracted material, for example, as described herein. This may be performed in a manner at least similar to the example manner described with respect to 1732 above.

If, at 1752, it is determined that the attenuation housing has reached the first threshold amount, at 1754, the example method 1700, may include operating a drive unit connected to a device in the attenuation housing configured to distribute the extracted material collected in the attenuation housing throughout the attenuation housing, for example, as described herein. For example, this may be performed in a manner at least similar to the manner described with respect to 1734 above.

If, at 1752, it is determined that the attenuation housing has not reached the first threshold amount, the example method 1700 may include returning to 1744 (see FIG. 17C).

At 1756, the example method 1700 may include determining whether the attenuation housing has reached a second threshold amount of extracted material, for example, as described herein. This may be performed in a manner at least similar to the example manner described with respect to 1736 above.

If, at 1756, it is determined that the second threshold has been reached, the example method 1700 may include, at 1758 (see FIG. 17E), conveying at least a portion of the extracted material collected in the attenuation housing to a material collector, for example, as described herein. For example, a discharge valve in the attenuation housing may be opened, and the vacuum flow may be used to convey at least a portion of the extracted material collected in the attenuation housing to a material collector connected to the attenuation housing via a conduit.

If, at 1756, it is determined that the second threshold has not been reached, the example method 1700 may include returning to 1744 (see FIG. 17C).

At 1760, the example method 1700 may include returning to, for example, 1708 and continuing the material extraction operation until it has been completed.

It should be appreciated that at least some subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Figure 18:
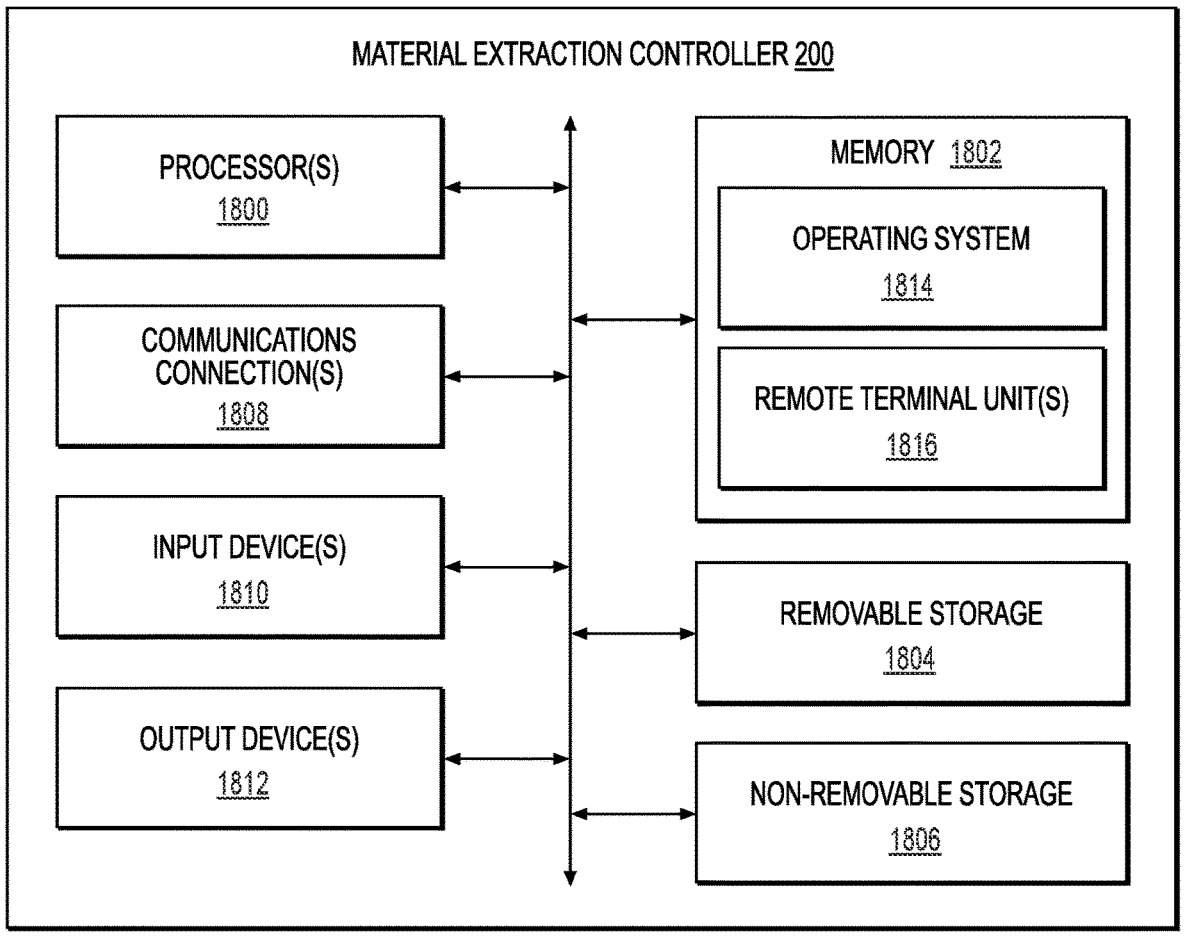
FIG. 18 is a schematic diagram of an example material extraction controller configured to at least partially control a material extraction assembly or material conveyance assembly, according to embodiments of the disclosure.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like FIG. 18 is a schematic diagram of an example material extraction controller 200, which, in some embodiments, may include or operate in a coordinated manner with the inert gas supply controller 58 as well as other controllers described herein, and may be configured to at least partially control a material extraction assembly 10, according to embodiments of the disclosure. In some embodiments, the material extraction controller 200 may include one or more of the controllers described herein. The material extraction controller 200 may include one or more processor(s) 1800 configured to execute certain operational aspects associated with implementing certain systems and methods described herein. The processor(s) 1800 may communicate with a memory 1802. The processor(s) 1800 may be implemented and operated using appropriate hardware, software, firmware, or combinations thereof. Software or firmware implementations may include computer-executable or machine-executable instructions written in any suitable programming language to perform the various functions described. In some examples, instructions associated with a function block language may be stored in the memory 1802 and executed by the processor(s) 1800.

The memory 1802 may be used to store program instructions that are loadable and executable by the processor(s) 1800, as well as to store data generated during the execution of these programs. Depending on the configuration and type of the material extraction controller 200, the memory 1802 may be volatile (such as random-access memory (RAM)) and/or non-volatile (such as read-only memory (ROM), flash memory, etc.). In some examples, the memory devices may include additional removable storage 1804 and/or non-removable storage 1806 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 1802 may include multiple different types of memory, such as static random-access memory (SRAM), dynamic random-access memory (DRAM), or ROM.

The memory 1802, the removable storage 1804, and the non-removable storage 1806 are all examples of computer-readable storage media. For example, computer-readable storage media may include volatile and non-volatile, removable and non-removable media implemented in any method or technology for storage of information, such as computer-readable instructions, data structures, program modules, or other data. Additional types of computer storage media that may be present may include, but are not limited to, programmable random access memory (PRAM), SRAM, DRAM, RAM, ROM, electrically erasable programmable read-only memory (EEPROM), flash memory, or other memory technology, compact disc read-only memory (CD-ROM), digital versatile discs (DVD) or other optical storage, magnetic cassettes, magnetic tapes, magnetic disk storage or other magnetic storage devices, or any other medium, which may be used to store the desired information and which may be accessed by the devices. Combinations of any of the above should also be included within the scope of computer-readable media.

The material extraction controller 200 may also include one or more communication connection(s) 1808 that may facilitate a control device (not shown) to communicate with devices or equipment capable of communicating with the material extraction controller 200. The material extraction controller 200 may also include a computer system (not shown). Connections may also be established via various data communication channels or ports, such as USB or COM ports to receive cables connecting the material extraction controller 200 to various other devices on a network. In some examples, the material extraction controller 200 may include Ethernet drivers that enable the material extraction controller 200 to communicate with other devices on the network. According to various examples, communication connections 1808 may be established via a wired and/or wireless connection on the network.

The material extraction controller 200 may also include one or more input devices 1810, such as a keyboard, mouse, pen, voice input device, gesture input device, and/or touch input device. It may further include one or more output devices 1812, such as a display, printer, and/or speakers. In some examples, computer-readable communication media may include computer-readable instructions, program modules, or other data transmitted within a data signal, such as a carrier wave or other transmission. As used herein, however, computer-readable storage media may not include computer-readable communication media.

Turning to the contents of the memory 1802, the memory 1802 may include, but is not limited to, an operating system (OS) 1814 and one or more application programs or services for implementing the features and embodiments disclosed herein. Such applications or services may include remote terminal units 1816 for executing certain systems and methods for controlling operation of the material extraction assembly 10 (e.g., semi- or fully-autonomously controlling operation of the material extraction assembly 10), for example, upon receipt of one or more control signals generated by the material extraction controller 200. In some embodiments, one or more remote terminal unit(s) 1816 may be located on one or more components of the material extraction assembly 10. The remote terminal unit(s) 1816 may reside in the memory 1802 or may be independent of the material extraction controller 200. In some examples, the remote terminal unit(s) 1816 may be implemented by software that may be provided in configurable control block language and may be stored in non-volatile memory. When executed by the processor(s) 1800, the remote terminal unit(s) 1816 may implement the various functionalities and features associated with the material extraction controller 200 described herein.

As desired, embodiments of the disclosure may include a material extraction controller 200 with more or fewer components than are illustrated in FIG. 18. Additionally, certain components of the example material extraction controller 200 shown in FIG. 18 may be combined in various embodiments of the disclosure. The material extraction controller 200 of FIG. 18 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They may also be practiced with other computer system configurations, including handheld devices, multiprocessor systems, microprocessor-based or programmable consumer electronics, mini-computers, mainframe computers, and the like.

Application programs that are components of the systems and methods described herein may include routines, programs, components, data structures, etc. that may implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks can be performed by remote processing devices linked through a communications network.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This U.S. non-provisional application claims priority to and the benefit of U.S. Provisional Application No. 63/375,500, filed Sep. 13, 2022, titled "SYSTEMS, ASSEMBLIES, AND METHODS FOR PYROPHORIC MATERIAL EXTRACTION." This application also claims priority to, the benefit of, and is a continuation-in-part of U.S. Non-Provisional application Ser. No. 18/214,887, filed Jun. 27, 2023, titled "AIR COMPRESSOR HAVING VACUUM AND ASSOCIATED METHODS FOR LOADING AND EXTRACTING MATERIALS," which claims the benefit of and priority to U.S. Provisional Patent Application No. 63/373,289, filed Aug. 23, 2022, titled "AIR COMPRESSOR HAVING VACUUM AND ASSOCIATED METHODS FOR LOADING AND EXTRACTING MATERIALS"; and is a continuation-in-part of and claims benefit and priority to U.S. Non-Provisional application Ser. No. 17/811,295, filed Jul. 7, 2022, titled, "ASSEMBLIES, APPARATUSES, SYSTEMS, AND METHODS FOR MATERIAL EXTRACTION AND CONVEYANCE," which claims the benefit of and priority to U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE"; and is a continuation-in-part of and claims benefit and priority to U.S. Non-Provisional application Ser. No. 17/811,293, filed Jul. 7, 2022, titled, "ASSEMBLIES AND METHODS FOR MATERIAL EXTRACTION"; and is a continuation-in-part of and claims benefit and priority to U.S. Non-Provisional application Ser. No. 17/811,291, filed Jul. 7, 2022, titled, "HIGH VOLUME INDUSTRIAL VACUUM ASSEMBLIES AND METHODS," which claims the benefit of and priority to U.S. Provisional Application No. 63/367,570, filed Jul. 1, 2022, titled "HIGH VOLUME INDUSTRIAL VACUUM ASSEMBLIES AND METHODS"; and is a continuation-in-part of and claims benefit and priority to U.S. Non-Provisional application Ser. No. 17/811,288, filed Jul. 7, 2022, titled, "RECEIVER, ASSEMBLIES, AND METHODS FOR LOADING AND EXTRACTING PRODUCT INELEVATED TOWER," which claims the benefit of and priority to U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER"; and is a continuation-in-part of and claims benefit and priority to U.S. Non-Provisional application Ser. No. 17/811,280, filed Jul. 7, 2022, titled, "ASSEMBLIES AND METHODS FOR MATERIAL EXTRACTION FROM RETENTION COLLECTIONS," which claims the benefit of and priority to U.S. Provisional Application No. 63/367,218, filed Jun. 29, 2022, titled "ASSEMBLIES AND METHODS FOR MATERIAL EXTRACTION FROM RETENTION COLLECTIONS"; and is a continuation-in-part of and claims benefit and priority to U.S. Non-Provisional application Ser. No. 17/811,277, filed Jul. 7, 2022, titled, "SYSTEMS, METHODS, AND DEVICES FOR INDUSTRIAL TOWER WASTE EXTRACTION," which claims the benefit of and priority to U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

The scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiments, and numerous variations, modifications, and additions further may be made thereto without departing from the spirit and scope of the present disclosure as set forth in the appended claims.

What is claimed is:

1. A method to enhance extraction of pyrophoric catalyst from a refinery apparatus, the method comprising:
supplying a pressurized fluid to a plurality of vacuum generators;
generating, via the plurality of vacuum generators by use of the pressurized fluid, a vacuum flow;
positioning a manifold adjacent the refinery apparatus to provide a flow path for the vacuum flow;
extracting pyrophoric catalyst from the refinery apparatus via the vacuum flow through the manifold to a material collector through which the vacuum flow passes;
depositing at least a portion of the extracted pyrophoric catalyst in the material collector; and
supplying one or more of inert gas or a cooling medium to the material collector.

2. The method of claim 1, wherein the method comprises supplying inert gas to the material collector, and wherein the supplying inert gas to the material collector includes providing an inert gas conduit between a source of inert gas and the material collector and causing inert gas to flow from the source of inert gas to the material collector via the inert gas conduit.

3. The method of claim 1, wherein the method comprises supplying inert gas to the material collector, and the method further comprises inducing swirl in the inert gas in the material collector.

4. The method of claim 1, wherein extracting pyrophoric catalyst from the refinery apparatus via the vacuum flow through the manifold to a material collector through which the vacuum flow passes includes passing the vacuum flow through a material receiver positioned to cause the pyrophoric catalyst to be deposited into a collection container.

5. The method of claim 4, wherein the method comprises supplying inert gas to the material collector, and wherein the supplying inert gas to the material collector includes supplying inert gas to the material receiver.

6. The method of claim 5, further comprising inducing swirl in the inert gas in the material receiver.

7. The method of claim 4, wherein the material receiver includes an upper portion and a lower portion, and the method further comprising:
supplying inert gas to the material collector; and
causing inert gas to flow from a source of inert gas to one or more of the upper portion of the material receiver via a first inert gas conduit or the lower portion of the material receiver via a second inert gas conduit.

8. The method of claim 7, further comprising one or more of:
inducing swirl in the inert gas in the upper portion of the material receiver; or
inducing swirl in the inert gas in the lower portion of the material receiver.

9. The method of claim 7, wherein the lower portion of the material receiver has a substantially conical shape and includes a deposit port at an apex of the lower portion, and the method further comprising inducing swirl in the inert gas in the lower portion of the material receiver to promote passage of the pyrophoric catalyst through the deposit port and into the collection container.

10. The method of claim 1, further comprising determining a temperature inside an interior of the material collector and supplying one or more of inert gas or the cooling medium to an interior of the material collector based at least in part on the temperature inside the interior of the material collector.

11. The method of claim 10, further comprising determining whether the temperature inside the interior of the material collector exceeds a threshold temperature, and when the temperature inside the interior of the material collector exceeds the threshold temperature, supplying the one or more of inert gas or the cooling medium to the interior of the material collector.

12. The method of claim 11, further comprising determining whether the temperature inside the interior of the material collector is below the threshold temperature, and when the temperature inside the interior of the material collector is below the threshold temperature, discontinuing supply of the one or more of inert gas or the cooling medium to the interior of the material collector.

13. The method of claim 1, further comprising:
passing the vacuum flow into a sound attenuation chamber to reduce a sound level generated by one or more of the vacuum flow or generating the vacuum flow; and
supplying one or more of inert gas or a cooling medium to the sound attenuation chamber.

14. The method of claim 13, wherein the supplying one or more of inert gas or a cooling medium to the sound attenuation chamber comprises providing an inert gas supply conduit between a source of inert gas and the sound attenuation chamber.

15. The method of claim 13, further comprising determining a temperature inside an interior of the sound attenuation chamber and supplying one or more of inert gas or the cooling medium to the interior of the sound attenuation chamber based at least in part on the temperature inside the interior of the sound attenuation chamber.

16. The method of claim 15, further comprising determining whether the temperature inside the interior of the sound attenuation chamber exceeds a threshold temperature, and when the temperature inside the interior of the sound attenuation chamber exceeds the threshold temperature, supplying the one or more of inert gas or the cooling medium to the interior of the sound attenuation chamber.

17. The method of claim 16, further comprising determining whether the temperature inside the interior of the sound attenuation chamber is below the threshold temperature, and when the temperature inside the interior of the sound attenuation chamber is below the threshold temperature, discontinuing supply of the one or more of inert gas or the cooling medium to the interior of the sound attenuation chamber.

18. The method of claim 13, further comprising:
passing the vacuum flow into filter media at least partially enclosed in the sound attenuation chamber to filter the vacuum flow;
generating jets of fluid flow directed toward the filter media to at least partially maintain filtration capacity of the filter media; and
supplying inert gas to the sound attenuation chamber via the jets of fluid.

19. The method of claim 18, wherein the generating jets of fluid flow comprises supplying compressed fluid from a source of compressed fluid to jet generators positioned to direct the jets of fluid toward the filter media, and wherein the supplying inert gas to the sound attenuation chamber via the jets of fluid comprises one or more of adding inert gas to the compressed fluid or substituting inert gas for the compressed fluid.

20. The method of claim 1, further comprising one or more of supplying the cooling medium to an interior of the material collector or supplying the cooling medium to an interior of a sound attenuation chamber, the cooling medium comprising one or more of dry ice or a dry ice substitute.

21. A method to enhance extraction of pyrophoric catalyst from a refinery apparatus, the method comprising:
supplying a pressurized fluid to a plurality of vacuum generators;
generating, via the plurality of vacuum generators using the pressurized fluid, a vacuum flow;
positioning a manifold adjacent the refinery apparatus to provide a flow path for the vacuum flow;
extracting pyrophoric catalyst from the refinery apparatus via the vacuum flow through the manifold to a material collector through which the vacuum flow passes;
depositing at least a portion of the extracted pyrophoric catalyst in the material collector;
passing the vacuum flow into a sound attenuation chamber to reduce a sound level generated by one or more of the vacuum flow or generating the vacuum flow; and
one or more of:
supplying one or more of inert gas or a cooling medium to the material collector; or
supplying one or more of inert gas or a cooling medium to the sound attenuation chamber.

22. The method of claim 21, wherein the method comprises supplying inert gas to the material collector, and wherein the supplying inert gas to the material collector includes providing an inert gas conduit between a source of inert gas and the material collector and causing inert gas to flow from the source of inert gas to the material collector via the inert gas conduit.

23. The method of claim 21, wherein the method comprises supplying inert gas to the material collector, and the method further comprises inducing swirl in the inert gas in the material collector.

24. The method of claim 21, wherein extracting pyrophoric catalyst from the refinery apparatus via the vacuum flow through the manifold to a material collector through which the vacuum flow passes includes passing the vacuum flow through a material receiver positioned to cause the pyrophoric catalyst to be deposited into a collection container.

25. The method of claim 24, wherein the method comprises supplying inert gas to the material collector, and wherein the supplying inert gas to the material collector includes supplying inert gas to the material receiver.

26. The method of claim 24, wherein the method comprises supplying inert gas to the material collector, and the method further comprising inducing swirl in the inert gas in the material receiver.

27. The method of claim 24, wherein the material receiver includes an upper portion and a lower portion, and the method further comprising:
supplying inert gas to the material collector; and
causing inert gas to flow from a source of inert gas to one or more of the upper portion of the material receiver via a first inert gas conduit or the lower portion of the material receiver via a second inert gas conduit.

28. The method of claim 27, further comprising one or more of:
inducing swirl in the inert gas in the upper portion of the material receiver; or
inducing swirl in the inert gas in the lower portion of the material receiver.

29. The method of claim 27, wherein the lower portion of the material receiver has a substantially conical shape and includes a deposit port at an apex of the lower portion, and the method further comprising inducing swirl in the inert gas in the lower portion of the material receiver to promote passage of the pyrophoric catalyst through the deposit port and into the collection container.

30. The method of claim 21, further comprising determining a temperature inside an interior of the material collector and supplying one or more of inert gas or the cooling medium to an interior of the material collector based at least in part on the temperature inside the interior of the material collector.

31. The method of claim 30, further comprising determining whether the temperature inside the interior of the material collector exceeds a threshold temperature, and when the temperature inside the interior of the material collector exceeds the threshold temperature, supplying the one or more of inert gas or the cooling medium to the interior of the material collector.

32. The method of claim 31, further comprising determining whether the temperature inside the interior of the material collector is below the threshold temperature, and when the temperature inside the interior of the material collector is below the threshold temperature, discontinuing supply of the one or more of inert gas or the cooling medium to the interior of the material collector.

33. The method of claim 21, wherein the method comprises supplying inert gas to the sound attenuation chamber, and wherein the supplying inert gas to the sound attenuation chamber comprises providing an inert gas supply conduit between a source of inert gas and the sound attenuation chamber.

34. The method of claim 21, further comprising determining a temperature inside an interior of the sound attenuation chamber and supplying one or more of inert gas or the cooling medium to the interior of the sound attenuation chamber based at least in part on the temperature inside the interior of the sound attenuation chamber.

35. The method of claim 34, further comprising determining whether the temperature inside the interior of the sound attenuation chamber exceeds a threshold temperature, and when the temperature inside the interior of the sound attenuation chamber exceeds the threshold temperature, supplying the one or more of inert gas or the cooling medium to the interior of the sound attenuation chamber.

36. The method of claim 35, further comprising determining whether the temperature inside the interior of the sound attenuation chamber is below the threshold temperature, and when the temperature inside the interior of the sound attenuation chamber is below the threshold temperature, discontinuing supply of the one or more of inert gas or the cooling medium to the interior of the sound attenuation chamber.

37. The method of claim 21, further comprising:
passing the vacuum flow into filter media at least partially enclosed in the sound attenuation chamber to filter the vacuum flow;
generating jets of fluid flow directed toward the filter media to at least partially maintain filtration capacity of the filter media; and
supplying inert gas to the sound attenuation chamber via the jets of fluid.

38. The method of claim 37, wherein the generating jets of fluid flow comprises supplying compressed fluid from a source of compressed fluid to jet generators positioned to direct the jets of fluid toward the filter media, and wherein the supplying inert gas to the sound attenuation chamber via the jets of fluid comprises one or more of adding inert gas to the compressed fluid or substituting inert gas for the compressed fluid.

39. The method of claim 21, further comprising one or more of supplying the cooling medium to an interior of the material collector or supplying the cooling medium to an interior of the sound attenuation chamber, the cooling medium comprising one or more of dry ice or a dry ice substitute.

* * * * *